(12) United States Patent  
Letsky

(10) Patent No.: US 10,485,164 B2  
(45) Date of Patent: Nov. 26, 2019

(54) SYSTEM AND METHOD FOR CONTROLLING AND MONITORING OPERATION OF AN AUTONOMOUS ROBOT

(71) Applicant: Michael Todd Letsky, Boca Raton, FL (US)

(72) Inventor: Michael Todd Letsky, Boca Raton, FL (US)

( * ) Notice: Subject to any disclaimer, the term of this patent is extended or adjusted under 35 U.S.C. 154(b) by 0 days.

(21) Appl. No.: 14/934,232

(22) Filed: Nov. 6, 2015

(65) Prior Publication Data

US 2016/0057925 A1 Mar. 3, 2016

Related U.S. Application Data

(63) Continuation of application No. 14/258,678, filed on Apr. 22, 2014, now abandoned, which is a continuation of application No. 13/452,244, filed on Apr. 20, 2012, now Pat. No. 8,706,297, which is a continuation-in-part of application No. 12/818,590, filed on Jun. 18, 2010, now Pat. No. 8,428,776.

(60) Provisional application No. 61/218,279, filed on Jun. 18, 2009.

(51) Int. Cl.
*A01D 34/00* (2006.01)
*G05D 1/00* (2006.01)
*A01D 101/00* (2006.01)

(52) U.S. Cl.
CPC ......... *A01D 34/008* (2013.01); *G05D 1/0088* (2013.01); *A01D 2101/00* (2013.01)

(58) Field of Classification Search
CPC .. G05D 1/0088; G05D 1/0274; G05D 1/0225; G05D 1/0242; G05D 1/0259; G05D 1/027; G05D 1/0272; G05D 1/0278; G05D 1/028; G05D 2201/0203; G05D 2201/0208; A47L 2201/04; A47L 2201/06; A01D 2101/00
See application file for complete search history.

(56) References Cited

U.S. PATENT DOCUMENTS

| | | | |
|---|---|---|---|
| 6,255,793 B1 | 7/2001 | Peless et al. | |
| 7,117,660 B1 | 10/2006 | Colens | |
| 8,019,475 B2 | 9/2011 | Kuroda | |
| 2002/0156556 A1 | 10/2002 | Ruffner | |
| 2003/0030398 A1 | 2/2003 | Jacobs et al. | |
| 2006/0238379 A1 | 10/2006 | Kimchi et al. | |
| 2008/0027591 A1* | 1/2008 | Lenser ............... | G05D 1/0251 701/2 |

(Continued)

FOREIGN PATENT DOCUMENTS

EP 2072195 * 6/2008 ... G05B 2219/39082

*Primary Examiner* — Michael D Lang
(74) *Attorney, Agent, or Firm* — Howard M. Gitten; Lewis Brisbois Bisgaard & Smith LLP

(57) ABSTRACT

A system and method for monitoring and controlling operation of an autonomous robot. In one aspect, the autonomous robot is a lawnmower and the system comprises: an autonomous robot lawnmower comprising a housing, a transceiver, and a central processing unit; an external device in operable communication with the autonomous robot lawnmower, the external device having a transceiver for sending signals to the autonomous robot lawnmower and a display; and wherein in response to user input, the external device is configured to modify settings related to operation of the autonomous robot lawnmower.

13 Claims, 50 Drawing Sheets

(56) References Cited

U.S. PATENT DOCUMENTS

| | | |
|---|---|---|
| 2008/0039974 A1 | 2/2008 | Sandin et al. |
| 2009/0044370 A1 | 2/2009 | Won et al. |
| 2009/0054069 A1* | 2/2009 | Calnan, III ............ H04L 67/34 455/445 |
| 2009/0143912 A1* | 6/2009 | Wang .................... B25J 9/1671 700/259 |
| 2009/0198375 A1 | 8/2009 | Kanayama |
| 2009/0282642 A1 | 11/2009 | Batchelder et al. |
| 2010/0082193 A1* | 4/2010 | Chiappetta ........... G05D 1/0225 701/24 |
| 2010/0106356 A1 | 4/2010 | Trepagnier et al. |
| 2011/0184605 A1* | 7/2011 | Neff ..................... G05D 1/0231 701/25 |

\* cited by examiner

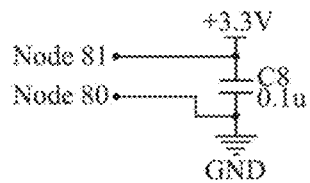
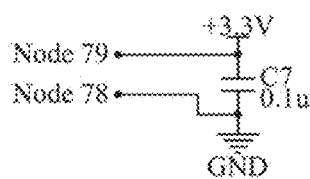
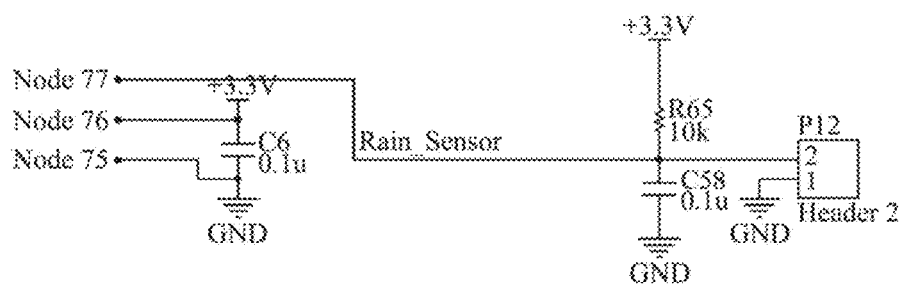
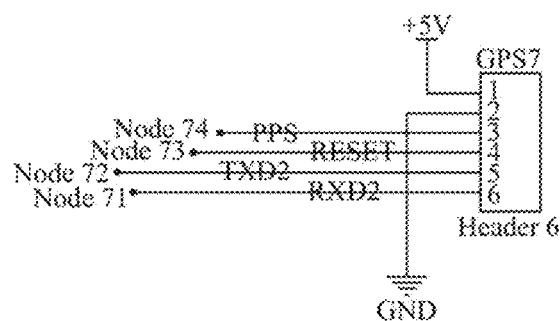
Figure 14I

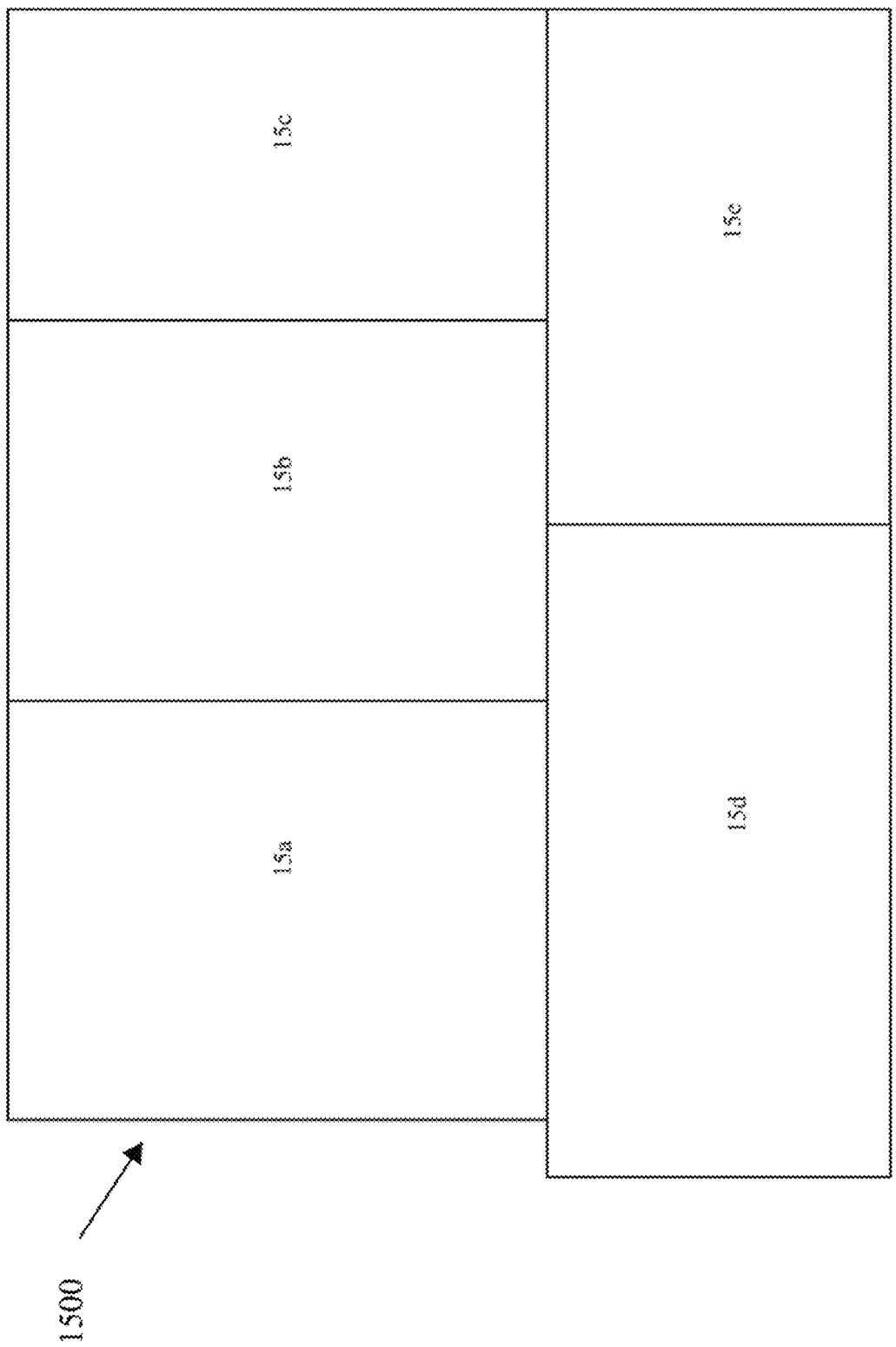

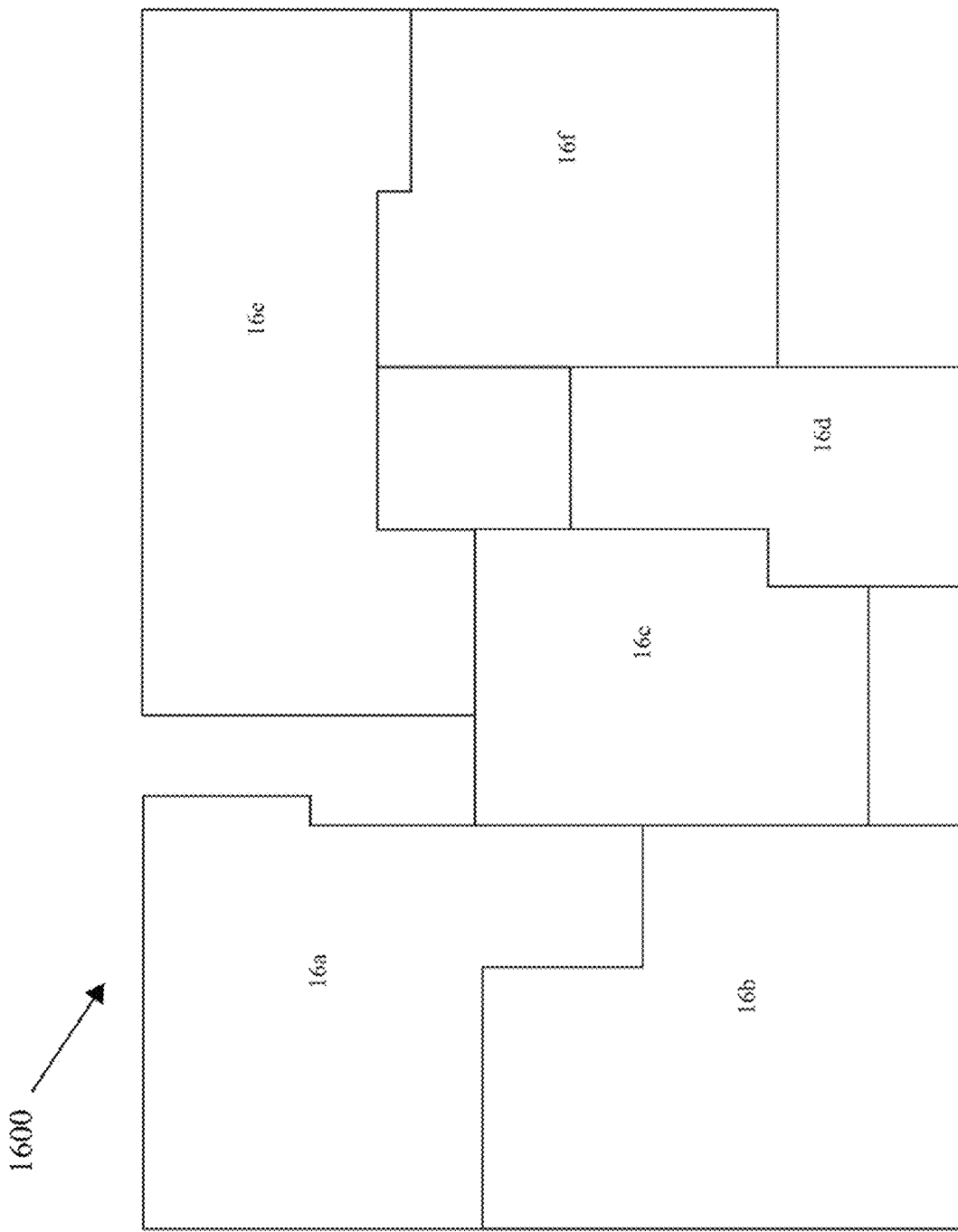

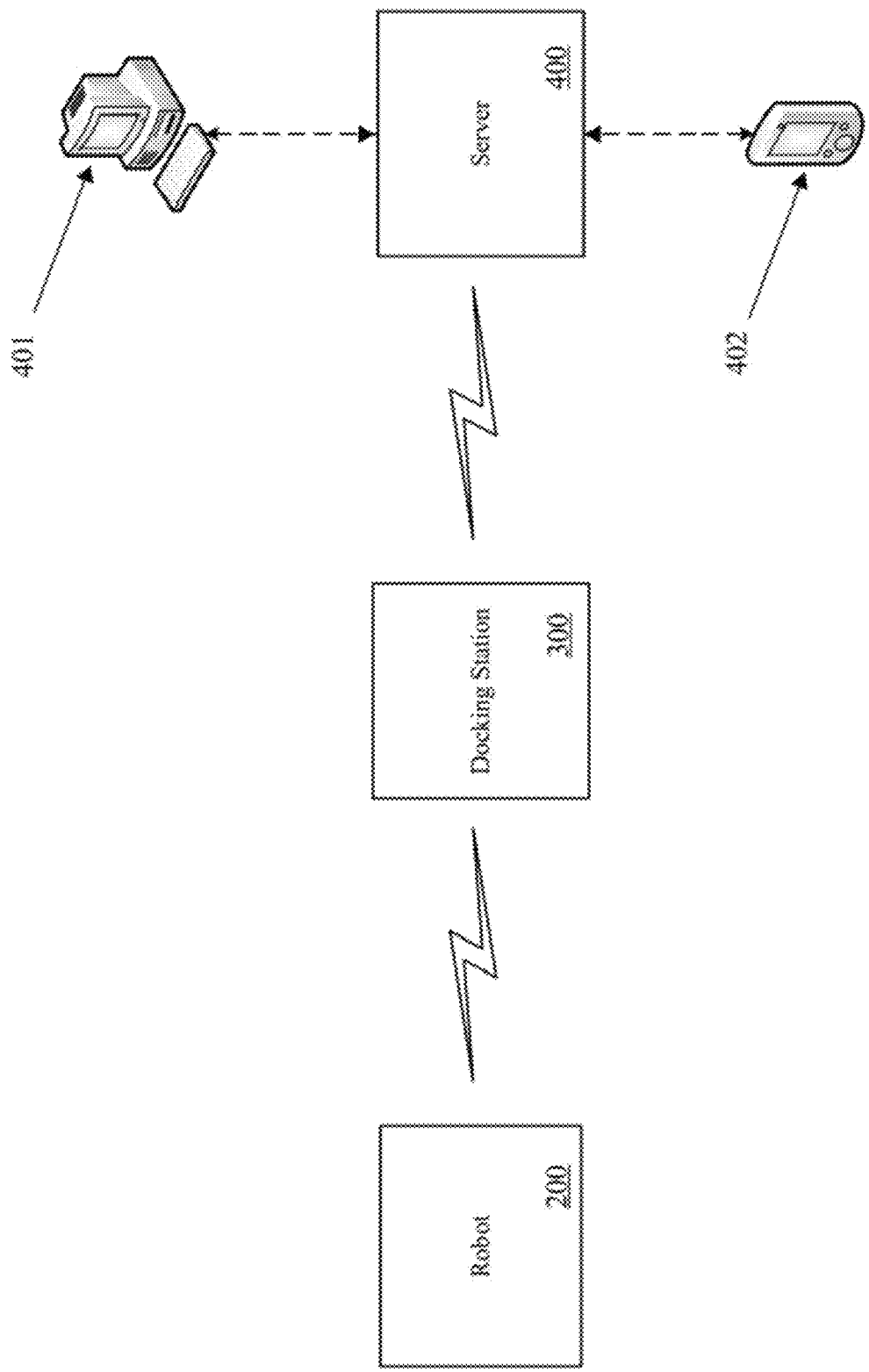

SYSTEM AND METHOD FOR CONTROLLING AND MONITORING OPERATION OF AN AUTONOMOUS ROBOT

CROSS-REFERENCE TO RELATED APPLICATION

The present application is a continuation of U.S. patent application Ser. No. 14/258,678, filed Apr. 22, 2014, which is a continuation of U.S. patent application Ser. No. 13/452, 244, filed on Apr. 20, 2012, now U.S. Pat. No. 8,706,297, which is a continuation-in-part of U.S. patent application Ser. No. 12/818,590, filed Jun. 18, 2010, now U.S. Pat. No. 8,428,776, which claims the benefit of U.S. Provisional Patent Application Ser. No. 61/218,279, filed Jun. 18, 2009, the entireties of which are incorporated herein by reference.

FIELD OF THE INVENTION

This invention relates to the field of autonomous robots, and specifically to mobile robots that are designed to perform tasks within an area of confinement.

BACKGROUND OF THE INVENTION

Autonomous robots that perform household functions such as floor cleaning and lawn mowing are now readily available consumer products. As found in the industry and elsewhere, numerous attempts have been made to build lawn mowing robots. Each of these robots has faced a similar challenge: how to define the bounding area with minimal effort and efficiently cover the designated area given limited energy reserves.

Commercially successful robots tend to be unnecessarily complex and generally operate randomly within a confined area. When dealing with a lawn, existing autonomous robots utilize a physically defined perimeter to define the area of confinement. Examples of physically defined perimeters include a perimeter wire, reflectors, beacons and/or structural barriers, such as a fence. When all aspects of the confinement system are operating properly, these robots perform their respective tasks within the area of confinement.

In existing technologies, problems may arise with the physically defined perimeter, thereby enabling the autonomous robot to leave the desired area of confinement. Failures in physically defined perimeters may include a broken perimeter wire, a sunken perimeter wire, or a failure of a radio beacon to transmit. Among other things, these failures can lead to a damaged robot, injury to an unsuspecting person, or failed coverage. The performance of lawn mowing robots should concentrate on four measures of success: ease of use, coverage, mowing rate, and perceived effectiveness. As described above, if an autonomous robot is able to leave the desired area of confinement, the coverage will not be optimal.

Thus, a need exists for an autonomous robot that can perform a task within a confined area that is easy to use, achieves optimal coverage, operates at an acceptable speed and effectively performs its task.

SUMMARY OF THE INVENTION

The present invention is directed to an autonomous robot that performs a task within a designated area such that the autonomous robot is easy to use, achieves optimal coverage, operates at an acceptable speed and effectively performs its task.

In one aspect, the invention can be a system for monitoring operation of an autonomous robot comprising: a server; an external device having a display and a transceiver for receiving data from the server; an autonomous robot comprising a housing, a control system comprising a location tracking unit, a memory device, a transceiver for transmitting signals to the server, and a central processing unit; the central processing unit configured to: (1) define a perimeter of an area of confinement within the memory device; (2) transmit, via the transceiver of the autonomous robot, first data indicative of the perimeter of the area of confinement to the server; and (3) transmit, via the transceiver of the autonomous robot, second data indicative of a location of the autonomous robot within the area of confinement to the server based on output generated by the location tracking unit, wherein the second data is transmitted while the autonomous robot is performing a task within the area of confinement; the server configured to transmit the first data indicative of the perimeter of the area of confinement and the second data indicative of the location of the autonomous robot within the area of confinement to the external device; and wherein upon receipt of the first and second data by the external device, a visual representation of a status of a work session of the autonomous robot at a point in time T1 during the work session is displayed on the display of the external device In another aspect, the invention can be a method of monitoring operation of an autonomous robot comprising: defining, with a central processing unit of the autonomous robot, a perimeter of an area of confinement; storing the perimeter of the area of confinement within a memory device of the autonomous robot as map data; transmitting the map data from a transceiver of the autonomous robot to a server; overlaying, by the server, the area of confinement onto a satellite image corresponding to a geographic location that includes the area of confinement to create a visual representation of the area of confinement overlaid onto the satellite image; transmitting, from the server to an external device, the visual representation of the area of confinement overlaid onto the satellite image; and displaying, on a display of the external device, the visual representation of the area of confinement overlaid onto the satellite image.

In a further aspect, the invention can be a machine comprising: a housing and a control system, the control system comprising a central processing unit; a capacitive proximity sensor operably coupled to the central processing unit; wherein upon an object having a capacitance value being detected in a surrounding area of the machine while the machine is activated, the capacitive proximity sensor detects an increase in capacitance value relative to a baseline capacitance value and transmits an increased capacitance value signal to the central processing unit; and wherein upon receiving the increased capacitance value signal from the capacitive proximity sensor, the central processing unit deactivates the power tool.

In another aspect, the invention can be a system for controlling operation of an autonomous robot lawnmower comprising: an autonomous robot lawnmower comprising a housing, a transceiver, and a central processing unit; an external device in operable communication with the autonomous robot lawnmower, the external device having a transceiver for sending signals to the autonomous robot lawnmower and a display; and wherein in response to user input, the external device is configured to modify settings related to operation of the autonomous robot lawnmower.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 14l is an electrical schematic of section 14l of the control system circuit of FIG. 14;

FIG. 15 is a block diagram of a hand-held remote control circuit according to an embodiment of the present invention;

FIG. 16 is a block diagram of a charging unit circuit according to an embodiment of the present invention;

FIG. 16e is an electrical schematic of section 16e of the charging unit circuit of FIG. 15;

FIG. 17 is a schematic illustrating the communication between the autonomous robot, the docking station, a server and external devices;

DETAILED DESCRIPTION OF THE INVENTION

Figure 1:
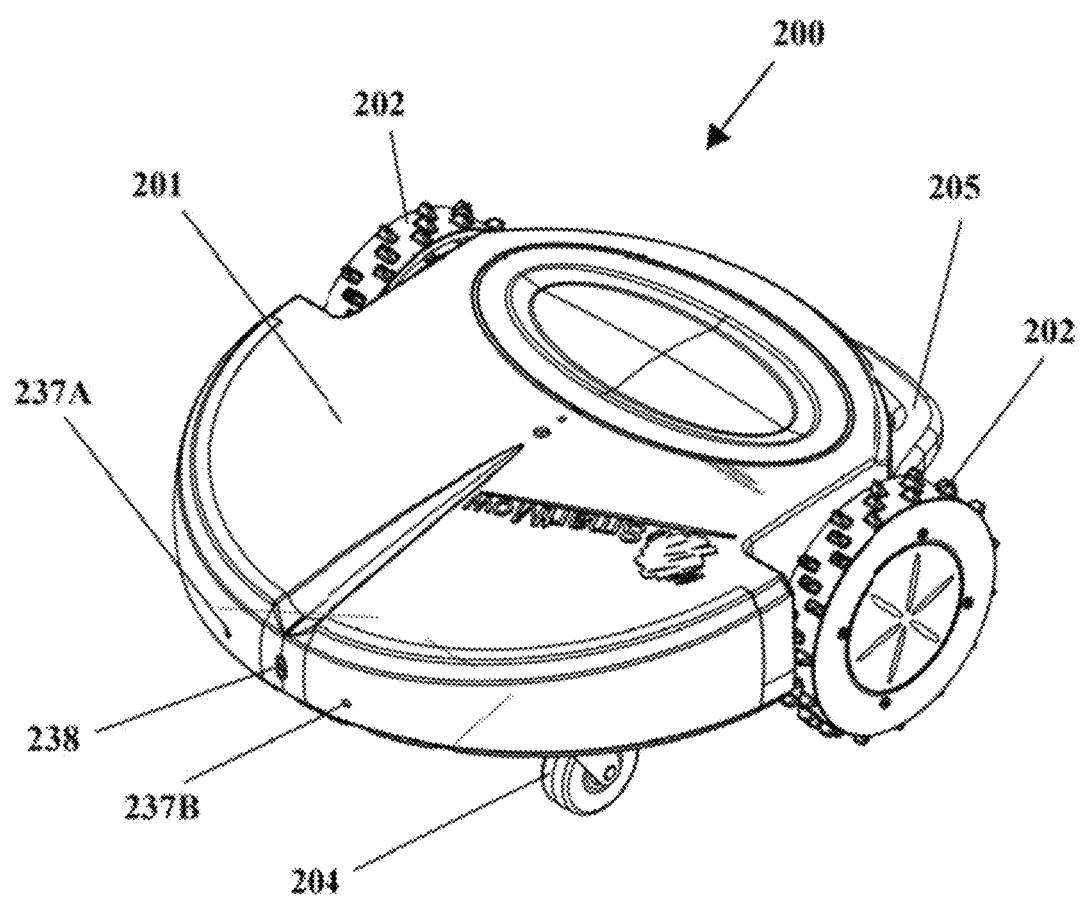
FIG. 1 is a perspective view of an autonomous robot for cutting lawns according to one embodiment of the present invention.
Figure 2:
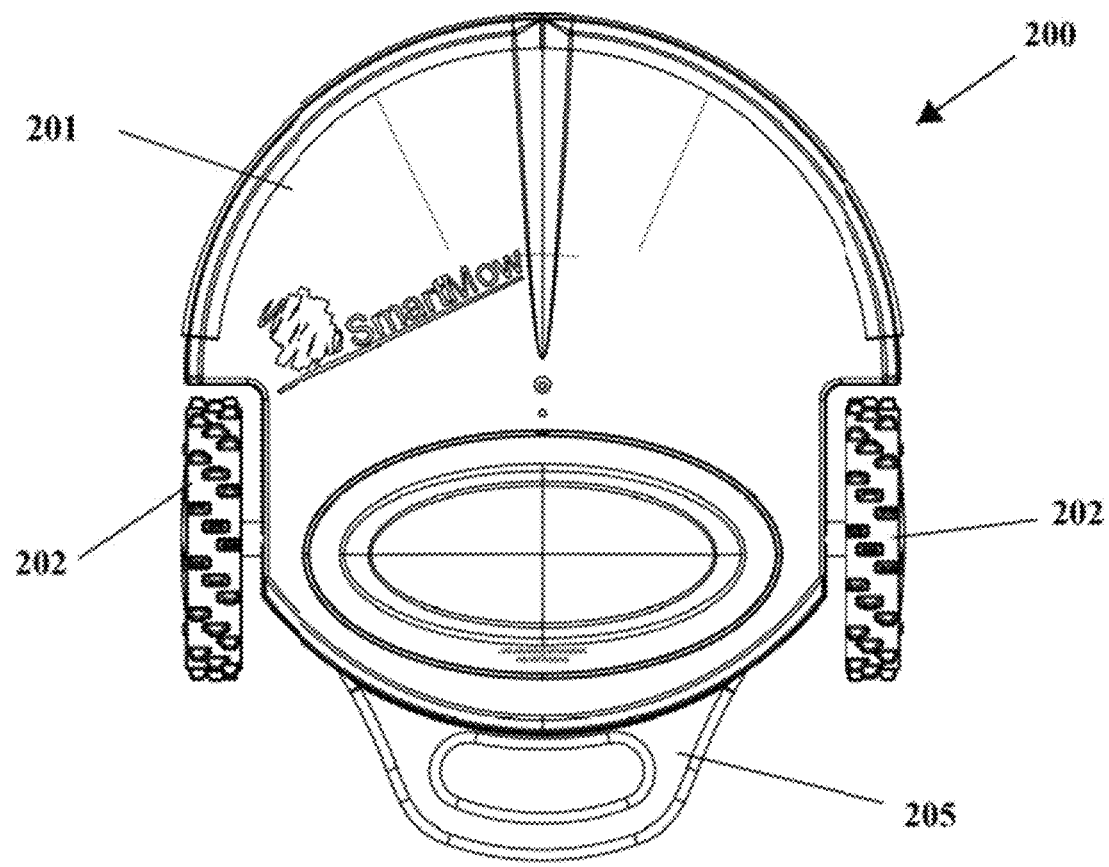
FIG. 2 is a top view of the autonomous robot of FIG. 1.
Figure 3:
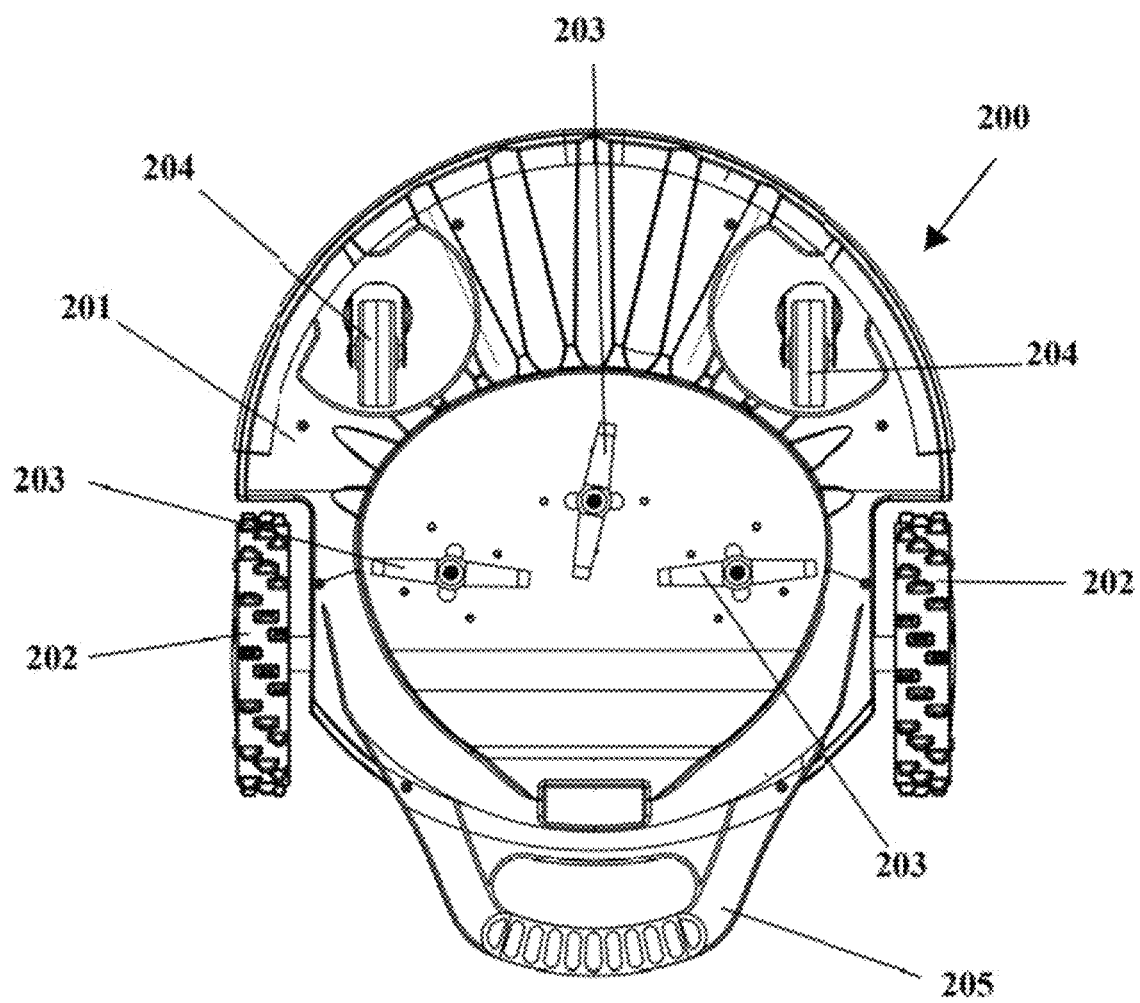
FIG. 3 is a bottom view of the autonomous robot of FIG. 1.
Figure 4:
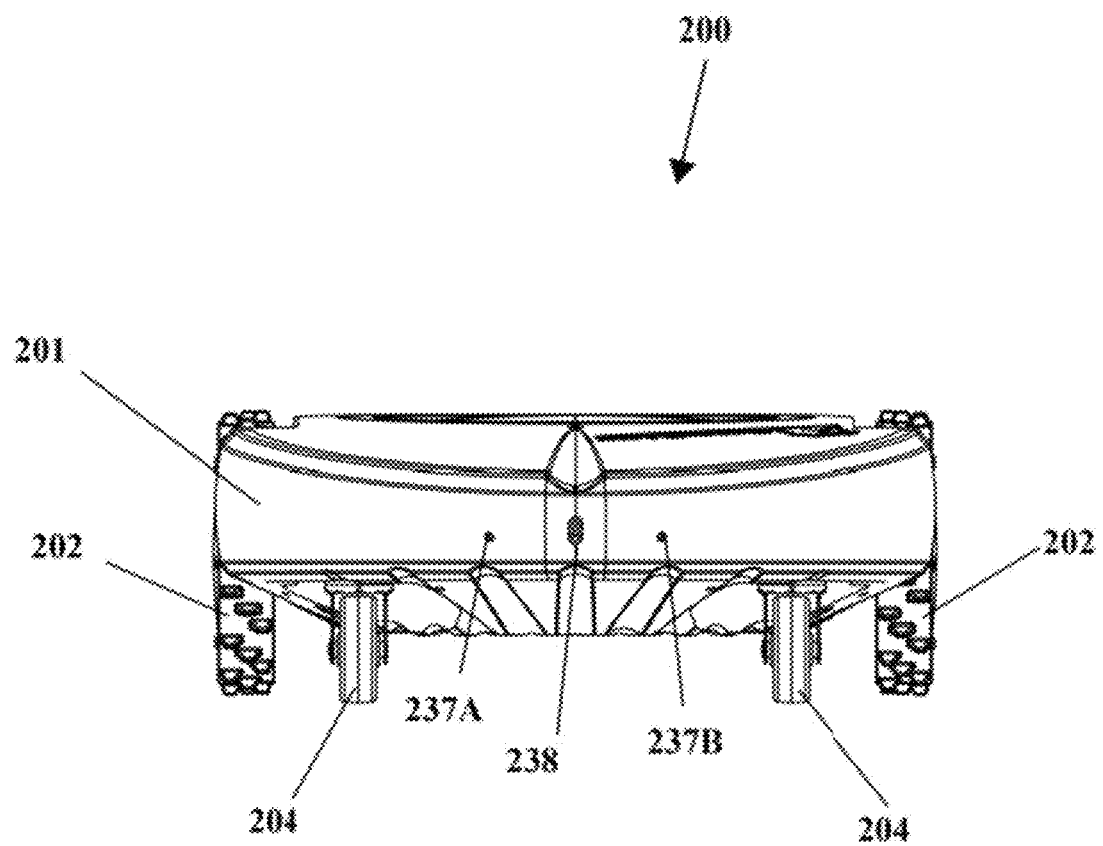
FIG. 4 is a front view of the autonomous robot of FIG. 1.
Figure 5:
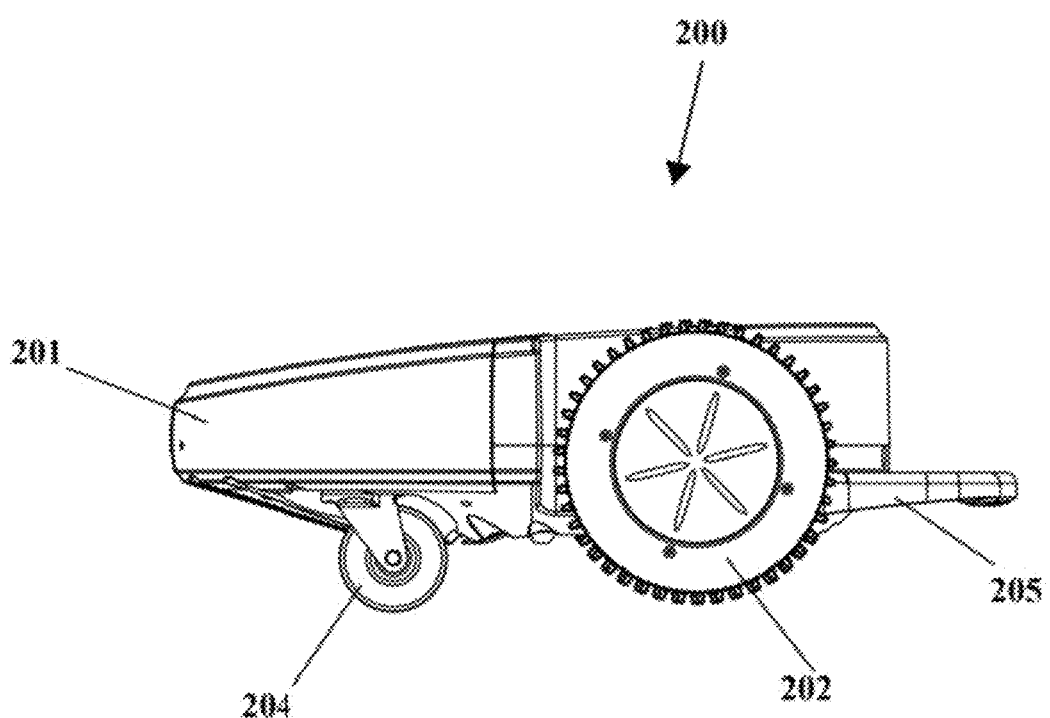
FIG. 5 is a left side view of the autonomous robot of FIG. 1.
Figure 6:
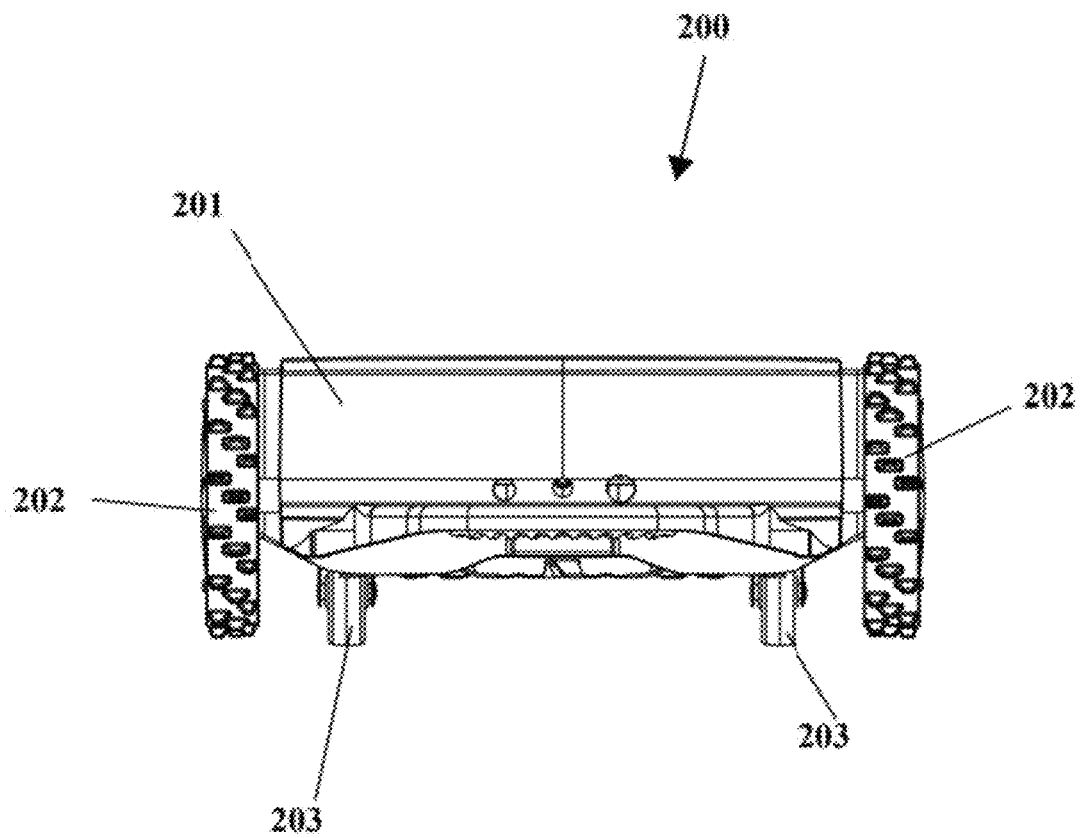
FIG. 6 is a rear view of the autonomous robot of FIG. 1.
Figure 7:
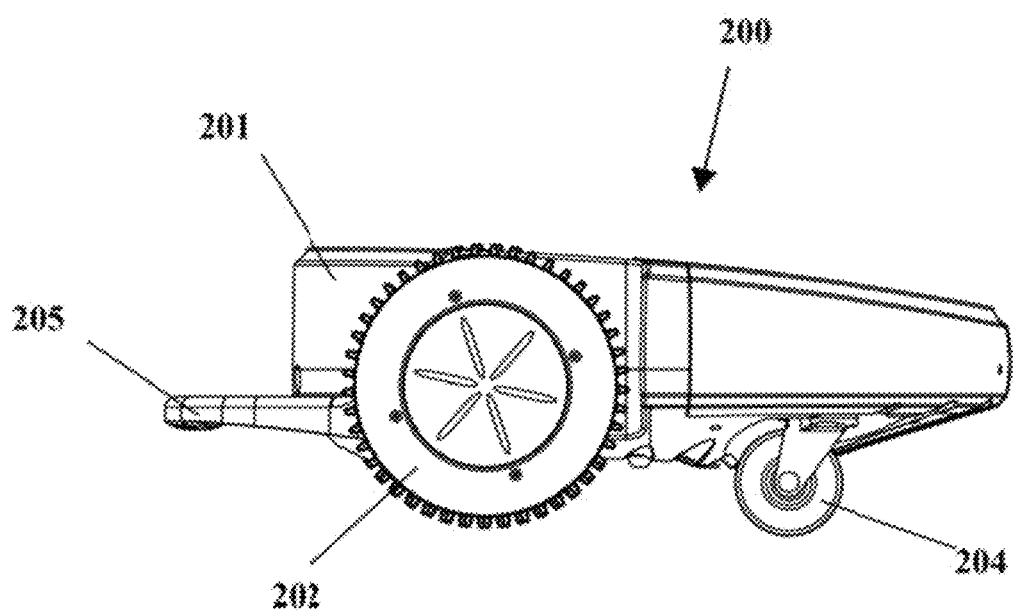
FIG. 7 is a right side view of the autonomous robot of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

Referring first to FIGS. 1-7 concurrently, an autonomous robot 200 designed for mowing a lawn is illustrated according to one embodiment of the present invention. While the invention will be described in terms of an autonomous robot designed for mowing a lawn, it is to be understood that the control system and methods described herein can be implemented into any type of autonomous machine that must perform a desired activity within a desired area of confinement, including without limitation cleaning machines (i.e., vacuum cleaners and snow plow/removal), polishing machines, repair machines, and/or demolition machines or the like.

The autonomous robot 200 generally comprises a main housing 201, a pair of drive wheels 202, grass cutting blades 203 and steering wheels 204. A handle 205 is provided on the rear end of the housing 201 for convenience of handling and/or user-initiated movement. In the exemplified embodiment, three cutting blades 203 are provided. However, more or less cutting blades 203 can be implemented as desired to adequately perform a task. Specifically, in certain embodiments wherein the autonomous robot 200 is not a lawn mower, the autonomous robot 200 may not include any cutting blades 203. The main housing 201 of the autonomous robot 200 is preferably formed from aluminum. However, the invention is not to be so limited in all embodiments and in certain other embodiments the main housing 201 of the autonomous robot 200 can be formed from any other metal or metallic alloys, plastic, wood or the like. Furthermore, in still other embodiments portions of the main housing 201 are formed from an electrically conductive material, such as aluminum, conductive paint, or any other electrically conductive material while the remainder of the main housing 201 is formed from plastic.

The main housing 201 also comprises first and second charging contacts 237A, 237B and a vision system 238. The first and second charging contacts 237A, 237B are operably coupled to a power source that is housed within the main housing 201 and are adapted for charging the power source, which provides power to the autonomous robot 200. In the exemplified embodiment, the vision system 238 is an infrared emitter and detector pair. The vision system 238 is used to detect obstacles by bouncing infrared (IR) light off of an obstacle via the emitter, and capturing the return information at the detector. The autonomous robot 200 can analyze the return information to determine the locations of various obstacles. Furthermore, in other embodiments the vision system 238 can take on other forms, such as a camera, ultrasonic transducer, or other type of vision system that is capable of receiving data that is used to detect and identify objects/obstacles.

Figure 13:
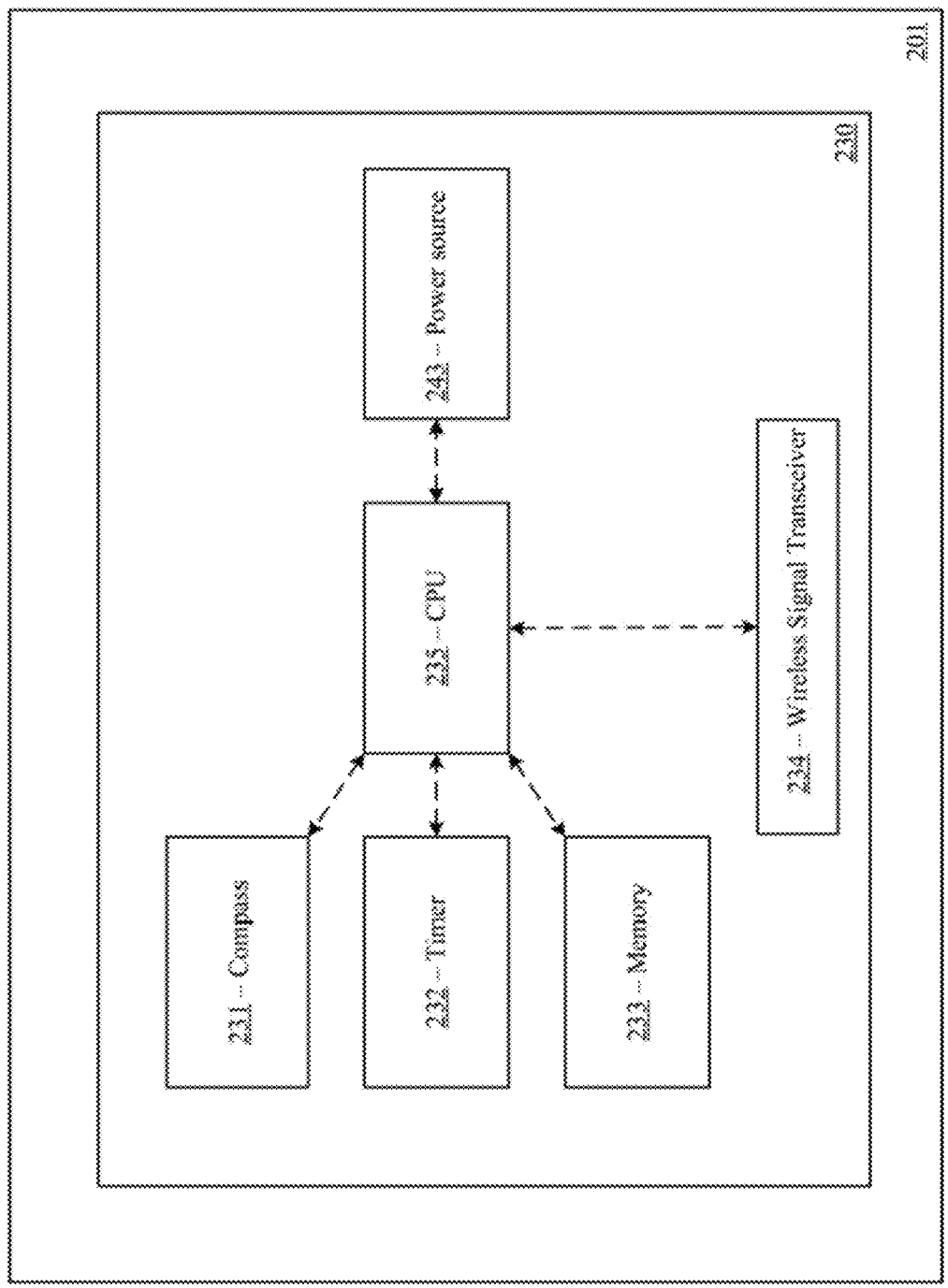
FIG. 13 is a high-level schematic of the control system of the autonomous robot of FIG. 1 according to an embodiment of the present invention.

Referring briefly to FIG. 13, the housing 201 contains all of the internal circuitry and mechanical systems necessary to operate the autonomous robot 200. Specifically, the housing 201 contains a robot control system 230 that contains all of the required internal circuitry. In the exemplified embodiment, the robot control system 230 includes a compass 231, a timer 232, an internal memory 233, a wireless signal transceiver 234, a vision system 238, and a power source 243, all of which are operably connected to a central processing unit (CPU) 235. To the extent that they are not described in detail here, the importance of the components of the robot control system 230 will become apparent from the description below.

In embodiments wherein the vision system 238 is a camera, the camera can be used to detect and categorize obstacles, which can be stored in the memory device 233 and/or a server. The location of the obstacle can be stored in the memory device 233 using any of the techniques described below. Storing the location of the obstacle in the memory device 233 enables the CPU 235 to prevent the autonomous robot 200 from maneuvering into or over the obstacle. For example without limitation, the camera may detect an obstacle as a shovel by comparing a picture of the obstacle with a database of obstacles that are stored in the memory device 233 of the autonomous robot 200. In alternative embodiments, the database of obstacles can be stored externally on a remote server that the autonomous robot 200 communicates with, as will be described in more detail below with reference to FIG. 17. The CPU 235 of the autonomous robot 200 can analyze the picture of the obstacle relative to the obstacles in the database to determine that the obstacle is a shovel. Furthermore, the CPU 235 can include pre-stored algorithms to inform the autonomous robot 200 that the shovel is a movable obstacle and may not be present at that location at all times. However, if the detected obstacle is determined by the CPU 235 to be a tree, the CPU 235 can inform the autonomous robot 200 that the tree is a non-movable obstacle and that it will be present at that location at all times. As a result, the CPU 235 can keep the autonomous robot 200 away from the obstacle as needed.

In certain embodiments, the power source 243 comprises rechargeable lithium batteries, but any other type of battery can be used. Furthermore, the power source 243 may incorporate solar power technologies or the like for powering the autonomous robot 200. Thus, the power source 243 is not to be limited to a particular type of power supply unless so specified in the claims. As noted above, the power source can be recharged via the charging contacts 237A, 237B being operably coupled to a charging station, as will be described in more detail below.

In certain embodiments, the wireless signal transceiver 234 can be a single unit, and in other embodiments the wireless signal transceiver 234 can include a separate receiver unit and transmitter unit. Preferably, the wireless signal transceiver 234 is a sensor or other data receiving/transmitting port for receiving signals from and transmitting signals to an external control unit. The tranceiver can be an IR, RF, Wi-Fi or other sensor for receiving and transmitting wired or wireless data signals. In certain embodiments, the external control unit is a docking station 300 that serves as a communication gateway between the autonomous robot 200 and a server, which will be discussed in more detail below with reference to FIG. 17.

It should be noted that the particular shape, basic features and structural details of the autonomous robot 200 are not to be considered limiting in all embodiments of the present invention, which is directed to the integrated control, mapping and operating systems and methods, unless such shapes, basic features and/or structural details of the autonomous robot 200 are specified in the claims.

Figure 8:
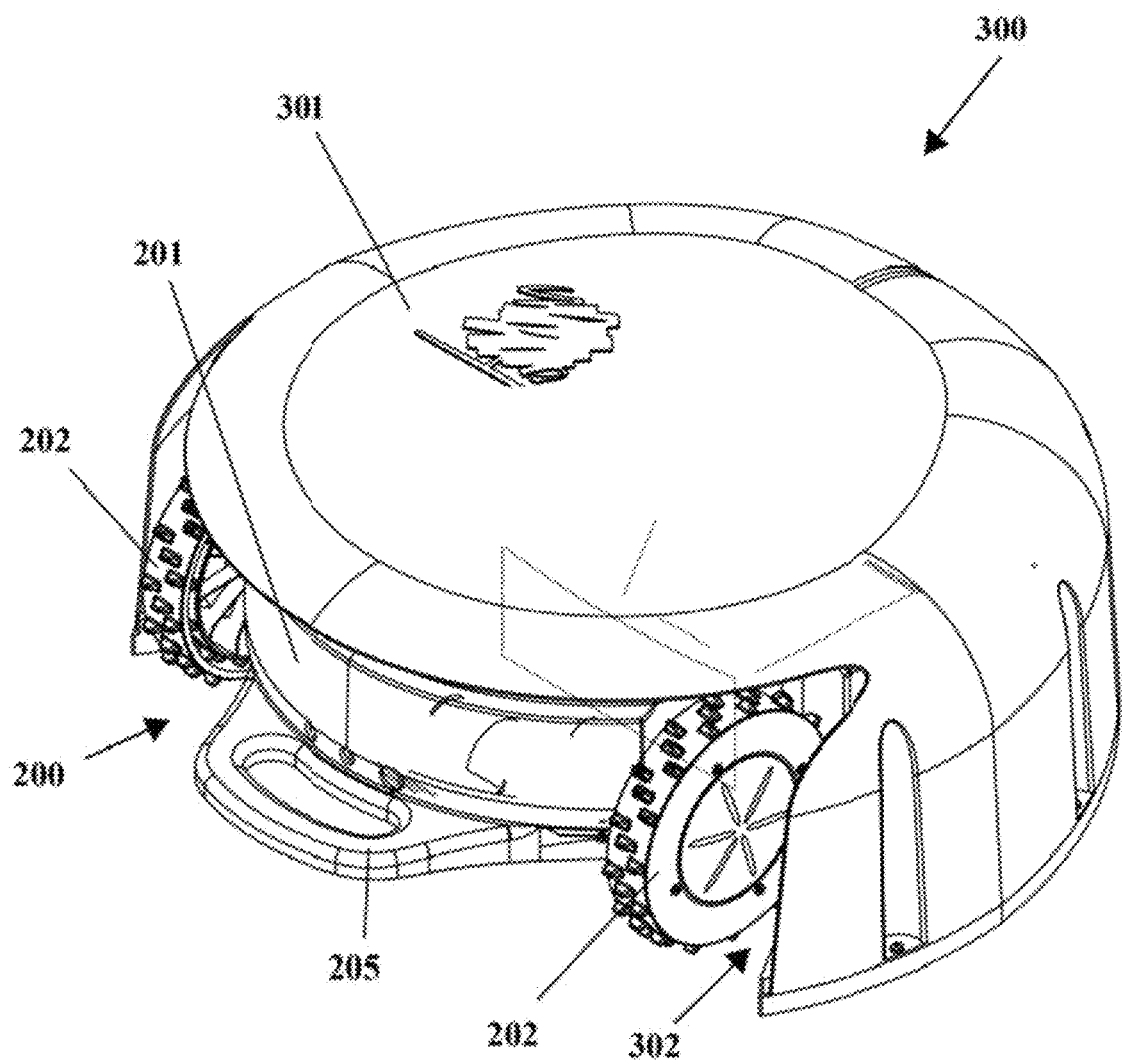
FIG. 8 is a top perspective view of a docking station according to one embodiment of the present invention with the autonomous robot of FIG. 1 positioned therein.
Figure 9:
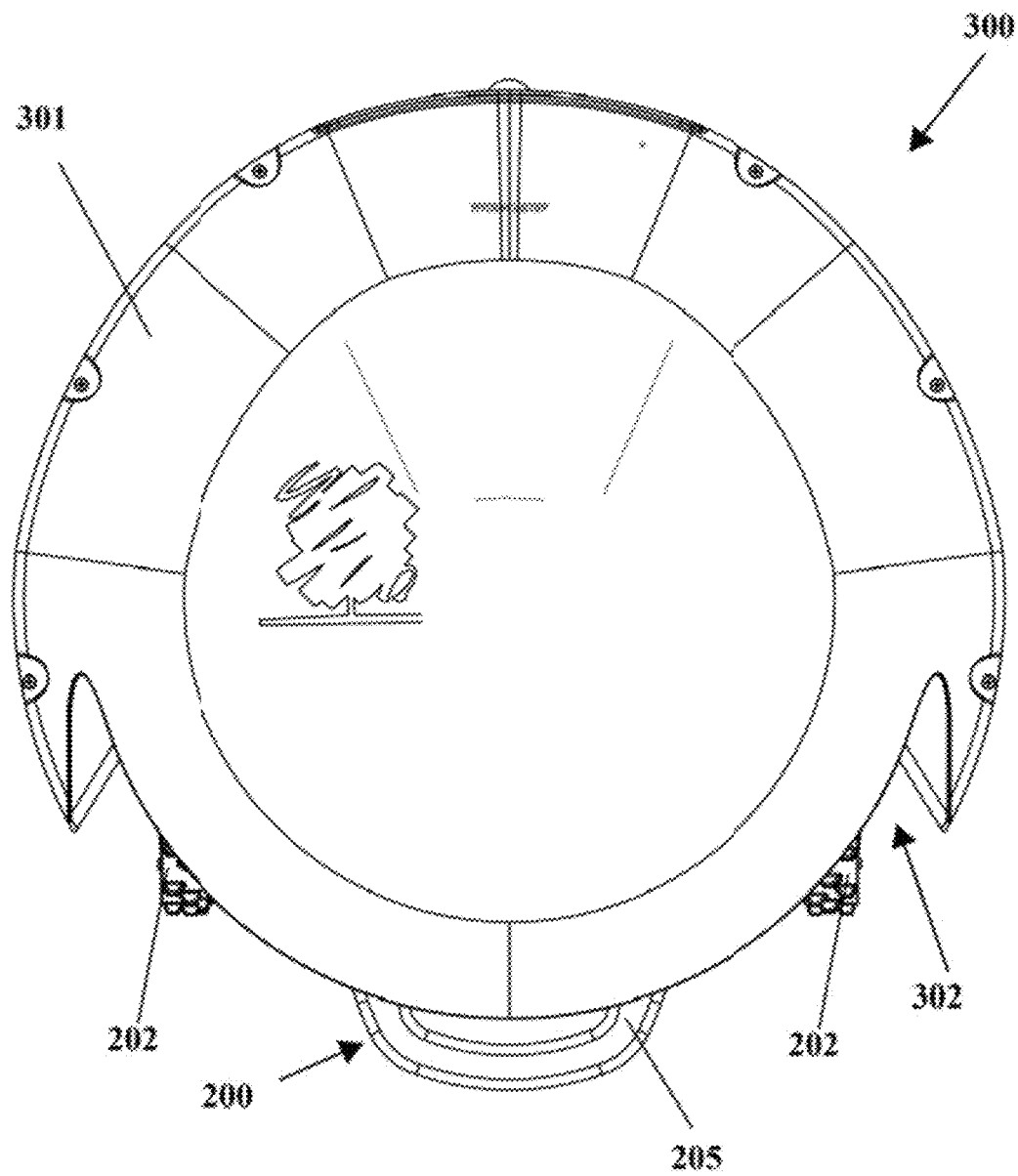
FIG. 9 is a top view of the docking station of FIG. 8.

Referring now to FIGS. 8-9 concurrently, the docking station 300 designed for use with the autonomous robot 200 is illustrated. The docking station 300 can be formed from plastic, metal, wood or any other materials that are capable of providing shelter for the autonomous robot 200 when it is stored therein. The docking station 300 provides a housing 301 for receiving the autonomous robot 200 and also serves as a reference point for the location of the autonomous robot 200 in certain embodiments as will be discussed below. An opening 302 is provided in the housing 301 through which the autonomous robot 200 can pass into the housing 301 for shelter, storage and/or charging during periods of non-use. As can be seen in FIGS. 8-9, the autonomous robot 200 can be positioned entirely within the housing 301 in a manner so that the handle 205 of the autonomous robot 200 can easily be grasped by a user so that a user can remove the autonomous robot 200 from the docking station 300 as needed. Alternatively, the autonomous robot 200 may be removed by way of the remote control or other external device or may remove itself automatically upon being turned on and activated for a mowing or other type of operating session.

If desired, the docking station 300 can incorporate a battery charging station for charging the power source 243 of the autonomous robot 200. The charging station may comprise charging contacts that are in direct contact with the charging contacts 237A, 237B of the autonomous robot 200 when the autonomous robot 200 is housed within the docking station 300. In other embodiments, the charging station may comprise indirect charging technologies, such as inductive charging such that the docking station 300 generates an electromagnetic field that can be transferred to the autonomous robot 200.

In certain embodiments, the autonomous robot 200 will electronically communicate with the docking station 300, such as via IR, RF, Wi-Fi or the like, to indicate to the docking station 300 that a charge is needed. Specifically, in one embodiment the autonomous robot 200 can transmit signals to and receive signals from the docking station 300 via the wireless signal transceiver 234 and the docking station 300 can transmit signals to and receive signals from the autonomous robot 200 via a wireless signal transceiver located within the docking station 300. The docking station 300 also preferably comprises a central processing unit for processing any data that is transmitted between the docking station 300 and the autonomous robot 200 and a server (illustrated and described below with reference to FIG. 17).

In one embodiment, when the autonomous robot 200 detects that it has a low battery via the properly programmed CPU 235, the autonomous robot 200 will send a charging signal to the docking station 300 informing the docking station 300 that it needs to recharge, at which time the docking station 300 will initiate a low power charging voltage at the charging contacts. The docking station 300 will not emit a charging voltage until it receives the charging signal from the autonomous robot 200. Thus, under normal use circumstances the docking station 300 is not emitting a charging voltage, which will prevent a user from being electrically shocked by the docking station 300. Furthermore, by only emitting a low power charging voltage prior to the autonomous robot 200 being docked within the docking station 300, any potential shock felt by a user during the time period between the autonomous robot 200 transmitting the charging signal to the docking station 300 and the autonomous robot 200 being docked within the docking station 300 will be minimal and non-threatening. Upon the autonomous robot 200 being docked into the docking station 300 after informing the docking station 300 that it needs a charge, the docking station 300 will switch to a high power voltage at the charging contacts for performing charging of the power source 243 of the autonomous robot 200. In some embodiments when the autonomous robot 200 is docked without first having indicated to the docking station 300 that it needs to recharge, the docking station 300 will not emit a charging voltage and the autonomous robot 200 will not be charged. However, in other embodiments the autonomous robot 200 is charged by the docking station 300 any time that the autonomous robot 200 is housed within the docking station 300.

Referring to FIG. 17 and as noted above, in certain embodiments the docking station 300 serves as a communication gateway between the autonomous robot and a server 400. Thus, in one embodiment the docking station 300 comprises a wireless signal transceiver (discussed above) to facilitate such communication. In the exemplified embodiment, communication between the autonomous robot 200 and the docking station 300 is achieved via RF communication, and communication between the docking station 300 and the server 400 is achieved via Wi-Fi communication. Of course, the invention is not to be so limited in all embodiments and in certain other embodiments communication between the autonomous robot 200 and the docking station 300 can be achieved through IR, Wi-Fi or the like and communication between the docking station 300 and the server 400 can be achieved via RF, IR or the like. In some embodiments, the communication between the autonomous robot 200 and the docking station 300 and the communication between the docking station 300 and the server 400 is accomplished via the same type of communication (i.e., IR, Wi-Fi, RF or the like). The docking station 300 may also broadcast a signal that aids the autonomous robot 200 in navigation.

Through the indirect communication between the autonomous robot 200 and the server 400, the server 400 is able to store and analyze position and location data that is transmitted from the autonomous robot 200 as will be described in more detail below. Furthermore, the server 400 is able to communicate with an external device, such as a personal computer 401, a smart phone 402 or any other similar device, via Wi-Fi communication. Moreover, via communication from the PC 401, smart phone 402 or other external device, a user can make changes to and manipulate the autonomous robot 200 settings by accessing the server 400 through the PC 401 or the smart phone 402 or other external electronic device. Furthermore, in certain embodiments the PC 401, smart phone 402 or other external electronic device can operate as a remote control to control movement of the autonomous robot 200 as will be described in more detail below.

Figure 10:
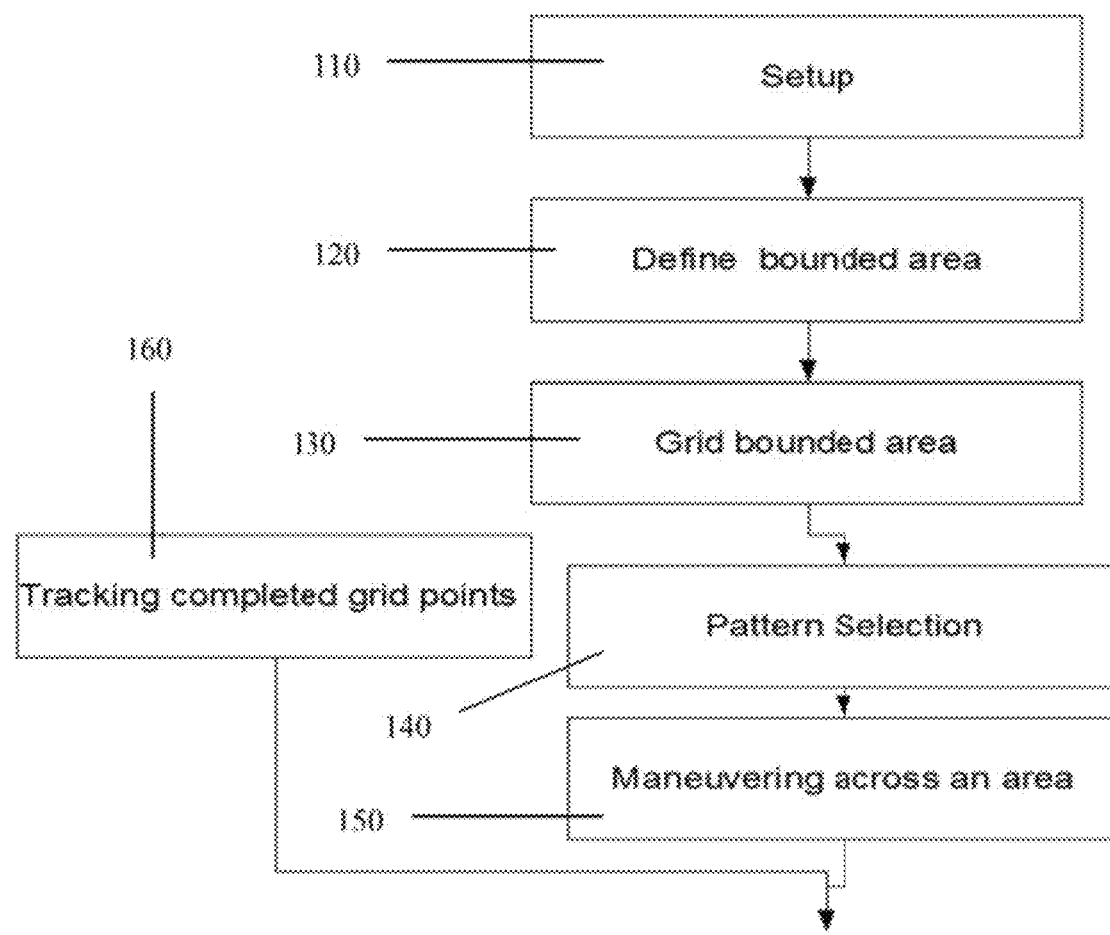
FIG. 10 is a flowchart of the steps that may be used to operate the autonomous robot of FIG. 1 according to one embodiment of the present invention.

Referring now to FIG. 10, a control schematic for the various modes for controlling the movement and operation of the autonomous robot 200 is illustrated. The various modes of the autonomous robot 200 dictate the processes and calculations involved in preparing the autonomous robot 200 for use as well as for actually using the autonomous robot 200. The various modes of the autonomous robot 200 include a Setup/Perimeter Mapping Mode 110, an Exclusion Area Mode, a Pattern Selection Mode 140 and an Operational Mode 150. Of course, the invention is not limited to having the four modes mentioned above and it may contain more or less than the four named modes as appropriate for its intended purpose. Each of the named modes will be discussed below with reference to FIGS. 10-12.

In one exemplified embodiment, the autonomous robot 200 has an integrated control system 230 (FIG. 13) that maps and stores a perimeter of a desired area of confinement 220 by relating its current position to an established starting point of the autonomous robot 200 as will be discussed below. The desired area of confinement 220 is the area within which the autonomous robot 200 is intended to perform its task. During the Setup Mode described below, the autonomous robot 200 is trained so that the autonomous robot 200 does not exit the area of confinement 220 during operation. In certain embodiments, when in use the autonomous robot 200 is able to stay within the defined perimeter of the desired area of confinement 220 by monitoring and mapping its own location with respect to the stored perimeter at all times. The docking station 300 discussed above may act as the starting/zero point for mapping the perimeter and/or resetting the present location of the autonomous robot 200.

The first sequence in preparing the autonomous robot 200 for use in a new environment is for the user to go through the Setup Mode 110, which as discussed in detail below, results in the definition of the area of confinement (step 120). The Setup Mode 120 is initiated by switching the autonomous robot 200 to the setup mode by manipulating a mechanical switch or an internal electrical signal switch that activates the CPU 235 within the robot control system 230 of the autonomous robot 200 to retrieve the setup commands and program sequencing which are stored in the internal memory device 233. Initiating the Setup Mode 120 can also be achieved by transmitting a signal to the autonomous robot 200 via remote control or any other external device as has been described above.

The operational sequences of the Setup Mode in accordance with one embodiment of the present invention will be described in greater detail with reference to FIGS. 10-12 concurrently. The Setup Mode is used to define the area of confinement 220 (also referred to herein as the operational perimeter or the bounded area) within which the autonomous robot 200 will perform its task (e.g., lawn mowing, floor cleaning, etc.). Prior to activating the Setup Mode, the autonomous robot 200 is positioned at a point $P_0$ along the desired perimeter 220 and oriented facing the desired direction of travel. In the exemplified embodiment (see FIG. 12), this point coincides with the location of the docking station 300.

Once in the desired position, a record starting point ("RSP") signal is sent to the robot control system 230 via the hand-held remote control or a Wi-Fi interface device (or by the activation of a button on the autonomous robot 200) indicating that the autonomous robot 200 is in the desired starting position/location. This RSP signal is generated by activating the proper control on the interface of the remote control or Wi-Fi interface device or can be automatically generated upon switching into Setup Mode. As a result of receiving this RSP signal, the robot control system 230 records this location as the starting point $P_0$ in its internal memory 233 (which acts as the internal point of reference).

Figure 12:
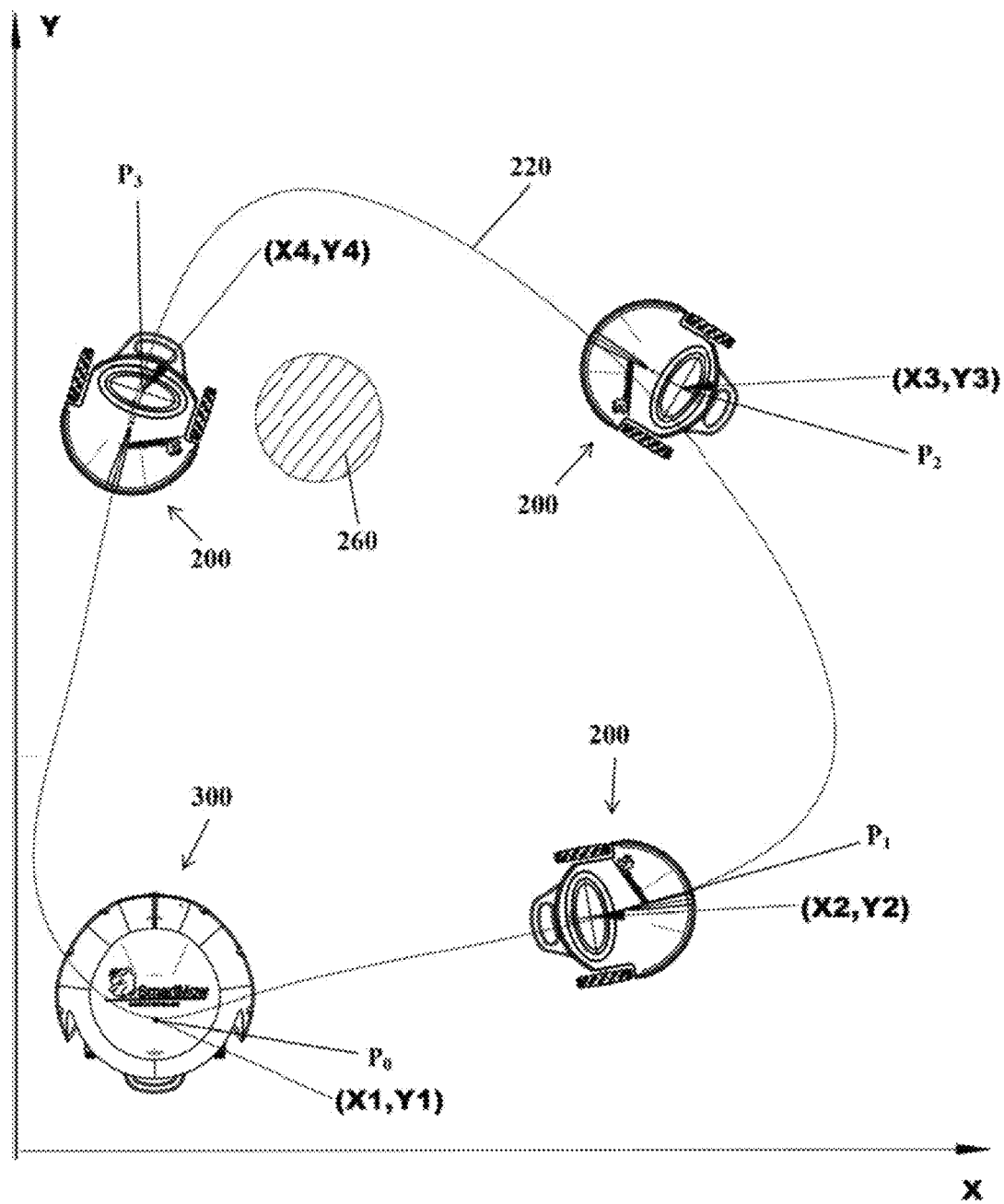
FIG. 12 is a schematic of the autonomous robot of FIG. 1 performing a coordinate mapping function to define the desired area of confinement within which the autonomous robot will perform its task.

Referring solely to FIG. 12, the starting point $P_0$ may be recorded by the robot control system 230 as a coordinate in an XY or X$\theta$ coordinate system. For example, the starting point $P_0$ may be recorded by the robot control system 230 as the Cartesian coordinate (0, 0) which will then become the relative reference point upon which all subsequent locations are based. As shown in FIG. 12, as the autonomous robot 200 maneuvers across the perimeter 220, the robot control system 230 will continuously record its location as a coordinate in an XY plane. Although FIG. 12 illustrates the robot control system 230 recording four coordinates around the perimeter, in this embodiment the robot control system 230 is actually constantly recording the coordinates to the internal memory 233 so that the perimeter 220 can be mapped on an XY plane.

Referring again to FIGS. 10-12 concurrently, it should be noted that while the starting point $P_0$ is preferably a position located on the perimeter 220 for simplicity and ease of computing, it is possible for the starting point $P_0$ to be offset from the perimeter 220. In such a scenario, the CPU 235 of the robot control system 230 can be programmed to detect that the starting point $P_0$ was not a point on the perimeter 220 upon detecting that a closed-geometry has been formed (discussed below) that does not include the starting point $P_0$. Additionally, while the autonomous robot 200 is preferably positioned at the starting point $P_0$ prior to activating the Setup Mode, the autonomous robot 200 can be in a different position and moved to the desired starting point $P_0$ subsequent to the initiation of the Setup Mode. In this scenario, the RSP signal will be generated by the user as desired, but preferably when the autonomous robot 200 is positioned along the perimeter 220.

It should be noted that the closed-geometry may be any shape that forms an enclosed boundary, such as a polygon. Of course, the closed-geometry can be shapes other than polygons, such as circles, ovals or other enclosed shapes with curved sides, linear sides, rounded sides, and/or combinations thereof.

Furthermore, in order to ensure proper coverage and geographic containment of the autonomous robot 200 in the event that the autonomous robot 200 must be reset (explained in greater detail below), it may be preferable that the position of the docking station 300 coincide with the location of the starting point $P_0$ (FIG. 12).

Once the starting point $P_0$ is established (i.e., recorded and mapped in the memory 233), the user activates movement of the autonomous robot 200 in a desired direction about the perimeter 220. The user directs the autonomous robot 200 around the perimeter 220 with a remote control or Wi-Fi interface (i.e., external device) which enables the user to move and steer the autonomous robot 200 in a desired direction. As the autonomous robot 200 moves along the perimeter 220, the autonomous robot 200 tracks and records its own location (and direction of movement) internally via the robot control system 230.

The autonomous robot 200 preferably tracks and records its location with the use of the compass 231 and the timer 232. The compass 231, which is located within the autonomous robot 200 and is operably coupled to the CPU 235, provides a direction/bearing for the movement of the autonomous robot 200 at all times. Of course, the autonomous robot 200 need not have the compass 231 and other directional indicating instruments as would be known to persons skilled in the art may be used in lieu of the compass 231.

The timing of the movement of the autonomous robot 200 along the established bearing/direction is measured by the timer 232, which is also operably coupled to the CPU 235. Of course, the autonomous robot 200 does not need to have the timer 232 and other sensors or mechanisms for monitoring electrical signal characteristics may be used instead of the timer 232. In the preferred embodiment, the timer 232 acts as a distance-traveled measuring mechanism.

The timer 232 is an effective distance-traveled measuring mechanism. For example, if the autonomous robot 200 is programmed and designed to ensure travel at a constant velocity, the timer 232 can record the time traveled in any one direction (as measured by the compass 231) based on the relationship: $D=V*t$, wherein D is distance traveled, V is velocity and t is time elapsed. If the direction of travel is changed, the traveled vector can be recorded and the mapping of the subsequent vector will begin until a closed-geometry is formed. Of course, it should be appreciated that in certain embodiments the autonomous robot 200 does not travel at a constant velocity, certain embodiments of which will be discussed in more detail below.

Figure 11:
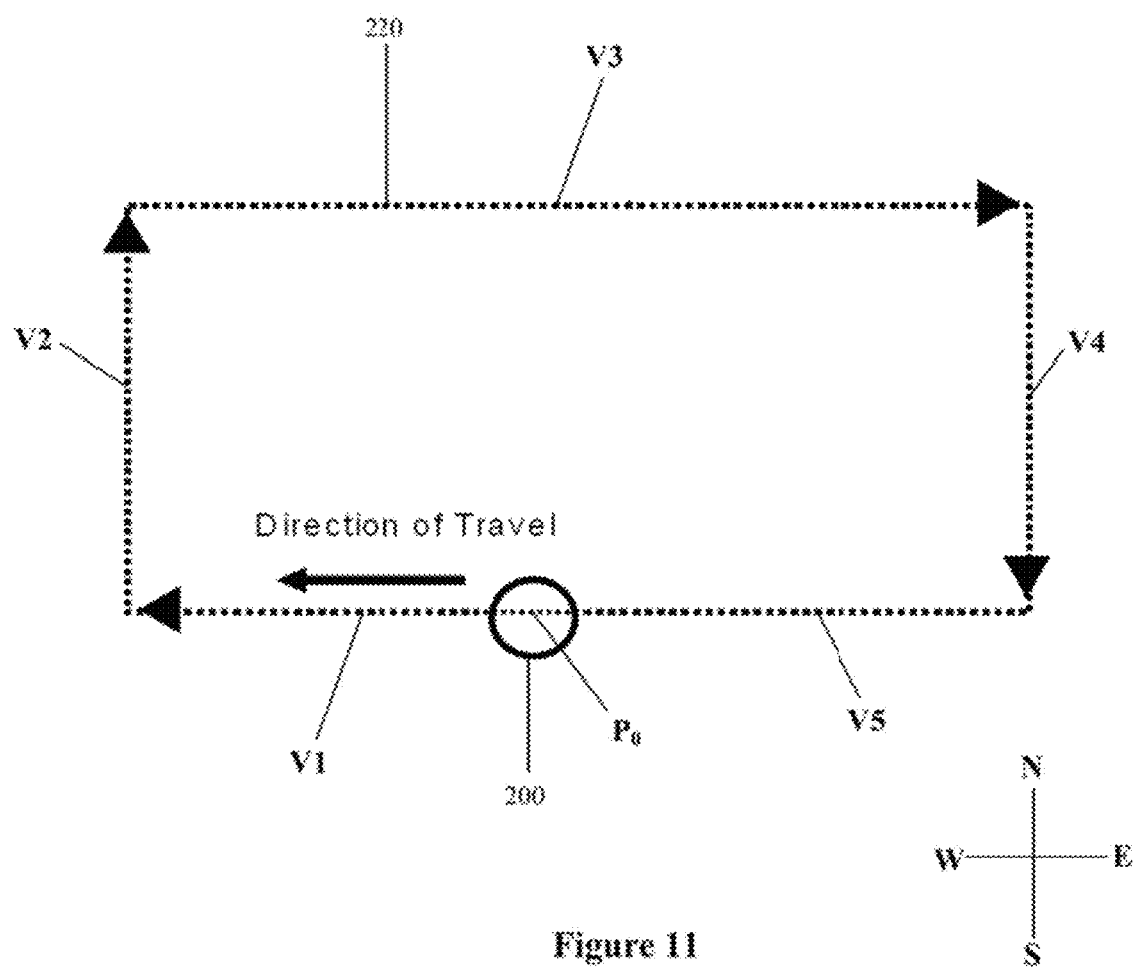
FIG. 11 is a schematic of the autonomous robot performing a perimeter mapping function to define the desired area of confinement within which the autonomous robot will perform its task.

In the exemplified embodiment illustrated in FIG. 11, the autonomous robot 200 is designed to move at a constant velocity (the value of which is stored in the CPU 235). As a result, the CPU 235 is able to calculate the distance and direction which the autonomous robot 200 has traveled during this first period of movement based on the signals from the timer 232 and the compass 231. In other words, the CPU 235 will calculate and map the current location of the autonomous robot 200 with respect to the starting point $P_0$ and record the appropriate data in the memory 233. In the illustrated example, the first period of movement results in the CPU 235 mapping a first vector V1 having a distance value and an angle. The mapping/recording of any single vector or positional update by the CPU 235 can be continuous, periodical or initiated by a substantial change in direction/bearing of the autonomous robot 200.

Once V1 is mapped, the user continues moving and steering the autonomous robot 200 about the desired perimeter 220, thereby resulting in the CPU 235 mapping and recording the remaining vectors V2-V5 based on the information provided by the timer 232 and the compass 231. Of course, a Cartesian coordinate mapping scheme, as discussed above with reference to FIG. 12, can be used by the CPU 235 to the same effect.

As should be apparent to those skilled in the art, through the combined use of a directional indicating instrument (compass 231) and a distance-traveled measuring mechanism (timer 232), the autonomous robot 200 can, at all times, be aware of its location with respect to the starting point $P_0$. While the directional indicating instrument is preferably a compass, other devices can be used. Moreover, while the distance-traveled measuring mechanism is exemplified as a timer 232 and constant velocity drive, a variety of sensors, mechanisms for monitoring electrical signal characteristics and/or timers can be used to determine the distance traveled by the autonomous robot 200, and in certain embodiments the autonomous robot 200 need not travel at a constant velocity. For example, a sensor or encoder can be operably connected to the axle or wheel to record revolutions, which through simple mathematical relationships, can be correlated to the distance traveled so long as the radii of the drive wheels 202 are known. Moreover, it should be noted that it is not necessary for the autonomous robot 200 to move at a constant velocity in order to map the vectors, so long as the CPU 235 is aware of the velocity at substantially all moments, and the time durations thereof. Of course, averaging and differentiation techniques can also be used.

Any of the aforementioned computations of distance can take into account changes and/or variations in velocity, acceleration, bearing and/or combinations thereof experienced by the autonomous robot 200 in real world conditions. Other variables, such as wheel slippage, obstruction, and/or delay, can also be taken into consideration in computing the distance. In one preferable embodiment, wheel slippage, obstruction, and/or delay can be measured by monitoring the current usage of the drive motors. All of the information relating to the variables can be stored in the internal memory 233 and retrieved by the CPU 235 on an as-needed basis.

In certain embodiments, the compass and distance measurements can be replaced or supplemented with other apparatus used in precise navigation that can be adapted to the use of the autonomous robot 200. A first example includes the detection of signals from a plurality of satellites in orbit around the planet Earth, such as Global Positioning System (GPS), Global Navigation Satellite System (GLONASS), Galileo or similar satellite signals that broadcast time or navigational measurements using a receiver. An embodiment that incorporates GPS will be described in more detail below with reference to FIGS. 18 and 19.

Alternatively, the compass and distance measurements can be replaced or supplemented with other apparatus used in triangulation that can be adapted to the use of the autonomous robot 200. A first example includes the detection of signals from a plurality of radio beacons that broadcast navigational data placed around the perimeter of the area of interest. The compass and distance measurements may be processed on a host computer (i.e., server 400) connected to the autonomous robot 200 over a wireless connection to the Internet.

In another preferred embodiment two sources of navigational measurements are used to improve navigational accuracy. A first example includes differential correction of navigational measurements where one source of navigational measurements transmits corrected information to the second source of navigational measurements using radio signals, such as in the art and practice of differential GPS (DGPS) described in more detail below.

With that said, once the autonomous robot 200 finishes travel along vector V5 ending up back at the starting point $P_0$, the CPU 235 either automatically recognizes that a closed-geometry has been formed (through proper programming) or the user activates a compute closed perimeter ("CCP") signal that is received by the CPU 235 by activating the proper button on the interface of the remote control, PC, PDA, Smart Phone or other external device. Using the docking station 300 at the desired starting point $P_0$ provides a reliable way of ensuring that the autonomous robot 200 ends back at the starting point $P_0$ after its journey about the desired perimeter 220.

Once the creation of a closed-geometry is recognized, the user will be prompted to confirm that the desired perimeter 220 has been established. In one embodiment, the remote control or other external device may have a display which displays the map created by the CPU 235. In another embodiment, the autonomous robot 200 may connect to the PC, PDA, Smart Phone or other external device via Wi-Fi which displays the map created by the CPU 235 (as has been described above with reference to FIG. 17). This allows the user to get a general idea of whether the perimeter mapping sequence was a success. After the closed-geometry is recognized and/or approved, the CPU 235 will record the mapped perimeter 220 and use it as the limitations of its area of confinement during a work session. In a preferred embodiment, the autonomous robot 200 serves as a lawn mower and the defined area of confinement 220 surrounds a yard.

In one preferred embodiment, the user may program the autonomous robot 200 with multiple perimeters in which the autonomous robot 200 will travel to each perimeter and use it as the limitations of its area of confinement during a work session. This allows the autonomous robot 200 to travel between different parts of a lawn, for example, front and back yards.

Referring back to FIG. 10, after the robot control system 230 defines the area of confinement 220 through either a vector or coordinate mapping scheme, step 120 is complete. The robot control system 230 then translates the area within the perimeter to a grid and grids the area of confinement 220, thereby completing step 130.

After completion of defining the area of confinement 220 of step 130 utilizing one of the techniques disclosed herein above, the next step is for the user to select a pattern that will define the behavior of the autonomous robot 200 while traveling inside the defined perimeter 220 while performing its task. Possible patterns include random, semi-random, or specific patterns whereby the autonomous robot 200 may travel in stripes, circles, squares, or any other pre-specified pattern. In one embodiment, the CPU 235 may calculate a number of possible patterns based on the application of pre-programmed algorithms to that particular defined perimeter 220. In another embodiment, the pattern may be transmitted to the autonomous robot 200 via a PC, PDA, Smart Phone or other external device. Once the pattern has been determined, step 140 is complete.

Once the pattern has been selected by the user, the autonomous robot 200 is put into operational mode where it begins the step of maneuvering across an area defined by the area of confinement 220, thereby completing step 150. Robot control system 230 may use the boundary information, robot dimensions (cutting width), and exclusion information to generate a grid or map that indicates where the autonomous robot 200 should travel, should not travel or has already traveled. This includes the step of tracking completed grid points (step 160). With all of this information stored in the internal memory 233 of the robot control system 230, the robot control system 230 navigates the autonomous robot 200 inside the boundary 220 according to the selected pattern.

As noted above, the robot control system 230 can also store exclusion information for use in directing the autonomous robot 200. In some embodiments, in order to input exclusion information into the robot control system 230, the user sets the device to the Exclusion Area Mode by activating a manual, internal or electronic switch. In this mode, the user can define exclusion zones, or portions within the defined area of confinement 220 that the user does not want the autonomous robot 200 to travel (e.g., trees, decks, flower beds, playground equipment).

In order to create these exclusion points, the user initially positions the autonomous robot 200 at a starting point and initializes the Exclusion Area Mode. Initialization may take place either by sending a signal to the robot control system 230 (via the remote control or other Wi-Fi device) or it may automatically occur by positioning the autonomous robot 200 at a location within the area of confinement and then setting the autonomous robot 200 to the Exclusion Area Mode. Next, through use of the remote control or other Wi-Fi device, the user moves/drives the autonomous robot 200 around the area of exclusion (i.e. around a tree, around a deck, or around a garden, illustrated generically as a circle 260 in FIG. 12).

In certain embodiments, the robot control system 230 will continuously monitor and store the location of the autonomous robot 200 while the autonomous robot 200 is in the Exclusion Area Mode to accurately define the excluded areas. However, in other embodiments the user will initiate or generate a record location point signal to the autonomous robot 200 when the autonomous robot 200 is located at particular locations at which the autonomous robot 200 should store the location into its memory 233 while in the Exclusion Area Mode, similar to the Setup Mode techniques illustrated and described below with regard to FIG. 19. In such embodiments, the memory 233 will store the longitude and latitude of the desired points, and the CPU 235 will generate a closed-geometry based on the set number of stored latitude-longitude coordinates. The CPU 235 will then generate a map of the exclusion areas based on a set number of data points that surround and/or enclose the excluded area. Thus, in a similar fashion to generating the perimeter of the area of confinement 220 utilizing GPS technology as will be described below with regard to FIGS. 18 and 19, the exclusion areas can be defined.

The user can define additional exclusion zones by repeating this step at different locations within the defined area of confinement until satisfied. When in the exclusion mode, the robot control system 230 performs a mapping function similar to that discussed above with respect to the Setup Mode but instead uses the defined or generated closed-geometry to define an area of exclusion in which the autonomous robot 200 will not be allowed to travel. The robot control system 230 then knows to direct the autonomous robot 200 to steer clear of the exclusionary zones and to focus on performing its task elsewhere (within the perimeter 220).

During the Operational Mode, the robot control system 230 uses the boundary information, the robot dimensions, such as, for example, the cutting width, exclusion area information and selected course pattern information to generate a grid or map and path that indicates where the autonomous robot 200 should travel. Using all of this information, the autonomous robot 200 is able to perform a desired task within a area of confinement as desired.

Additionally, the robot control system 230 is able to detect when the autonomous robot 200 has completed its task or has a low battery. The robot control system 230 is constantly aware of the location of the autonomous robot 200 within the defined area of confinement 220 by coordinates or other mapping techniques as discussed above. As such, the robot control system 230 is able to prevent the autonomous robot 200 from leaving the defined area of confinement 220 and guide the autonomous robot 200 to other area of confinements and back to the point $P_0$. For example, the robot control system 230 may direct the autonomous robot 200 to return to the docking station 300 for docking or recharging and then direct the autonomous robot 200 back to the point $P_0$.

In certain embodiments of the present invention, the robot control system 230 uses a Secure Pin to activate the autonomous robot 200. This Secure Pin may serve as a theft deterrent to prevent the unauthorized use or possession of the autonomous robot 200. In order to further prevent theft of the autonomous robot 200, the robot control system 230 may connect to a PC 401, PDA, or Smart Phone 402 via Wi-Fi as has been described herein above. When so connected, the robot control system 230 sends registration information such as location (based on IP address), diagnostic information (i.e. state of health), and other information to the server 400. This information may prove helpful in identifying a stolen autonomous robot 200 and in determining how parts are failing.

The robot control system 230 is also able to detect which portions within the defined area of confinement 220 have already been traversed by the autonomous robot 200 during a cutting session. Thus, if the autonomous robot 200 needs to be recharged in the middle of a lawn cutting session, the autonomous robot 200 can automatically bring itself to the docking station 300 for recharging and then continue its job from where it left off once its batteries are recharged.

In the event that the autonomous robot 200 is traveling outside of the defined perimeter 220 or having other "location awareness" difficulties, the control system 230 would also be programmed with a "reset" feature that could be activated automatically by the autonomous robot 200 or user. In such a situation, the user would return the autonomous robot 200 to the point $P_0$ and activate the reset feature. This "reset" would automatically reset the perceived location of the autonomous robot 200 to the point $P_0$ without erasing the defined perimeter or exclusion areas.

In the event the autonomous robot 200 is traveling outside the defined perimeter and detects that it is being "carried" without the secure pin first having been entered, then the autonomous robot 200 will activate a security alarm and transmit its GPS location (using a location tracking unit or GPS unit) back to the docking station 300. The docking station 300 will send this information to the server 400. The server 400 will e-mail the user with information indicating that the autonomous robot 200 may have been stolen, and will provide the user with the GPS location of the autonomous robot 200. In some embodiments, the autonomous robot may communicate with neighboring docking stations to transmit security information. In some embodiments, the autonomous robot 200 may communicate with neighboring docking stations to obtain corrected navigational information i.e. GPS correction data.

Figure 18:
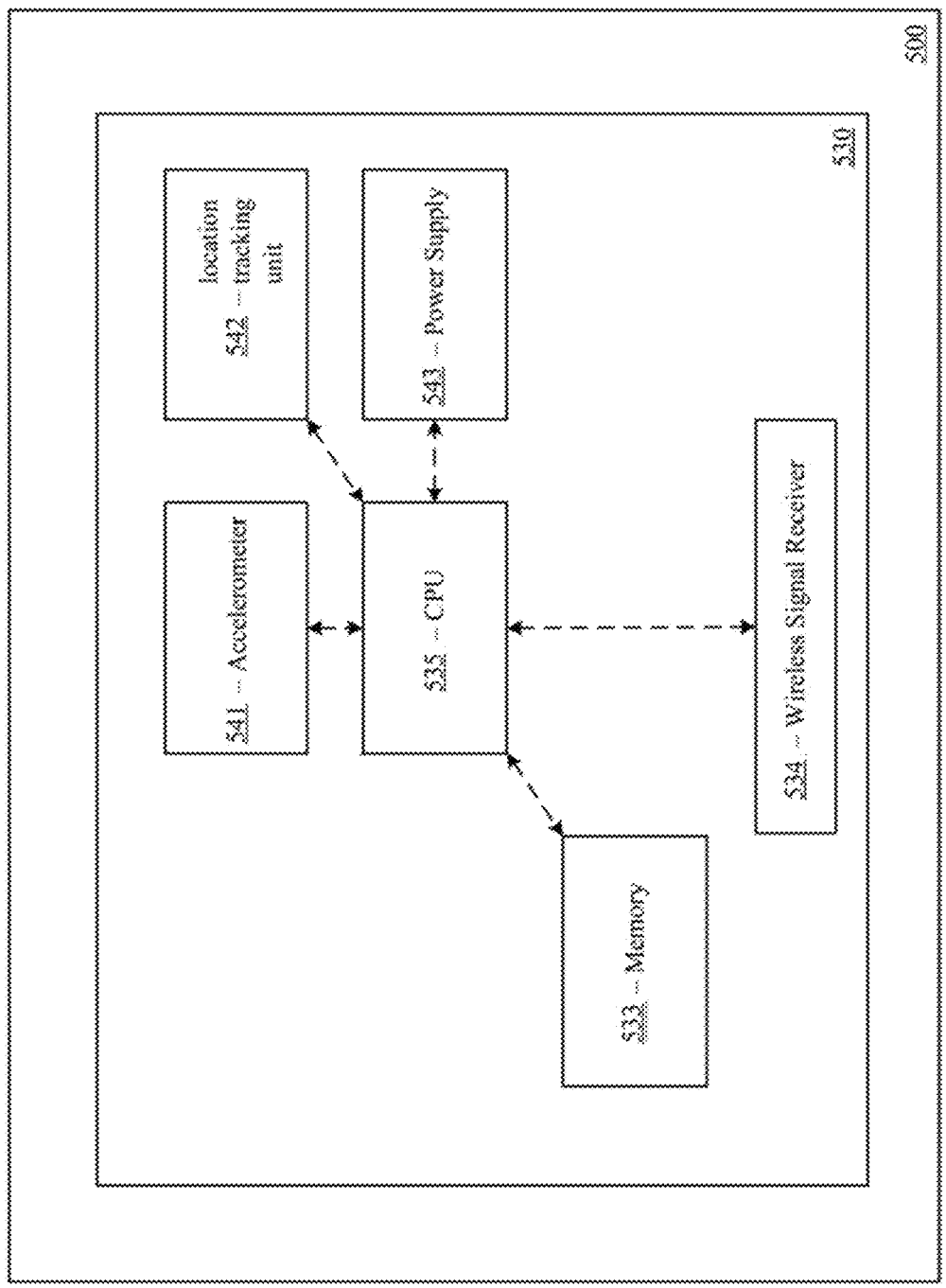
FIG. 18 is a high-level schematic of the control system of an autonomous robot according to another embodiment of the present invention.
Figure 19:
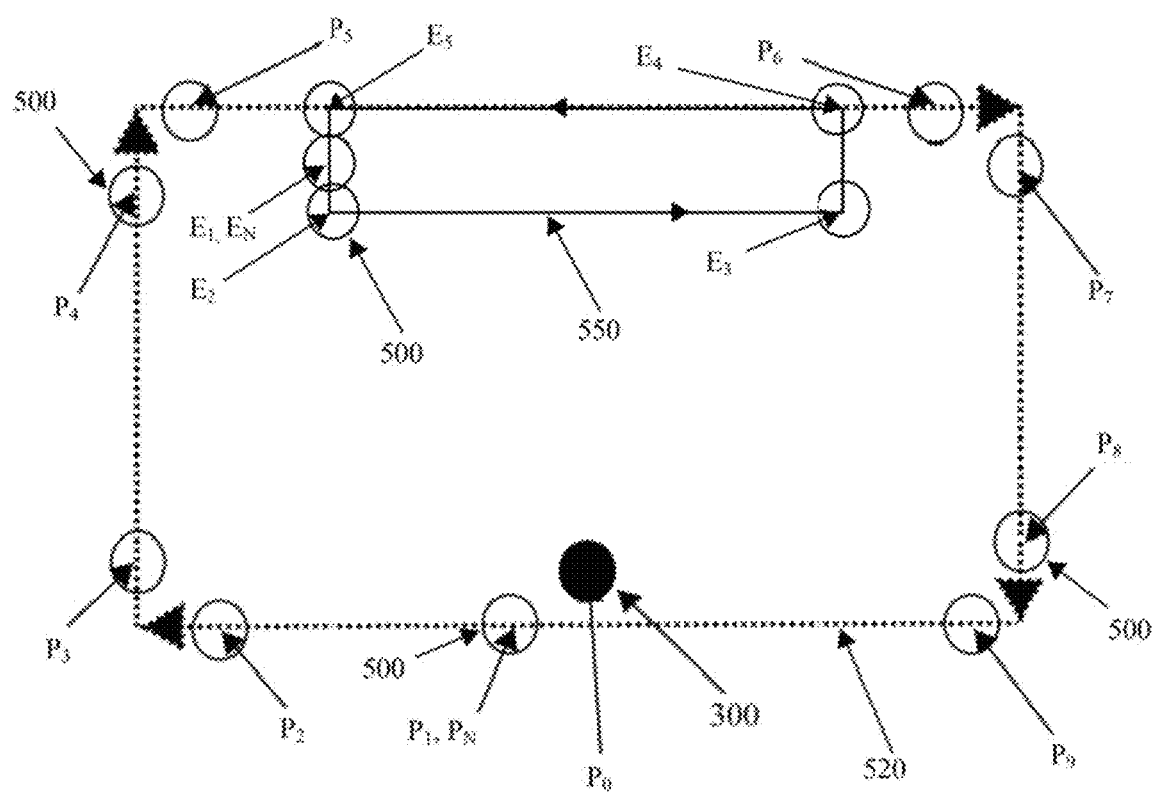
FIG. 19 is a schematic of the autonomous robot having the control system of FIG. 18 performing a coordinate mapping function to define the desired area of confinement within which the autonomous robot will perform its task.

Referring to FIGS. 18 and 19, a second embodiment of a robot control system 530 that can be incorporated into an autonomous robot 500 is illustrated. Similar features of the robot control system 530 relative to the robot control system 230 are similarly numbered except that the 500-series of numbers is used. Moreover, certain features that were described in detail above with regard to the autonomous robot 200 will not be repeated herein with regard to the autonomous robot 500 for brevity. However, it should be appreciated that any of the features described above with regard to the autonomous robot 200 can be incorporated into the autonomous robot 500, and similarly any features described below with regard to the autonomous robot 500 can be incorporated into the autonomous robot 200. Thus, the invention can be directed to the disclosure that is made with regard to the autonomous robot 200, the disclosure that is made with regard to the autonomous robot 500, or any combinations thereof.

The robot control system 530 contains all of the required internal circuitry for operation of the autonomous robot 500, which will be described in more detail below. In the exemplified embodiment, the robot control system 530 includes an internal memory 533, a wireless signal transceiver 534, a power source 543, an accelerometer 541 and a location tracking unit 542, all of which are operably connected to a CPU 535. The internal memory 533, the wireless signal transceiver 534 and the power source 543 operate in a similar manner to the same components of the robot control system 230 which have been discussed above with regard to FIG. 13.

In the exemplified embodiment, the location tracking unit 542 includes a global positioning system ("GPS") unit. The GPS unit includes a satellite signal receiving part constructed and arranged to extract navigation data from a satellite signal received from at least one satellite. The satellite signal transmitted from the at least one satellite includes location data (latitude-longitude coordinates) and the current time. Thus, when the location tracking unit 542 is a GPS unit, the robot control system 530 is aware of its location in terms of latitude-longitude coordinates at all times. Moreover, in certain embodiments in order to obtain a more accurate location determination, the GPS may include differential GPS (DGPS) methodologies. Using DGPS, an additional receiver is fixed at a known location nearby and observations made by the stationary receiver are used to correct positions recorded by the moving units. DGPS can obtain a location with accuracy that is within 1 meter of the actual location. Further still, in certain other embodiments location tracking may be accomplished via real time kinematic (RTK) satellite navigation, precise point positioning (PPP), or the like. The invention is not to be limited by the particular technique used for location tracking unless so specified in the claims and any corrective GPS post-processing techniques may be utilized.

Furthermore, in certain embodiments the location tracking unit 542 can include a timer and a compass, such as has been described above in FIG. 13. Moreover, in still other embodiments the location tracking unit 542 of the robot control system 530 incorporates a combination of the timer/compass and the GPS unit. The location tracking unit 542 is used to track the location of the autonomous robot 500 during the setup/defining of the area of confinement and the setup of the exclusionary areas. Utilizing a timer/compass has been described above, and therefore the discussion below is made with regard to the location tracking unit 542 being a GPS unit and therefore the locations of the autonomous robot 500 are tracked and recorded as latitude-longitude coordinates. However, the invention is not to be limited to the location tracking unit 542 being only a GPS unit in all embodiments and various combinations of a GPS unit, a timer and a compass can be used.

The accelerometer 541 is operably coupled to the CPU 535 such that the accelerometer 541 can transmit data to the CPU 535 during operation of the autonomous robot 500. It should be appreciated that the accelerometer 541 can also be incorporated into the robot control system 230 as desired. Specifically, the accelerometer 541 can be used to detect that the autonomous robot 500 has been kicked or to detect when the autonomous robot 500 is operating in a tilted orientation, which can be a hazard. Prior to a first use of the autonomous robot 500 in a field setting, a vibration profile is computed from raw data that is generated by the accelerometer 541. Specifically, the raw data is generated in three axes (i.e., X, Y and Z) and comprises hex values relative to the force of gravity. The vibration profile will be stored in the memory 533 as a threshold through which tilt and/or misuse of the autonomous robot 200 can be determined by comparing current data to the vibration profile data stored in the memory device 533.

Thus, during operation of the autonomous robot 200 the accelerometer 541 monitors any spikes that are present in the data that it is continually generating relative to the data contained in the vibration profile stored in the memory device 533. More specifically, the accelerometer 541 transmits data to the CPU 535 during operation of the autonomous robot 200, and the CPU 535 compares the data received from the accelerometer 541 to the vibration profile stored in the memory device 533. Thus, any spike (either upward or downward spike relative to the vibration profile data) in the vibration profile that occurs during operation of the autonomous robot 500 will be an indication, due to having a properly programmed CPU 535, that the autonomous robot 500 has been kicked, that the autonomous robot 500 has run over a rock or is mowing the sidewalk rather than the grass, or that the autonomous robot 500 is operating in a tilted orientation. The CPU 535 is configured to respond to these changes in vibration level of the accelerometer by, for example, backing up the autonomous robot 200 to return the autonomous robot 200 to the grass if it determines that the autonomous robot 200 is performing its task (i.e., lawn mowing) on the sidewalk, shutting off the autonomous robot 200 if determines that the autonomous robot 200 is being kicked or otherwise mistreated, or the like. The memory device 533 can include pre-stored algorithms that provide the CPU 535 with instructions for dealing with various changes in the vibration value.

Referring to FIG. 19, a method of defining an area of confinement 520 using the autonomous robot 500 having the robot control system 530 will be described. In the embodiment exemplified in FIG. 19, the robot control system 530 does not constantly record the location of the autonomous robot 500 during the Setup Mode as was described with regard to the autonomous robot 200. Rather the autonomous robot 500 merely records a specific number of data points along the perimeter of the desired area of confinement 520 to enable the CPU 535 to define a closed-geometry as a perimeter of the area of confinement 520. However, it should be appreciated that the autonomous robot 500 is still constantly aware of its location, it simply does not constantly record its location, which enables the size of the memory device 533 and other components to be decreased.

In the embodiment of FIG. 19, prior to activating the Setup Mode the autonomous robot 500 is located within the docking station 300, indicated as being point $P_0$. Of course, the invention is not to be so limited in all embodiments and in certain other embodiments the point $P_0$ may not coincide with the location of the docking station 300. In the exemplified embodiment, while the autonomous robot 500 is located within the docking station 300 at the point $P_0$, the user will initiate a record docking point ("RDP") signal that is transmitted to the robot control system 530, and more specifically to the CPU 535 of the autonomous robot 500, which will store this location in the memory device 533. In the exemplified embodiment, the location of the point $P_0$ will be recorded in the memory device 533 as a latitude-longitude coordinate using the location tracking unit 542. Specifically, upon initiating the RDP signal, the location tracking unit 542 will transmit the current location of the autonomous robot 200 to the CPU 535, which will store the current location of the autonomous robot 200 in the memory device 533. Of course, it should be appreciated that the point $P_0$ can be recorded in the memory device 533 in any other manner as has been described herein above with reference to the autonomous robot 200.

In one embodiment, the user initiates the RDP signal by actuating a button or other actuator on a handheld remote control, which transmits the RDP signal to the data receiving port or to the wireless signal transceiver on the autonomous robot 500. In other embodiments the user initiates the RDP signal by actuating an actuator on the PC 401, the Smart Phone 402 or other external device, which communicates with the autonomous robot 500 via the server 400 and the docking station 300 as has been described above. Moreover, in still other embodiments the user initiates the RDP signal by actuating a switch directly on the autonomous robot 500 housing. In still other embodiments, the RDP signal is automatically generated upon switching into Setup Mode. Transmitting the RDP signal to the robot control system 530 provides an indication that the autonomous robot 500 is in the docking station 300, which the robot control system 530 of the autonomous robot 500 can use as a reference point.

In the exemplified embodiment, the docking station 300 is located within, but not on, the perimeter of the desired area of confinement 520. Of course, the invention is not to be so limited and in certain other embodiments the docking station 300 may be located on the perimeter of the area of confinement 520, or external to the perimeter of the area of confinement 520. Furthermore, in certain embodiments it is not necessary to record the location of the docking station 300 into the memory device 533.

In certain embodiments, the point $P_0$ and all other geographical points are stored in the memory device 533 as latitude-longitude coordinates. Thus, the point $P_0$ indicates a point at a specific longitude and a specific latitude. Thus, when the user initiates the RDP signal, the location tracking unit 542 transmits the current location of the autonomous robot 500 to the CPU 535, which in turn transmits the current location data, in terms of longitude and latitude, to the memory device 533 to be stored as point $P_0$.

After the point $P_0$ is stored in the memory device 533, the autonomous robot 500 tracks all other locations via both the location tracking unit 542 and via its own internal CPU 535 based on the time and velocity as has been described in detail above. Specifically, in certain embodiments the autonomous robot 500 tracks and records its location with the use of the compass 231 and the timer 232 in addition to the location tracking unit 542. However, in certain other embodiments the autonomous robot 500 uses only the GPS unit to track its position.

As an alternative to using the timer 232 as a secondary tracking mechanism, the autonomous robot 500 may incorporate an encoder, such as a rotary encoder, on its wheels to track the location of the autonomous robot 500 relative to a starting point. Specifically, the wheels may include slots that allow light to pass therethrough at a specific position in the revolution of the wheel. Thus, as the wheel hits that specific position in the revolution, the encoder will transmit data to the CPU 535 indicating that the wheel has completed a revolution. This will enable the CPU 535 to keep track of the location of the autonomous robot 500 internally. The use of an encoder to track the location of the autonomous robot 500 is most useful during setup mode when the autonomous robot 500 is moving slowly and when the wheels are not slipping.

Referring still to FIG. 19, once the point $P_0$ is stored as described above, the autonomous robot 500 is removed from the docking station 300 either manually by the user or via the handheld remote control or other external device, and driven to (by remote) or placed on (by hand) the perimeter of the area of confinement 520. The perimeter of the area of confinement 520 is the external bounds of an area within which it is desired for the autonomous robot 500 to perform a task.

In the exemplified embodiment, when the autonomous robot 500 is located at a position just outside of the docking station 300 and located on the perimeter of the area of confinement 520, the user will initiate or transmit a record location point ("RLP") signal to the autonomous robot 500 to store a first location point $P_1$ as a location that is nearby but outside of the docking station 300. Of course, the invention is not to be limited by the position at which the autonomous robot 500 is located when the user initiates the RLP signal in all embodiments. The user initiates the RLP signal in a similar manner to that described above with regard to the RDP signal. Specifically, in one embodiment, the user initiates the RLP signal by actuating a button or other actuator on a handheld remote control, which transmits the RLP signal to the data receiving port or to the wireless signal transceiver on the autonomous robot 500. In other embodiments the user initiates the RLP signal by actuating an actuator on the PC 401, the Smart Phone 402 or other external device, which communicates with the autonomous robot 500 via the server 400 and the docking station 300 as has been described above. Moreover, in still other embodiments the user initiates the RLP signal by actuating a switch directly on the autonomous robot 500 housing.

Upon receiving the RLP signal, the robot control system 530 of the autonomous robot 500 will store the first location point $P_1$ in the memory device 533 as a point that is located along the perimeter of the area of confinement 520. Thus, when the user initiates the RLP signal, the location tracking unit 542, which is constantly tracking the location of the autonomous robot 200, transmits the current location of the autonomous robot 500 to the CPU 535, which in turn transmits the current location data, in terms of longitude and latitude, to the memory device 533 to be stored as the first location point $P_1$. The first location point $P_1$ can be stored as at least one of a latitude-longitude coordinate and as a point relative to the first point $P_0$ based on the processing techniques described above utilizing at least one of a GPS unit and time and velocity calculations.

The same process will take place to train the autonomous robot 500 regarding the locations of additional location points about the perimeter of the desired area of confinement 520. Thus, after the first location point $P_1$ is stored in the memory device 533, the autonomous robot 500 will be moved, via user-initiated instructions from a remote control or other external device (or by picking up and relocating the autonomous robot 500), from the first location point $P_1$ to a second location point $P_2$. Upon the autonomous robot 500 being located at the second location point $P_2$, the user will again transmit an RLP signal to the autonomous robot 500 via the remote control or other external device. The robot control system 530, and specifically the CPU 535, will store this second location point $P_2$ in the memory device 533. Again, in the exemplified embodiment the second location point $P_2$ is stored in the memory device 533 as a latitude-longitude coordinate, although it can alternatively or additionally be stored utilizing any other techniques described herein.

The autonomous robot 500 will continue to be moved, via the remote control or other external device or as otherwise described above, to a plurality of additional location points $P_3$-$P_N$. At each location point $P_3$-$P_N$, the user will transmit the RLP signal to the autonomous robot 500 via the remote control or other external device so that the CPU 535 of the robot control system 530 can record each of the location points $P_3$-$P_N$ in the memory device 533. On each occasion that the RLP signal is transmitted, the RLP signal is received by the wireless signal transceiver 534 or other data receiving port incorporated into the autonomous robot 500 as has been described above.

Initiation of the RLP signal causes the autonomous robot 500 to store the current location of the autonomous robot 500 at the instant that the RLP signal is transmitted (via actuating a button on the remote control or some other similar technique) as either a latitude-longitude coordinate, as a point relative to the starting point $P_0$, or both. In the exemplified embodiment the user initiates the RLP signal at a total of eleven locations (including the docking station 300 location and the $P_1$ location just outside of the docking station 300). However, the invention is not to be so limited and the user can initiate the RLP signal at any number of locations along the perimeter of the area of confinement 520.

In certain embodiments, it is desirable to transmit the RLP signal to the autonomous robot 500 at any change in geometry, contour or shape of the perimeter of the area of confinement 520 that is being defined by the above process. A change in geometry can be any curve or turn in the perimeter of the area of confinement 520, including any locations along the perimeter of the area of confinement 520 that transition from a straight line. Such a technique will ensure that an accurate perimeter of the area of confinement 520 is calculated by the CPU 535 of the autonomous robot 500 as will be described below. Thus, when the area of confinement 520 is of square configuration such as exemplified in FIG. 19, it may be desirable to transmit the RLP signal both when the autonomous robot 500 is located immediately before and immediately after each corner of the area of confinement 520. This will enable the autonomous robot 500 to account for corners of the area of confinement 520 and to define closed-geometry that accurately depicts the area of confinement 500 as will be described in more detail below. Of course, the RLP signal can be transmitted while the autonomous robot 500 is located at any position along the perimeter of the area of confinement 520 to provide for better accuracy, including along straight portions, precisely at the corners, and the like.

After all of the location points $P_1$-$P_N$ are recorded in the memory device 533, the CPU 535 defines a first closed-geometry that comprises the first location point $P_1$ and the plurality of location points $P_2$-$P_N$ as the perimeter of the area of confinement 520 and records/stores the first closed-geometry as the perimeter of the area of confinement 520 in the memory device 533. Each of the location points $P_1$-$P_N$ is located on the perimeter of the area of confinement 520 as it is defined by the CPU 535 and recorded into the memory device 533.

In the exemplified embodiment, the location point $P_N$ is the same as the first location point $P_1$. However, the invention is not to be so limited in all embodiments and it should be appreciated that in certain embodiments, it is desirable for the location point $P_N$, which is the last location point that is saved in the memory device 533, to be substantially coincident with the first location point $P_1$. The term substantially coincident is not limited only to points that are located at exactly the same latitude-longitude coordinate, but also includes two points that are located within a certain distance from one another, such as being between 0-10 feet from one another, 0-5 feet from one another, 0-3 feet from one another, 0-2 feet from one another, or 0-1 feet from one another. Furthermore, in other embodiments the term substantially coincident can be defined as a percentage of the overall perimeter of the area of confinement 520, such as being between 0-10% of the perimeter of the area of confinement 520, 0-7% of the perimeter of the area of confinement 520, 0-5% of the perimeter of the area of confinement 520, 0-3% of the perimeter of the area of confinement 520 or 0-1% of the perimeter of the area of confinement 520. For example without limitation, if the overall perimeter of the area of confinement 520 is 100 feet and substantially coincident is anything that is between 0-10% of the perimeter of the area of confinement 520, two points will be considered substantially coincident if they are between 0-10 feet from one another.

In the exemplified embodiment, the central processing unit 535 automatically defines the first closed-geometry as described above upon one of the plurality of location points $P_2$-$P_N$ being determined to be substantially coincident with the first location point $P_1$. However, the invention is not to be so limited in all embodiments, and in certain other embodiments the central processing unit 535 defines the first closed-geometry as described above upon receiving a user-generated define closed-geometry signal. The user-generated define closed-geometry signal can be transmitted to the autonomous robot 500 from a remote control or other external device and received at the wireless signal transceiver 534 or other data receiving port of the autonomous robot 500 for processing by the CPU 535. In embodiments wherein a user-generated define closed-geometry signal is transmitted to the autonomous robot 500 to facilitate the autonomous robot 500 defining the closed-geometry, the location point $P_N$ need not be substantially coincident with the first location point $P_1$. Rather, in such embodiments the central processing unit 535 will automatically connect the last location point $P_N$ with the first location point $P_1$ to define the closed-geometry.

Moreover, in the exemplified embodiment, the central processing unit 535 defines the closed-geometry by generating linear segments between the first location point $P_1$ and the plurality of location points $P_2$-$P_N$ in successive order of recordation of those location points. Thus, referring to FIG. 19, the central processing unit 535 will generate a linear segment between the first location point $P_1$ and the second location point $P_2$, between the second location point $P_2$ and the third location point $P_3$, between the third location point $P_3$ and the fourth location point $P_4$, and so on until a linear segment has been generated between the last location point $P_N$ and the first location point $P_1$ to define the closed-geometry or between the location point $P_{N-1}$ and the last location point $P_N$ when the last location point is exactly coincident with the first location point $P_1$. Although the exemplified embodiment illustrates connecting adjacent location points with linear segments, in other embodiments arcuate or otherwise shaped segments can be used to connect adjacent location points, so as to better capture the desired perimeter of the area of confinement 520 at the changes in geometry, such as between location points $P_2$ and $P_3$ in the exemplified embodiment.

According to the techniques and methodologies described herein above with reference to FIGS. 18 and 19, it should be appreciated that the autonomous robot 500 does not need to continuously store its location in memory during the Setup Mode because the CPU 535 can take several stored points and calculate or compute the perimeter of the area of confinement 520 based on those points. A user can determine the exact number of location points to record in the memory device 533 simply by maneuvering the autonomous robot 500 along the desired area of confinement 520 and transmitting the record location point signals as desired. In this manner, the user can define as few or as many location points as desired. However, it should be appreciated that the more location points that are saved to the memory device 533, the more accurately the central processing unit 535 will be able to define the area of confinement 520.

Although the autonomous robot 500 only stores a location in memory as a point with a latitude-longitude coordinate in response to the user initiating or transmitting the record location point signal to the autonomous robot 500, it should be appreciated that the autonomous robot 500 is constantly aware of its location both relative to the starting point $P_0$ and in a geographical sense based on longitude and latitude due to its internal location tracking unit 542. However, the memory device 533 can be made a suitable size and the area of confinement 520 accurately mapped by only storing/recording certain points along the perimeter of the desired area of confinement 520 in the memory device 533, rather than continuously storing the location of the autonomous robot 500 throughout the Setup Mode.

By calculating the perimeter of the area of confinement 520, the CPU 535 generates a map of the area of confinement 520 utilizing the GPS information (i.e., latitude-longitude coordinates). In other words, the points $P_1$-$P_N$ are mapped by the CPU 535 using a mapping scheme such that a closed-geometry area of confinement 520 is generated as a map.

In addition to generating the area of confinement 520, the robot control system 530 of the autonomous robot 500 can also define one or more areas of exclusion 550, which as described above area areas that the autonomous robot 500 will not enter into during a work session. In the exemplified embodiment, the autonomous robot 500 is switched into an Exclusion Area Mode prior to defining the areas of exclusion 550. Upon being set into Exclusion Area Mode, any location points stored in the memory device 533 are stored as exclusion location points.

Thus, referring to FIG. 19, the invention will be described with regard to defining the perimeter of the area of exclusion 550, which may be a flower bed, a tree, a deck or any other region within the pre-defined area of confinement 520 within which it is undesirable for the autonomous robot 500 to maneuver during the work session. The autonomous robot 500 is first positioned at a first exclusion location point $E_1$ and the first exclusion location point $E_1$ is recorded within the memory device 533. The first exclusion location point $E_1$ and all other exclusion location points described below are recorded in the memory device 533 in a similar manner to the recordation of the location points, which is in response to the robot control system 530 receiving a user-generated signal, the CPU 535 processing the user-generated signal and transmitting it to the memory device 533 for storage. However, for recording the exclusion location points, the user generated signal is a record exclusion location point signal. In certain embodiments, the record exclusion location point signal can be generated by actuating the same button or other type of actuator as with generating the record location point signal. However, based on the mode of operation that the autonomous robot 500 is set to, the proper signal will be transmitted. Of course, in other embodiments different buttons or actuators can be used to transmit the different signals.

After the first exclusion location point $E_1$ is recorded within the memory device 533, the autonomous robot 500 is moved, either by lifting the autonomous robot 500 and carrying it or via a remote control or other external device, from the first exclusion location point $E_1$ to a plurality of exclusion location points $E_2$-$E_N$. In the exemplified embodiment, the autonomous robot 500 is moved from the first exclusion location point $E_1$ to a second exclusion location point $E_2$ to a third exclusion location point $E_3$ to a fourth exclusion location point $E_4$ and finally to a last exclusion location point $E_N$. Each of the exclusion location points $E_2$-$E_N$ is recorded in the memory device 533 in response to the user-generated record exclusion location point signal being transmitted from the remote control or other external device to the autonomous robot 500 while the autonomous robot 500 is positioned at that particular location.

Upon defining all of the exclusion location points $E_1$-$E_N$, the central processing unit 535 defines a second closed-geometry comprising the first exclusion location point $E_1$ and the plurality of exclusion location points $E_1$-$E_N$ as a perimeter of the area of exclusion 550. The perimeter of the area of exclusion 550 is then recorded within the memory device 533. Similar to the discussion above, in certain embodiments the closed-geometry is automatically defined by the CPU 535 upon the last exclusion location point $E_N$ being substantially coincident with the first exclusion location point $E_1$. However, in other embodiments the closed-geometry is defined in response to a user-generated define closed geometry signal being transmitted from the remote control or other external device to the autonomous robot 500. Using the user-generated define closed geometry signal, the last exclusion location point $E_N$ need not be substantially coincident with the first exclusion location point $E_1$ for the CPU 535 to define the closed-geometry. As described above, as many areas of exclusion as desired can be defined by the CPU 535 and stored within the memory device 533 by repeating the above processes at various locations within the area of confinement 520 that it is undesirable for the autonomous robot 500 to traverse while completing a work session.

In the exemplified embodiment, each of the exclusion location points $E_1$-$E_N$ is located at a corner of the closed-geometry of the perimeter of the area of exclusion 550. This is sufficient to accurately define the closed-geometry of the perimeter of the area of exclusion 550 because the CPU 535 will define the closed-geometry by generating linear segments between the first exclusion location point $E_1$ and the plurality of exclusion location points $E_2$-$E_N$ in successive order of recordation. Of course, as noted above with regard to defining the area of confinement 520, segments that are other than linear can be used, such as arcuate or otherwise. Furthermore, exclusion location points can be defined at locations in addition to or in lieu of the corners as determined and desired by the user. In certain embodiments, it is preferable to define the exclusion location points at any change in geometry such as has been described herein above.

Each of the exclusion location points $E_2$-$E_N$ is recorded in the memory device 533 as a latitude-longitude coordinate using the location tracking unit 542. By calculating the perimeter of the area of exclusion 550, the CPU 535 incorporates the area of exclusion 550 into the map that was previously generated with the area of confinement 520 utilizing the GPS information (i.e., latitude-longitude coordinates). In other words, the points $E_1$-$E_N$ are mapped by the CPU 535 using a mapping scheme such that a closed-geometry area of exclusion 520 is incorporated into the map of the area of confinement 520.

As noted above, after completion of defining the area of confinement 520, the next step is for the user to select a pattern that will define the behavior of the autonomous robot 500 while traveling inside the perimeter of the area of confinement 520 while performing its task. In order to define the pattern of operation of the autonomous robot 500, in one embodiment the autonomous robot 500 will be switched into a pattern selection mode 500 by transmitting a signal to the autonomous robot 500 from a remote control or other external device, or by actuating a switch on the body of the autonomous robot 500.

The perimeter of the area of confinement 520 is a collection of points made up of line segments between a plurality of vertices, the vertices being the points $P_1$-$P_N$ that are recorded in the memory device 533. Moreover, the points $P_1$-$P_N$ are recorded in the memory device 533 as latitude, longitude pairs in the format $(X_i, Y_i)$, wherein i=0 to N−1. For example, the line segment connecting point $P_1$ to point $P_2$ is defined by vertices (X1, Y1) and (X2, Y2).

The vertices described above are stored in the memory device 533 of the autonomous robot 500. Once the perimeter of the area of confinement 520 has been defined as a closed-loop geometry as has been discussed in detail above, the area of the closed-loop of the area of confinement 520 is computed by the CPU 535 using pre-programmed algorithms from the following equation:

$$A = \frac{1}{2} \sum_{i=0}^{N-1} (x_i y_{i+1} - x_{i+1} y_i).$$

Additionally, the centroid of the closed-loop of the area of confinement 520 is computed by the CPU 535 using pre-programmed algorithms from the following equation:

$$c_x = \frac{1}{6A} \sum_{i=0}^{N-1} (x_i + x_{i+1})(x_i y_{i+1} - x_{i+1} y_i)$$

$$c_y = \frac{1}{6A} \sum_{i=0}^{N-1} (y_i + y_{i+1})(x_i y_{i+1} - x_{i+1} y_i).$$

After such calculations are complete, a pattern for operation of the autonomous robot 500 within the area of confinement 520 is selected. In one embodiment, the user can select the desired pattern of movement that the autonomous robot 500 will operate under via the remote control or via an external device (i.e., Smart Phone, PC or the like) using the techniques and processing that have been discussed in detail above. A pattern is any method used to divide or search within the closed-loop geometry. For example without limitation, the closed-loop geometry may be divided by other geometric shapes such as triangles (as in polygon triangulation) where the autonomous robot 200 will follow the computed path corresponding to the diagonals of each triangle.

In certain embodiments, the selected pattern is a line or stripe pattern. Lines and stripes are defined by defining each of the line segments that are used to define the closed-loop geometry by its end points or vertices. Specifically, the line segment that connects point P1 with point P2 is defined as that latitude-longitude coordinate at point P1 and the latitude-longitude coordinate at point P2. The CPU 535 of the autonomous robot 500 is then able to compute the angle and distance between the points P1 and P2. Using this computation, the CPU 535 can instruct the autonomous robot 500 to travel between points P1 and P2.

Of course, the CPU 535 of the autonomous robot 500 is continuously computing its position and location relative to the defined area of confinement 530. The CPU 535 continuously makes a determination as to whether it is within the area of confinement 520, whether it is on the perimeter of the area of confinement 520 or whether it is operating outside of the defined area of confinement 520. If the autonomous robot 500 is determined to be operating outside of the defined area of confinement 520, the CPU 535 will immediately cease operation of the autonomous robot 500 (i.e., by shutting off the blades and/or motor) and will return the autonomous robot 500 back to a location within or on the perimeter of the area of confinement 500.

Figure 21:
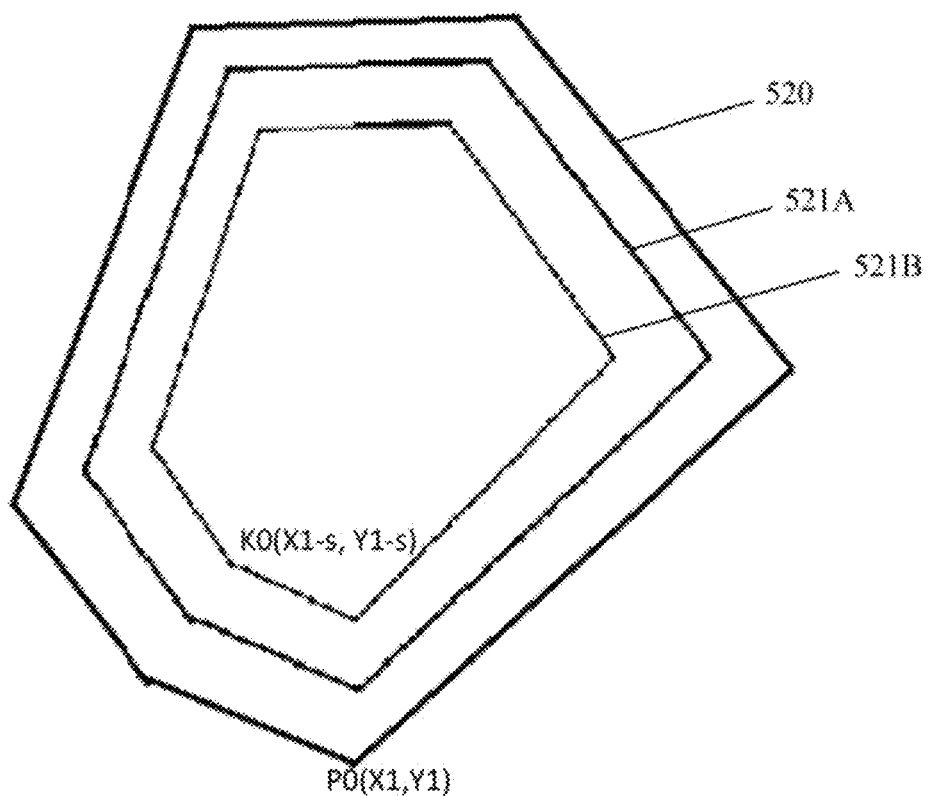
FIG. 21 is a schematic of a pattern for operation of the autonomous robot according to an embodiment of the present invention.

In another embodiment, the selected pattern is an inward spiral pattern. In such embodiments, the CPU 535 of the autonomous robot 500 divides the area of confinement 520 by smaller scaled closed-loop geometries 521A, 521B having a shape that corresponds to the shape of the area of confinement 520. An example of this technique is illustrated in FIG. 21. In this embodiment, the pattern is defined by scaling down each of the points $P_1$-$P_N$ by a scale factor. Thus, the pattern is defined as points $K_1$-$K_N$ where each of the points are defined as the points $P_1$-$P_N$ minus a scale factor. Thus, the point $P_1$ defined by the coordinate (X1, Y1) becomes the point $K_1$ defined by the coordinate (X1-s, Y1-s). The scale factor is calculated to be the cutting width of the payload of the autonomous robot 500 (i.e., the mower blades). The CPU 535 determines that the autonomous robot 500 has completed a mowing session when the autonomous robot 500 reaches the centroid of the closed-loop geometry of the area of confinement 520.

In still another embodiment, the patterns are not limited to mathematical equations or techniques as discussed above. A user may define his or her own pattern or path for the autonomous robot 500. The CPU 535 of the autonomous robot 500 accepts a list of points that define an area or a specific pattern when the autonomous robot 500 is in the pattern selection mode. In other words, the user can pre-direct the path that the autonomous robot 500 moves in during operation by selecting points within the area of confinement 520. The autonomous robot 500 will maneuver and perform a task within the area of confinement 520 by traveling to each of the user-selected points in succession. The autonomous robot 500 will then follow the specified pattern or path, starting with the first pattern point and moving towards the last. This pattern is considered completed and the working session completed when the last pattern point is reached.

Referring to FIG. 17, the autonomous robot 500 can communicate with the server 400 in much the same way as has been described herein above with regard to the autonomous robot 200. Thus, due to its communication with the server 400, the autonomous robot 500, via the robot control system 530, transmits the map data (i.e., data indicative of the perimeter of the area of confinement 520) to the docking station 300, which further transmits the map data to the server 400. The server 400 comprises memory for storing all of the data that is transmitted to the server 400 from the autonomous robot 500. At this stage, the map that was created by the robot control system 530 is post-processed for accuracy. This can include ensuring that the map created forms a closed-loop geometry, interpolating the position/location points to generate new data points to more accurately define the map, and the like.

As noted above, the area of confinement 520 is mapped by the CPU 535 using a mapping scheme such that a closed-geometry area of confinement 520 is generated as a map. In certain embodiments, upon defining the area of confinement 520 and transmitting the area of confinement 520 to the server 400, the server 400 will overlay the area of confinement 520 onto a satellite image of the geographic location that has been defined as the area of confinement 520. The satellite image may be obtained from sources such as Google Earth or Google Maps, such as by the server 400 communicating with a server that stores satellite images of the Earth, or by other means. Google Earth allows a user to input a geospatial data file which is in the format of a Keyhole Markup Language (KML). This input file provides a user with the ability to overlay images and data onto the Earth and to display this data. Thus, using such techniques the area of confinement 520 can be overlayed onto a satellite image of the Earth to provide the user with a visual representation of the area of confinement 520. The mapped area of confinement 520 overlayed onto a satellite image of the Earth can be presented to a user on the display of an external device, such as a Smart Phone, PC or the like, as will be discussed below.

Furthermore, as has been described above once the server 400 has received the mapped data or data indicative of the perimeter of the area of confinement 520, the data can be stored in the memory of the server 400 and transmitted via Wi-Fi, IR, RF or otherwise to a device, such as a PC 401, a smart phone 402 or other external device. The data can then be displayed on a display device of the external device to visually represent the perimeter of the area of confinement 520 and status of a work session of the autonomous robot 500 as will be discussed in more detail below. This enables the user to log on to a website or download a mobile application to view the area of confinement map.

Specifically, the data stored on the server 400 can be accessed in certain embodiments by the user logging in to a secure website with a username and password. By logging in, the user gains access to the user's personal account containing information about the user's personal autonomous robot 500, including the map of the area of confinement 520 and any other information stored in the memory device 533 of the autonomous robot 500. After the area of confinement 520 has been properly mapped and stored, the user can log in to the website to select the desired operation pattern, including lines/stripes, random, circular, spiral, user-defined or the like. In certain embodiments, the user can log in to the website and create a user-defined pattern by selecting points within the area of confinement 520 (such as by clicking with a mouse, touching the location with the user's finger or a stylus, or the like) in a particular order. During operation, the autonomous robot 500 will travel in the user-defined pattern by moving over each of the points selected by the user in succession. In this manner, the user can define any desired pattern for operation of the autonomous robot 500 as may be desired.

Furthermore, the user can manipulate the perimeter of the area of confinement 520 via the external device to more accurately depict the corners and other changes in geometry/shape of the perimeter of the area of confinement 520. In certain embodiments, this includes the user logging in to the website and manipulating the area of confinement 520. In certain embodiments as discussed above, the area of confinement 520 is overlayed onto a satellite image of the user's yard, such as is known from Google Earth or Google Maps. The user can ensure that the area of confinement 520 is properly correlated with the satellite image of the user's yard.

Furthermore, as will be discussed in more detail below, the server 400 maintains an accurate and real-time log of the work session (i.e., lawn mowing) data so that a user can track current work sessions by viewing them on the PC 401, smart phone 402, or other external device. The server 400 preferably transmits information and data to the PC 401 or smart phone 402 in order to present a user with information including, without limitation, a map of the area of confinement 520 and real-time or substantially real-time (i.e., within a 10 second delay, a 30 second delay, or a one minute or more delay) data regarding operation of the autonomous robot 500 including which areas of the area of confinement 520 (i.e., the lawn) have already been mowed, which have not yet been mowed, and the current location of the autonomous robot 500 in the area of confinement 520. Specifically, the data can be portrayed on a display of the PC 401, smart phone 402 or other external device with a graphical user interface ("GUI") that illustrates the perimeter of the area of confinement 520. The area of confinement 520 can be illustrated in contrasting colors such that the user can visualize the portions of the area of confinement 520 (i.e., a yard) on which work has already been completed, and the portions of the area of confinement 520 on which work has not yet been completed. For example without limitation, in one embodiment the portions of the area of confinement 520 (i.e., yard) on which work (i.e., mowing) has already been completed may be illustrated on the GUI in green, and the portions of the area of confinement 520 on which work has not yet been completed may be gray or colorless. Moreover, the GUI will illustrate the current location of the autonomous robot 500 within the area of confinement 520. The current location/position of the autonomous robot 500, as well as the portions of the work area on which work has and has not yet been completed, may be periodically updated, such as every minute, every five minutes, every ten minutes, every fifteen minutes, every thirty minutes, every hour or the like. The amount of time between updates can be set by the user at any increment as desired.

By keeping track of the progress of a work session of the autonomous robot 500, a user can determine whether to transmit a signal from the external device to the robot control system 530 of the autonomous robot 500 to place the autonomous robot 500 back in the docking station 300. For example, if a large storm is approaching and the user determines by viewing the work session on the PC 401, smart phone 402, or other external device that the autonomous robot 500 will not be finished with the work session before the storm arrives, the user can override the work session and send the autonomous robot 500 back to the docking station 300 for storage and protection. In still other embodiments, the server 400 can automatically transmit weather information to the robot control system 530 so that the CPU 535 can make a determination as to whether a work session should be even attempted based on the weather information or forecast.

Both of the autonomous robots 200, 500 can incorporate additional structural and/or functional features to further enhance the usability of the autonomous robots 200, 500. These additional features are described herein below with regard to the autonomous robot 200. However, it should be appreciated that any of the features described herein below can be equally applied to the autonomous robot 500.

Several features can be incorporated into the invention in order to assist the autonomous robot 200 in finding its way back to the docking station 300 when it has completed a work session or when it needs to be recharged. For example, in one embodiment there may be a guide wire extending from the docking station 300 out towards the perimeter of the area of confinement 220. In certain embodiments, the guide wire may extend approximately two feet from the docking station 300, although less or more than two feet of guide wire may be used in other embodiments. In embodiments that use a guide wire, when the autonomous robot 200 detects the guide wire, it will know that it can follow the guide wire in order to get back to the docking station 300 at the proper orientation. In other embodiments, the robot control system 230 can simply navigate the autonomous robot 200 back to the docking station 300 based upon having its location stored in the memory 233 as the point $P_0$ as has been described herein above.

In still other embodiments, the autonomous robot 200 may include a vision sensor, such as a camera or one or more infrared (IR) sensors. The docking station 300 can be designed to include a particular LED pattern, a particular pattern of reflected paint that is painted onto the docking station 300, or any other type of marking on the docking station 300 that can be detected by the autonomous robot 200. Upon detecting the LED pattern (or pattern of reflected paint) at a particular angle or orientation via the camera or IR sensors, the autonomous robot 200 will determine that it is in the proper position for docking and can travel towards the docking station 300 for docking therein.

In still other embodiments, docking of the autonomous robot 200 within the docking station 300 can be achieved by placing one or more capacitance (or inductance) sensors on the autonomous robot 200. The CPU 235 of the autonomous robot 200 can be pre-calibrated such that the capacitance value detected when the autonomous robot 200 is in close proximity to the docking station 300 is known. Thus, as the autonomous robot 200 comes near to the docking station 300, the CPU 235 of the robot control system 230 can determine the distance that the autonomous robot 200 is from the docking station 300 based on the detected capacitance values. Furthermore, in another embodiment the docking station 300 may be equipped with a Radio-Frequency Identification ("RFID") device or tag and the autonomous robot 200 can be equipped with an RFID reader. The RFID reader on the autonomous robot 200 is operably coupled to the CPU 235 such that upon the RFID reader detecting the RFID tag, the CPU 235 will instruct the autonomous robot 200 to move in the direction of the docking station 200.

As stated above, the robot control system 230 knows the exact location of the autonomous robot 200 at all times. Thus, the robot control system 230 is able to keep track of the completed grid points and steer the autonomous robot 200 away from those grid points that it has already performed its task on so that it can complete its task on other grid points within the area of confinement 220. Furthermore, the robot control system 230 may also comprise an internal date and time circuit so that the autonomous robot 200 performs its task only at desired times and days.

In certain embodiments, the CPU 235 is configured to move the autonomous robot 200 at a first velocity when the autonomous robot 200 is within the area of confinement 220 and is at least a first distance from the perimeter of the area of confinement 220. The first velocity may be a constant speed, or may be a varying speed. However, as the autonomous robot 200 approaches the perimeter of the area of confinement 220 and the autonomous robot 200 is less than or equal to the first distance from the perimeter of the area of confinement 220, the CPU 235 will automatically reduce the speed of the autonomous robot 200 to a second velocity that is less than the first velocity in order to ensure that the autonomous robot 200 is remaining within the defined area of confinement 220. In certain embodiments, the first distance, which is the distance from the perimeter of the area of confinement 220 at which the CPU 235 will reduce the speed of the autonomous robot 200, is between 0-10 feet, more preferably between 3-8 feet, and still more preferably approximately 5 feet.

In certain embodiments, the CPU 235 will only reduce the speed of the autonomous robot 200 as described above when the autonomous robot 200 is travelling in such a direction that the autonomous robot 200 is approaching the perimeter of the area of confinement 220. Thus, in certain embodiments the autonomous robot 200 will resume the first velocity when it is traveling parallel to one side or length of the perimeter of the area of confinement 220 even if the autonomous robot 200 is within the first distance from the perimeter of the area of confinement 220 so long as the autonomous robot 200 is greater than the first distance from the perimeter of the area of confinement 220 in the direction of its movement. Furthermore, in still other embodiments the autonomous robot 200 will be made to travel, by the CPU 235, at the first velocity when the autonomous robot 200 is less than or equal to the first distance from the perimeter of the area of confinement 220 when the autonomous robot 200 is traveling in a direction away from the perimeter of the area of confinement 220. Of course, in still other embodiments the CPU 235 will move the autonomous robot 200 at the reduced second velocity at any time that the autonomous robot 200 is less than or equal to the first distance from the perimeter of the area of confinement 220 regardless of the direction of travel of the autonomous robot 200.

Upon reducing its speed due to being with the first distance from the perimeter of the area of confinement 220, the robot control system 230 of the autonomous robot 200 will transmit data indicative of the perceived location of the autonomous robot 200 to the server 400 (via the docking station 300 as has been described herein above). At such time, the server 400 will, utilizing a network of GPS units and other location tracking technologies that are more accurate than the location tracking unit 542, calculate or otherwise determine the actual location of the autonomous robot 200 and compare the actual location of the autonomous robot 200 to the perceived location of the autonomous robot 200 according to the information transmitted to the server 400 from the robot control system 230. In response, the server 400 will send the actual location of the autonomous robot 200, in the form of actual location data, back to the robot control system 230 along with a percentage of error. The percentage of error is a determination as to how far off the autonomous robot's perceived location was relative to its actual location. The robot control system 230 can use this percentage of error data to recalibrate the CPU 235. In other words, upon receiving actual location data from the server 400, the CPU 235 can update in the memory device 233 the perceived location to the actual location of the autonomous robot 200 within the area of confinement. In this manner, the autonomous robot 200 is prevented from leaving the area of confinement 220.

In certain embodiments, the CPU 235 may transmit the perceived location of the autonomous robot 200 to the server 400 even when the autonomous robot 200 is not within the first distance from the perimeter of the area of confinement 220. Thus, the CPU 235 can transmit the perceived location of the autonomous robot 200 within the area of confinement 220 to the server 400 at any time it is desirable for the CPU 235 to update the perceived location of the autonomous robot 200 to an actual location of the autonomous robot 235 based upon actual location data that can be transmitted to the CPU 235 from the server 400. In certain embodiments, these steps occur after a certain amount of time has passed during a work session, such as every ten minutes, every twenty minutes, every thirty minutes, every hour or the like, in order to ensure that the CPU 235 has the most accurate location information of the autonomous robot 200 available.

Alternatively, the autonomous robot 200 may be equipped with an emergency shut-off in order to avoid the potential for harm to a person or object. The emergency shut-off will automatically shut down the autonomous robot 200 if it happens to travel outside of the defined area of confinement 220. The user may also desire to shut down the autonomous robot 200 while it is performing its task. This can be done by pressing an off button on the remote control or other Wi-Fi interface.

In another embodiment, the autonomous robot 200 may incorporate a capacitive touch sensor as a safety shut-off feature. Using a capacitive touch sensor enables the autonomous robot 200 to significantly reduce the likelihood of causing injury to a person because the capacitive touch sensor causes the autonomous robot 200 to shut-down, thereby stopping rotation of the blades 230, immediately upon sensing a person or object either in contact with or in close proximity to the autonomous robot 200.

The capacitive touch sensor is operably coupled to the CPU 235 so that upon recognizing a change in capacitance value, the CPU 235 can cause the autonomous robot 200 to shut off. As noted above, in certain embodiments the housing 201 of the autonomous robot 200 is formed from aluminum, which is an environmentally friendly and electrically conductive material. Furthermore, in embodiments wherein the housing 201 of the autonomous robot 200 is formed from plastic, an aluminum foil lining (or other electrically conductive material, such as electrically conductive paint) can be incorporated onto the housing 201 of the autonomous robot 200. As used herein, the housing 201 includes the chassis and any other structural components of the frame of the autonomous robot 200.

A capacitive touch sensor can be connected to the housing 201. When the housing 201 is formed from aluminum or any other electrically conductive material, the entire housing 201 becomes an extension of the touch sensor such that contacting or touching any portion of the housing 201 will operate the touch sensor and cause the autonomous robot 200 to shut down. When the housing 201 is formed from plastic but includes an aluminum foil lining (or an electrically conductive paint), only those portions of the housing 201 that are in contact with the touch sensor and are formed from a conductive material will be an extension of the touch sensor such that contacting or touching only those portions of the housing 201 that are in contact with the touch sensor will operate the touch sensor.

The capacitive touch sensor operates by establishing a baseline level of capacitance, which is stored in the memory device 233. Once this is established, the capacitive touch sensor will look for an increase in capacitance that occurs when an object having a capacitance value, such as a human being or animal, touches the housing 201 of the autonomous robot 200. Upon a person or object coming into contact with or otherwise touching the housing 201, the capacitive touch sensor will detect such an increase in the capacitance value. Upon detecting an increase in the capacitance value, the capacitive touch sensor will transmit an increased capacitance value signal to the CPU 235, which will automatically deactivate the autonomous robot 200. Specifically, upon detecting an increase in the capacitance value, the CPU 235 will shut down the blades 203 to reduce the possibility of causing harm to a person, animal or other object that is located too close to the autonomous robot 200.

When the person or object is no longer touching the housing 201 of the autonomous robot 200, the touch sensor will detect a decrease in capacitance and the CPU 235 will enable the autonomous robot 200 to be restarted. In still other embodiments, the capacitive touch sensor may be a proximity capacitive sensor, such that it can detect a conductive source in its surroundings (or a source having different dielectric properties than the sensor's electrodes' surroundings), rather than requiring a conductive source to actually come into contact with the housing 201 of the autonomous robot 200. A conductive source may be considered to be in the surroundings of the autonomous robot 200 when it is within three feet of the autonomous robot 200, more preferably within one foot of the autonomous robot 200, still more preferably within six inches of the autonomous robot 200, and still more preferably within three inches of the autonomous robot 200.

In certain embodiments, the invention is directed to the concept of incorporating a capacitive touch sensor into any machine or power equipment that is used for outdoor lawn care. Thus, the invention may be directed to using a capacitive touch sensor in a lawnmower, a snow blower, a leaf blower, a power saw or any other powered tool that can benefit from incorporating a capacitive touch sensor to disable the powered tool as a safety feature. The capacitive touch sensor is designed such that a person touching the housing or other critical area of the power tool while the power tool is powered into an "on" position will cause the power tool to automatically shut-off, and when the person is no longer touching the housing or other critical area of the power tool, the power tool is capable of being restarted. In certain embodiments, the capacitive touch sensor can be incorporated into the entire structure of the power tool, or can simply be located in a region of the power tool that is considered a critical area such that a user touching near that area can result in serious injury to the user.

In certain embodiments, the robot control system 230 of the autonomous robot 200 can have a specific geographic information system (GIS) data shape file stored in the memory device 233. The GIS data shape file contains the shape of a user's yard based on longitude/latitude pairs. Thus, the GIS data shape file can be used as an alternative to having the user define the area of confinement using the Setup Mode. The GIS data shape file, where applicable, already contains the data related to the shape of the user's yard and can be used to create the area of confinement in certain embodiments.

The autonomous robot 200 may also include various behaviors for escape to allow the autonomous robot 200 to avoid becoming stuck. For example, the autonomous robot 200 may include foldable legs with wheels on the ends to lift the autonomous robot 200 off of the ground and move it to a location that is better suited for performing its task. This may prove helpful if, for example, the autonomous robot 200 becomes stuck on a tree root and is unable to maneuver itself beyond the tree root while affixed to the ground. Additional escape behaviors as would be known to those skilled in the art have also been contemplated within the scope of the present invention.

In certain embodiments, the autonomous robot 200 comprises a current sensor that is operably coupled to the cutting blades 203. The current sensor can be directly coupled to at least one of the cutting blades 203, or the current sensor can be coupled to the drive shaft of the cutting blades 203. The current sensor measures the load on the cutting blades 203. The current sensor is operably coupled to the CPU 235 to transmit data measured by the current sensor to the CPU 235 for processing. The CPU 235 is properly programmed to analyze the data transmitted from the current sensor. Thus, the CPU 235 can analyze the load on the cutting blades 203 to determine the thickness of the grass, whether no grass is detected, and/or whether there is an obstacle. Thus, the CPU 235 is preprogrammed to convert the data transmitted from the current sensor into calibrated values that represent thick grass, thin grass, no grass or the like.

Figure 20:
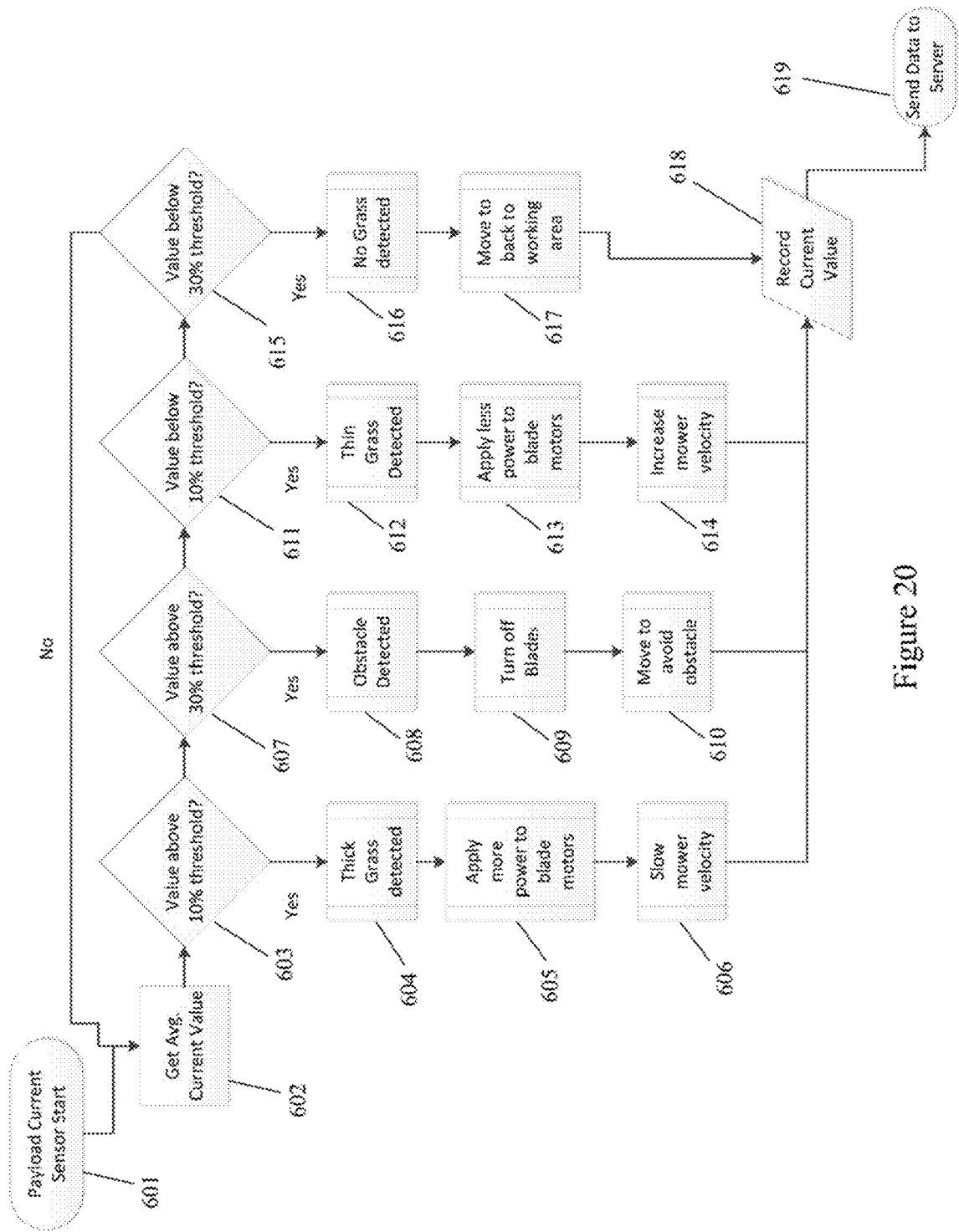
FIG. 20 is a flow chart of the processing of a current sensor that is operably coupled to the cutting blades of the autonomous robot.

Referring to FIG. 20, a flow chart indicating the operation of the processing techniques that take place at the CPU 235 to determine the thickness of the grass and manipulate the autonomous robot's 200 movement and blade speed based on the data transmitted from the current sensor is illustrated. At step 601, the current sensor is powered on. Power can be provided to the current sensor via the power source 243, or in other embodiments the current sensor may include its own power source. After the current sensor is powered on and the autonomous robot 200 is powered on, the current sensor calculates the average current value at step 602.

Upon calculating the average current value at step 602, the average current value is transmitted from the current sensor to the CPU 235 for processing. Specifically, the CPU 235 analyzes the current value data to compare the received current value data to a threshold current value that is stored in the memory device 233 of the autonomous robot 200. At step 603, the CPU 235 determines if the received current value is at least 10% greater than the threshold current value that is stored in the memory device 233. If the answer is yes, the CPU 235 proceeds to step 607 to make a determination as to whether the received current value is at least 30% greater than the threshold current value. If the answer at step 607 is no, the CPU will determine that the received current value is at least 10% greater than the threshold current value, but less than 30% greater than the threshold current value.

Upon making such a determination, the CPU 235 proceeds to step 604 where it makes a determination that thick grass has been detected. As a result of detecting thick grass due to the received current value being at least 10% greater than the threshold current value, the CPU 235 will apply more power to the blade motors at step 605 so that the blades 203 can rotate quicker. Furthermore, the CPU 235 will also reduce the velocity of the autonomous robot 200 at step 606 to ensure that the autonomous robot 200 is effectively cutting the thick grass. Of course, the invention is not to be so limited in all embodiments and in certain other embodiments in response to detecting thick grass at step 604, the CPU 235 will either apply more power to the blade motors at step 605 or reduce the velocity of the autonomous robot 200 at step 606, but will not do both.

If the answer at step 603 is yes and the answer at step 607 is yes, the CPU will make a determination that the received current value is at least 30% greater than the threshold current value. As a result, the CPU 235 will make a determination that an obstacle has been detected at step 608. Upon detecting an obstacle at step 608, the CPU 235 will shut down the blades at step 609 and move to avoid the obstacle at step 610. In this manner, the current sensor will enable the autonomous robot 200 to avoid colliding with previously unknown obstacles. Thus, the autonomous robot 200 is able to adapt to its environment during a working session.

If the answer at steps 603 and 607 are both no, the CPU 235 will proceed to step 611 where it will determine if the received current value from the current sensor is at least 10% below the threshold current value stored in the memory device 233. If the answer at step 611 is yes, the CPU 235 will proceed to step 615 where it will determine if the received current value from the current sensor is at least 30% below the threshold current value stored in the memory device 233. If the answer at step 615 is no, the CPU 235 will make a determination that the received current value is at least 10% below the threshold current value, but less than 30% below the threshold current value. As a result, the CPU 235 will determine that thin grass has been detected at step 612. In response to detecting thin grass, the CPU 235 will apply less power to the blade motors at step 613 to slow down the rotation of the blade motors. This will conserve energy and power so that the blade motors are not unnecessarily rotating at high speeds. Furthermore, the CPU 235 will also increase the velocity of the autonomous robot 200 at step 614 in response to detecting thin grass at step 612. Of course, the invention is not to be so limited in all embodiments and in certain other embodiments in response to detecting thin grass at step 612, the CPU 235 will either apply less power to the blade motors at step 613 or increase the velocity of the autonomous robot 200 at step 614, but will not do both.

Finally, if the answer at step 615 is yes, the CPU 235 will make a determination that the received current value is at least 30% below the threshold current value stored in the memory device 233. As a result, the CPU 235 will determine that no grass is detected at step 616. Upon detecting no grass at step 616, the CPU 235 will cause the autonomous robot 200 to move back into the working area (i.e., the area of confinement/area of confinement 230, 530) at step 617.

After each of steps 606, 610, 614 and 617, depending on the current value detected by the current sensor, the CPU 235 will record the received current value into the memory device 233 at step 618. After recording the received current value into the memory device 233, the CPU 235 will transmit the received current value to the server 400 in one of the manners as has been described above. For example, the CPU 235 may transmit the received current value to the docking station 300 via the wireless signal transceiver 234, and the docking station may then transmit the received current value to the server 400 (see FIG. 17).

In certain embodiments, the server 400 will be able to use the received current values to map the thickness of the grass. As noted above, the area of confinement map can be viewed by a user on an external device. The server 400 will be able to map the thickness of the grass on the area of confinement map so that the user can view the various grass thicknesses to determine which areas of the lawn may be better suited for receiving fertilizer. For example, the user will be able to determine which areas of the lawn have thin grass simply by viewing the displayed map of the area of confinement, and the user can apply fertilizer to those thin grass areas.

Figure 22:
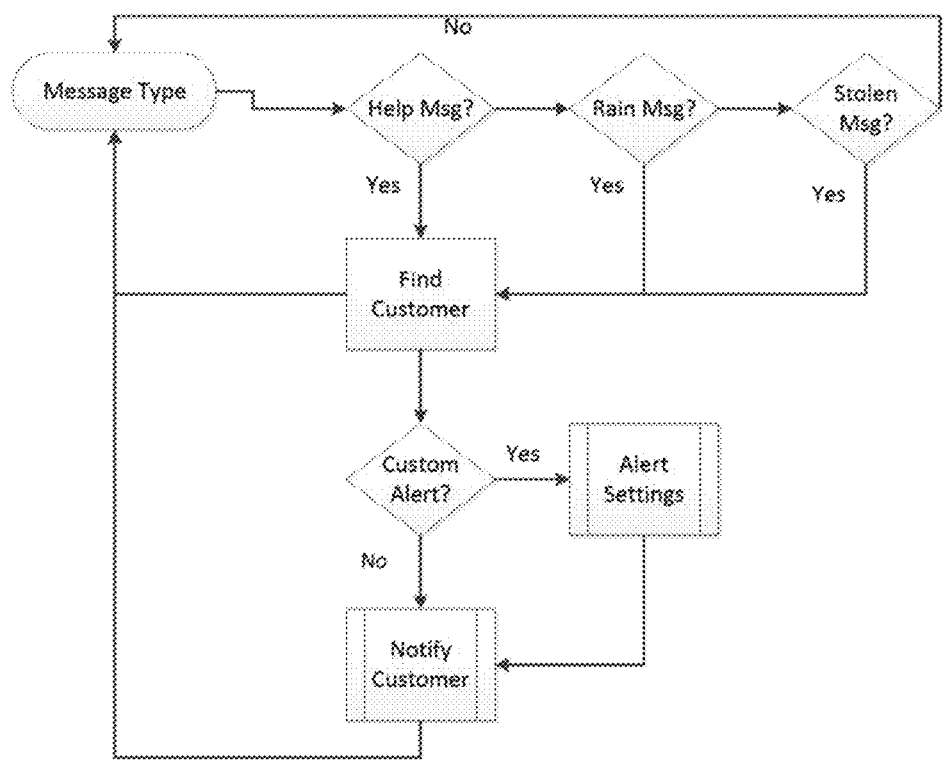
FIG. 22 is a flow chart illustrating transmission of messages from the autonomous robot to a user.

In certain embodiments, the autonomous robot 200 is capable of sending a message to a user in order to provide the user with information about the autonomous robot's 200 current state. Examples of messages that can be sent include a "Help" message, a "Rain" message and a "Stolen" message. These messages and the processing techniques that facilitate transmitting these messages to the user are illustrated in the flow chart of FIG. 22 and described below.

In certain embodiments, the autonomous robot 200 has two separate drive motors, one for driving each of the respective drive wheels 202. For example, the autonomous robot 200 can include a right DC drive motor for driving the right drive wheel and a left DC drive motor for driving the left wheel. During operation of the autonomous robot 200, the autonomous robot 200 monitors for non-optimal situations. For example, each of the right and left DC drive motors may include a separate current sensor, which is operably to the CPU 235. Thus, the CPU 235 will monitor the current sensors for non-optimal situations as noted above. As one non-limiting example, if the right DC drive motor's current sensor sends a signal to the CPU 235 indicating that there has been a spike in current for a predetermined duration of time and the left DC drive motor's current sensor does not send a similar signal, the CPU 235 will determine that the right drive wheel is stuck or unable to move.

In response to determining that the right drive wheel is stuck or unable to move, the CPU 235 will attempt to mitigate the situation by moving in reverse and/or spinning. Spinning involves the CPU 235 moving the left drive wheel in a forward direction while simultaneously moving the right drive wheel in a reverse direction, or vice versa. If this technique is unable to achieve making the right drive wheel of the autonomous robot 200 unstuck, then the CPU 235 will send a "Help" message to the docking station 300 using the processes that have been discussed in detail above.

Upon receiving the "Help" message from the CPU 235 of the autonomous robot 200, the docking station 300, which acts as a communication gateway between the autonomous robot 200 and the server 400 as has been described above, will transmit the "Help" message to the server 400. Upon receiving the "Help" message, the server 400 will identify the message, correlate the message to a particular user account, and then provide the user with a specific or customized message. In certain embodiments, the server 400 may send the message to the user via electronic mail. However, the invention is not to be so limited and in other embodiments the server 400 may post the message onto the user's online account so that the user will see the message when he/she logs in to the website as has been described above. In certain embodiments, a default "Help" message may state "Your autonomous robot is stuck, please help your autonomous robot when you can." However, the user has the ability to customize this message to any text string as desired.

Similar alerting processes and techniques can be utilized when rain is detected. Specifically, the CPU 235 can be capable of identifying weather patterns as has been discussed above so as to decide whether or not to attempt a work session based on the weather pattern. When the CPU 235 detects rain, a message may be sent to the user that states "The autonomous robot has detected rain and is heading back home," or any other desired user-customizable message. The message is sent to the user using the same processes and techniques discussed above with regard to the "Help" message.

Furthermore, the autonomous robot 200 may also send a "Stolen" message to a user if the autonomous robot 200 detects that it is being stolen (i.e., carried without authorization such that the Pin number was not transmitted by the remote). In such a circumstance, the autonomous robot 200 will send the "Stolen" message to the server 400 (via the docking station 300). The "Stolen" message contains the autonomous robot's 200 GPS location and is transmitted continuously until the Secure Pin has been entered, the autonomous robot's 200 battery is removed, or the user has disabled the stolen messaging feature on the website. In certain embodiments, the user can customize the "Stolen" alert to only engage if the autonomous robot 200 leaves the defined area of confinement 220.

Figure 14:
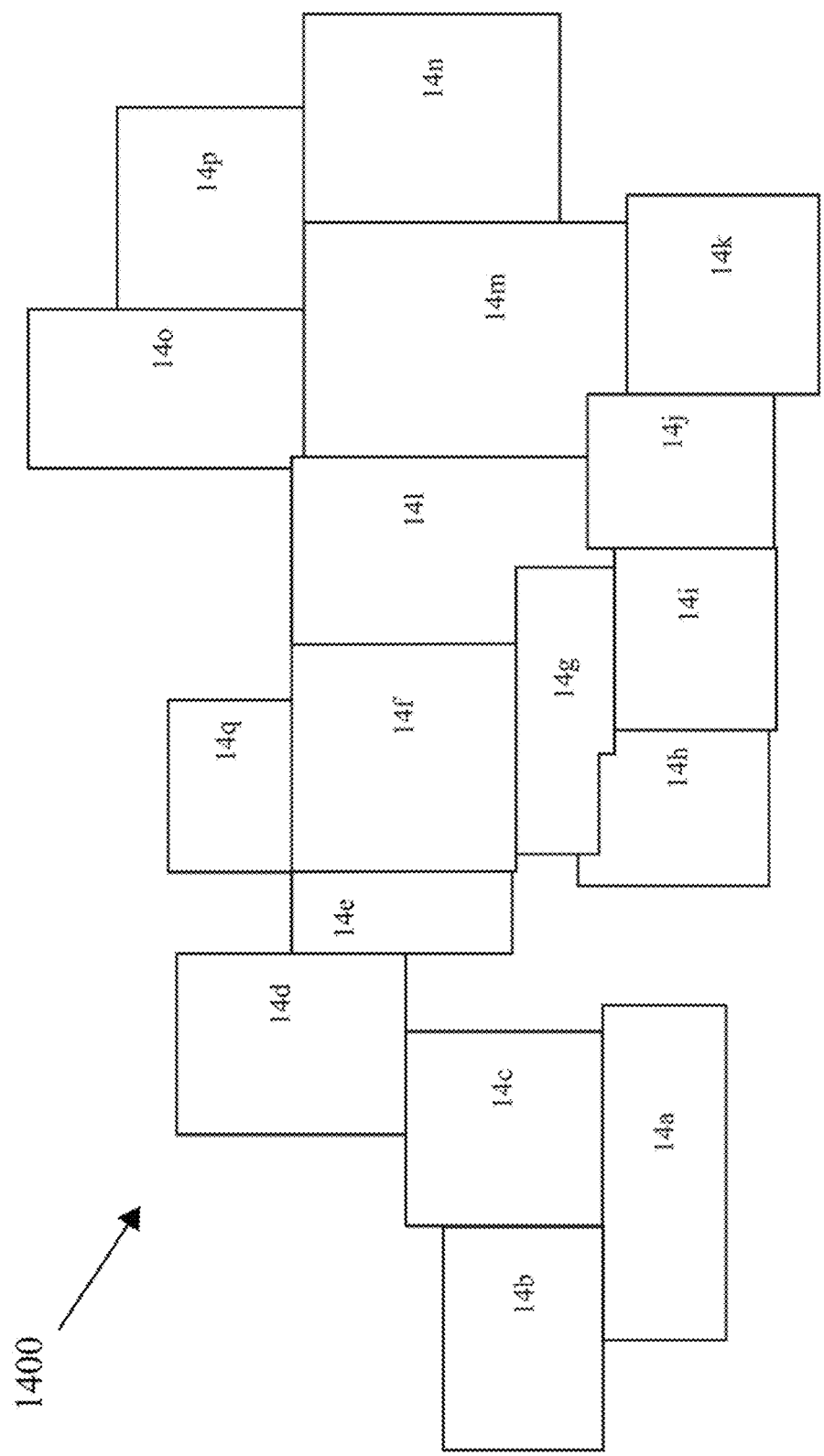
FIG. 14 is a block diagram of the control system circuit of the autonomous robot of FIG. 1 according to an embodiment of the present invention.
Figure 14A:
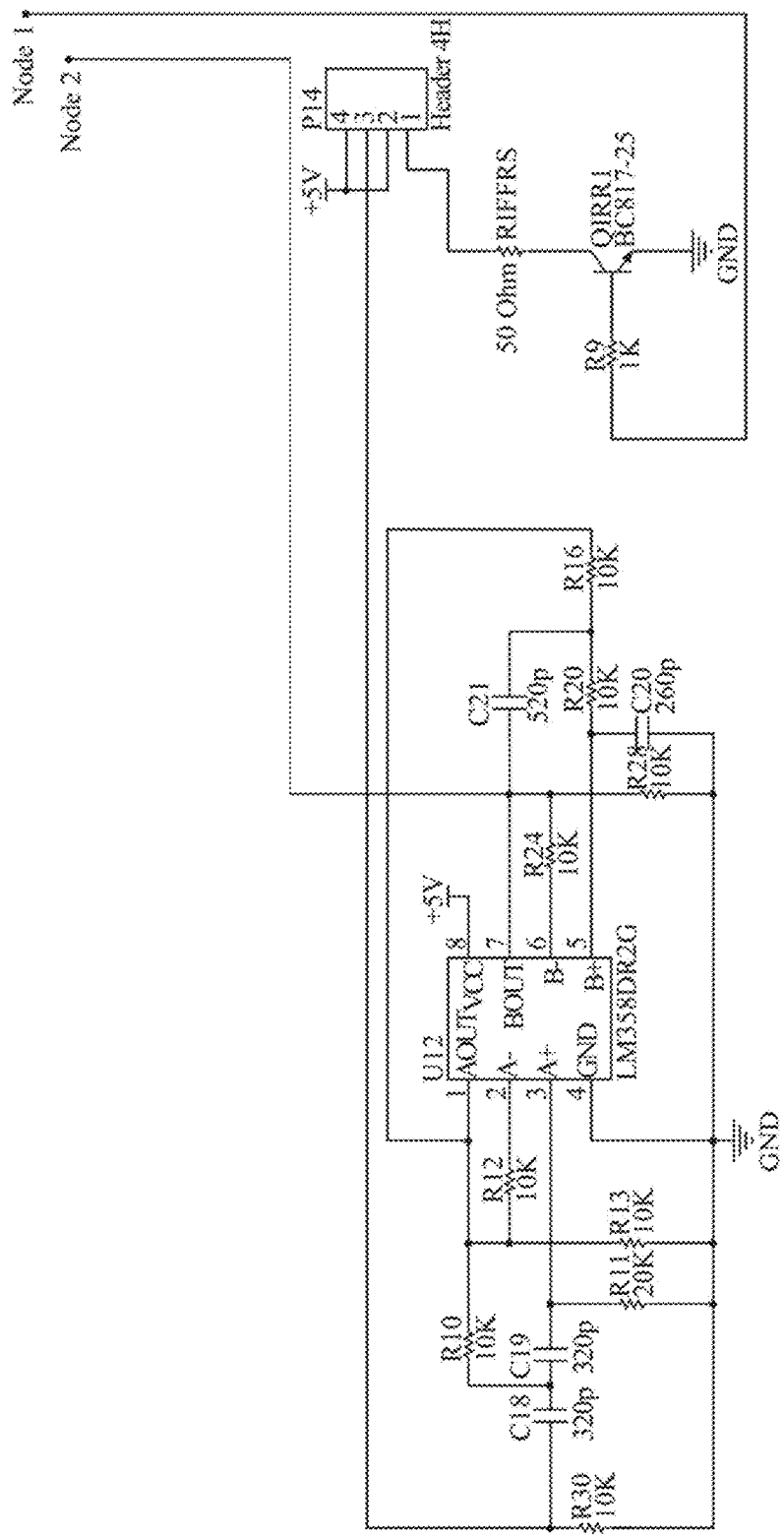
FIG. 14a is an electrical schematic of section 14a of the control system circuit of FIG. 14.
Figure 14B:
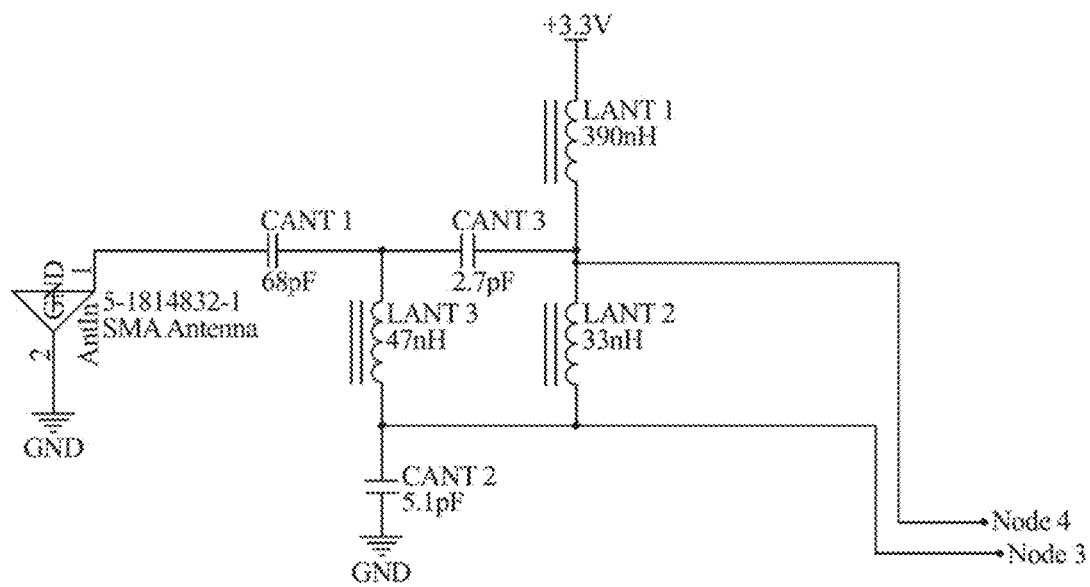
FIG. 14b is an electrical schematic of section 14b of the control system circuit of FIG. 14.
Figure 14C:
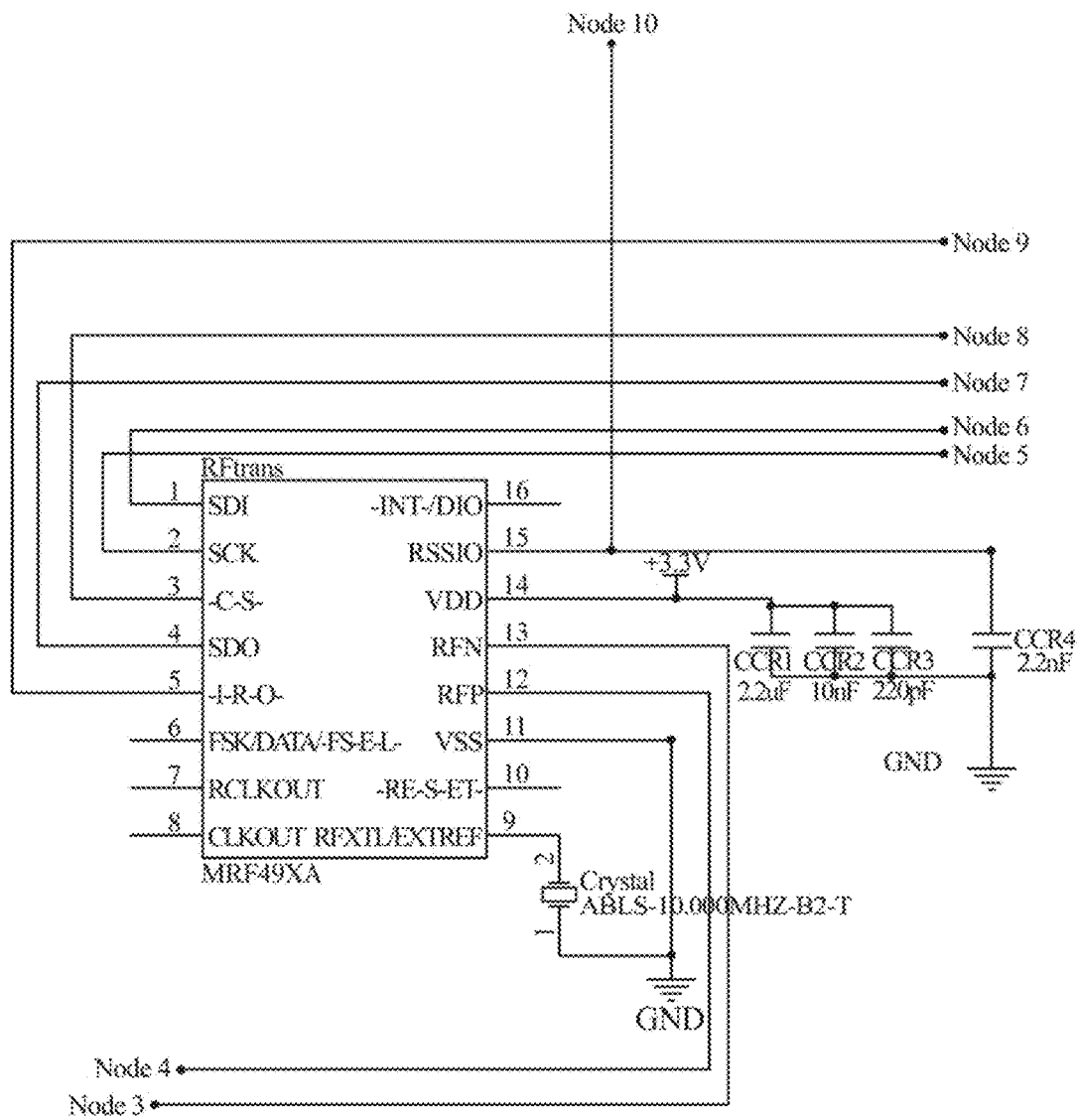
FIG. 14c is an electrical schematic of section 14c of the control system circuit of FIG. 14.
Figure 14D:
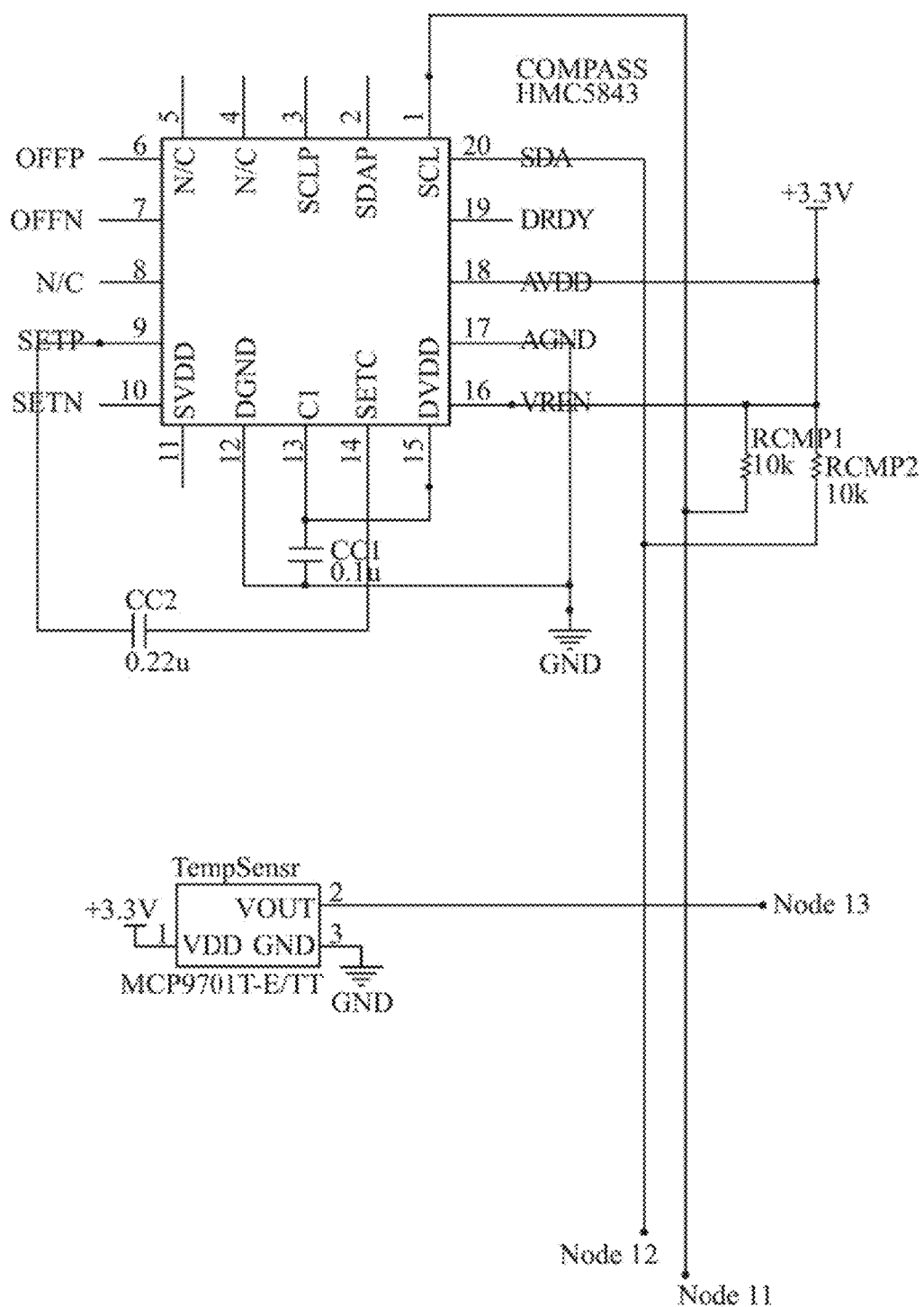
FIG. 14d is an electrical schematic of section 14d of the control system circuit of FIG. 14.
Figure 14E:
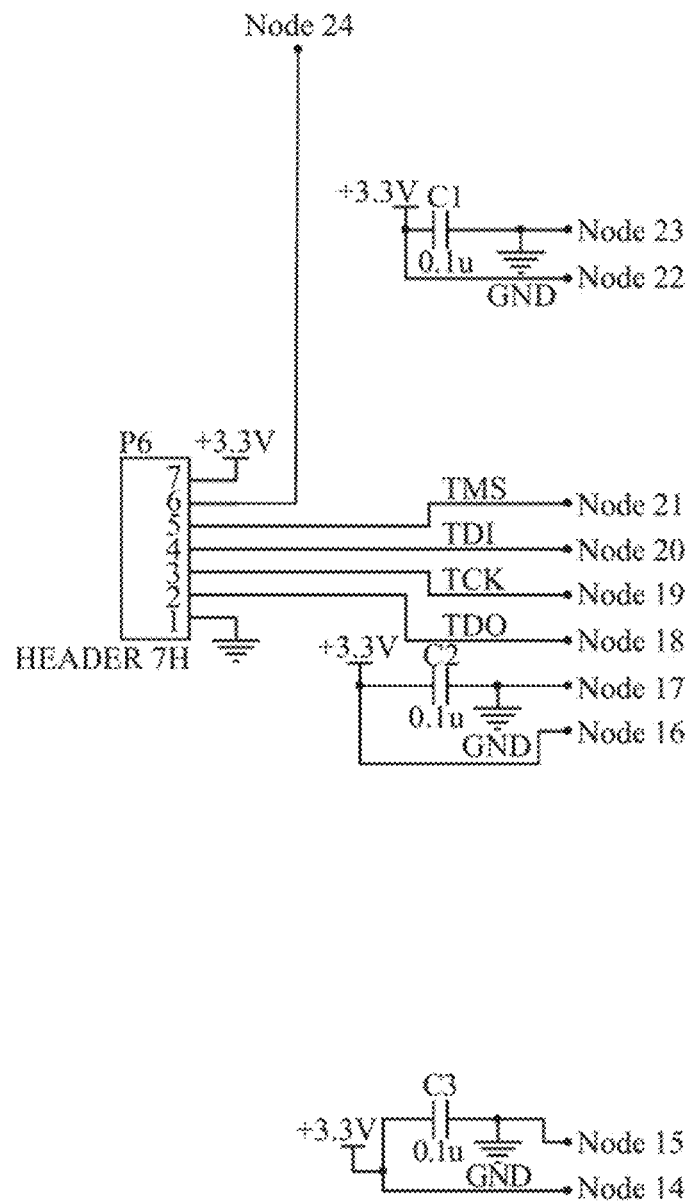
FIG. 14e is an electrical schematic of section 14e of the control system circuit of FIG. 14.
Figure 14F:
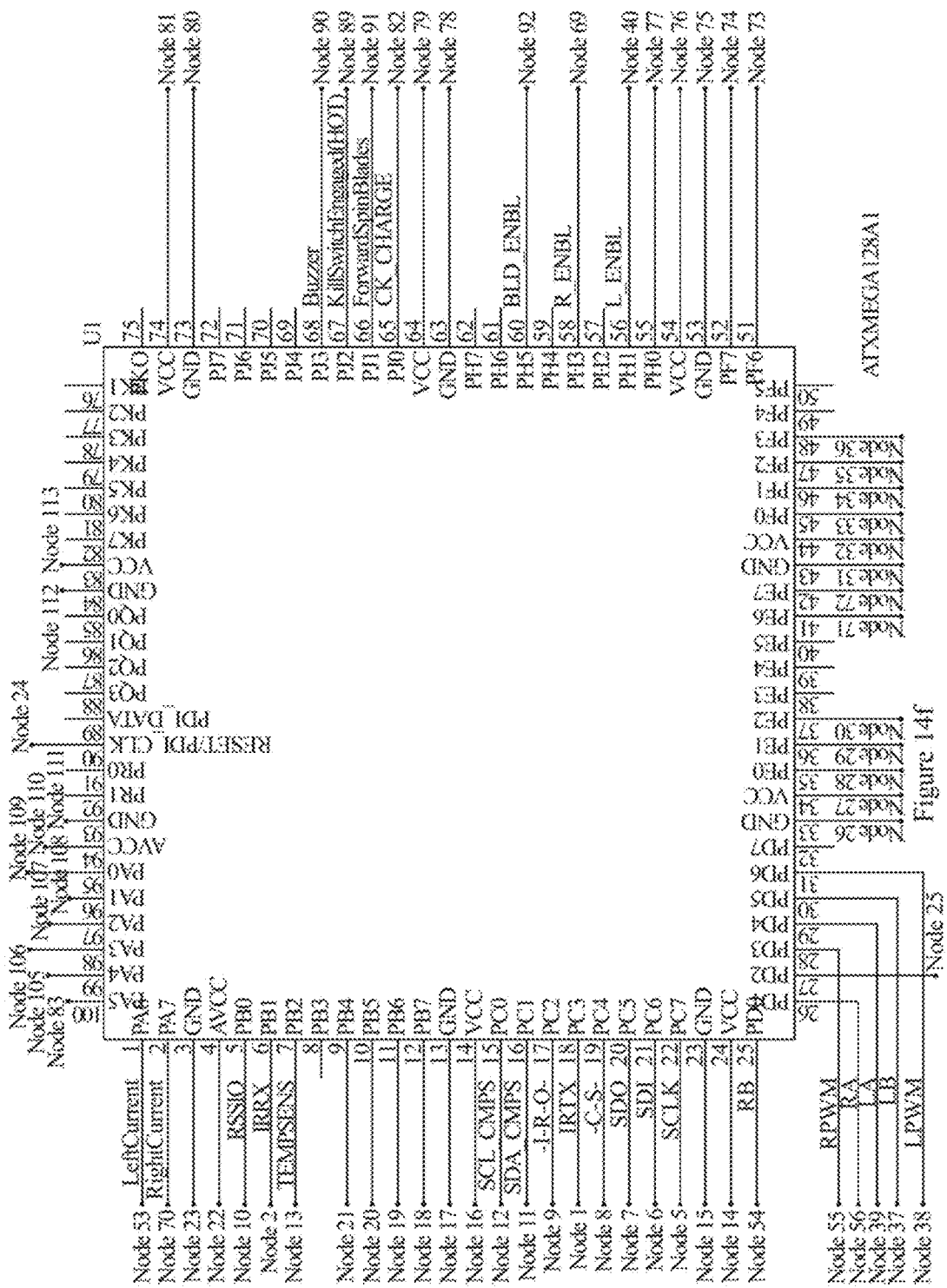
FIG. 14f is an electrical schematic of section 14f of the control system circuit of FIG. 14.
Figure 14G:
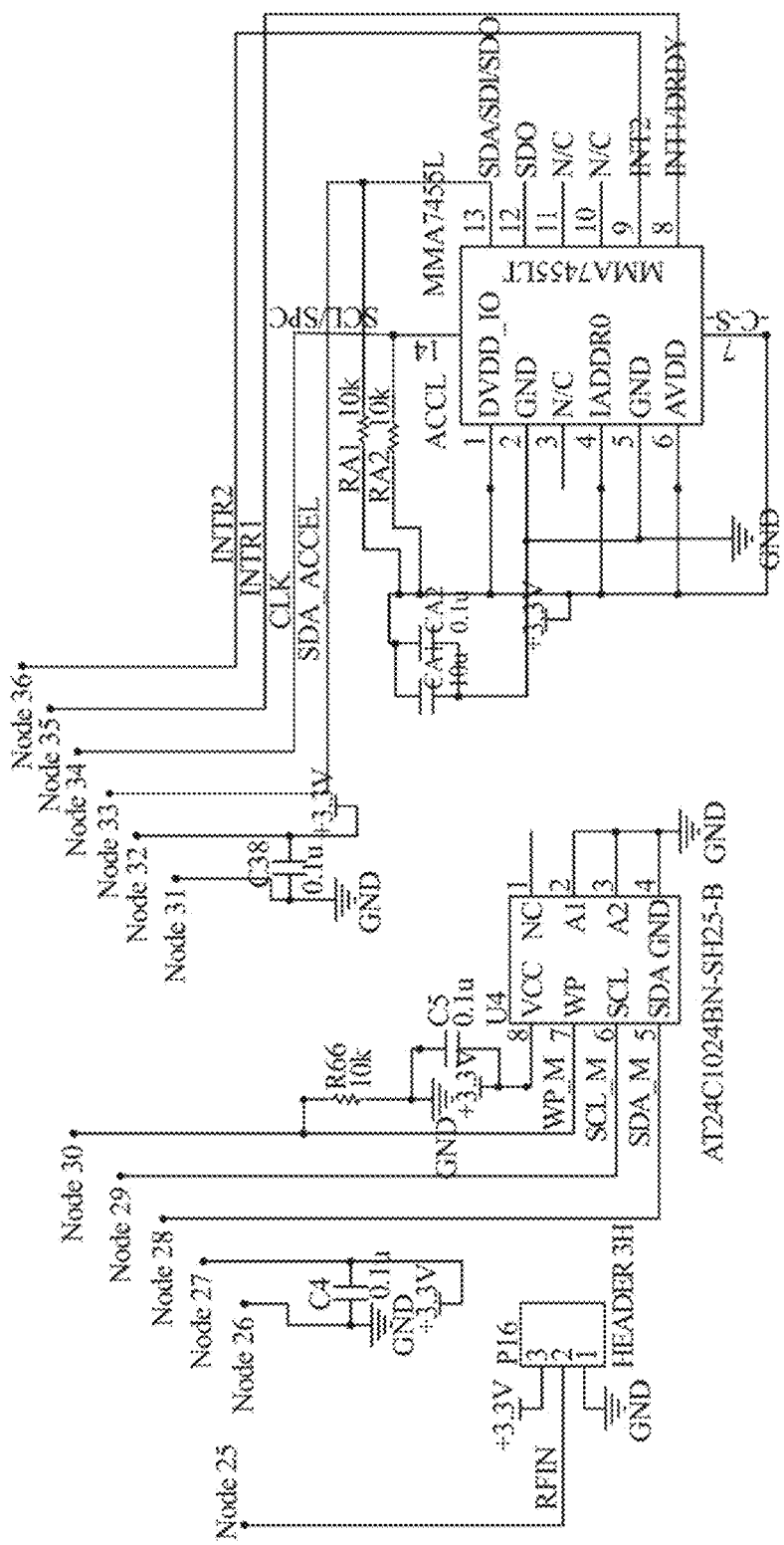
FIG. 14g is an electrical schematic of section 14g of the control system circuit of FIG. 14.
Figure 14H:
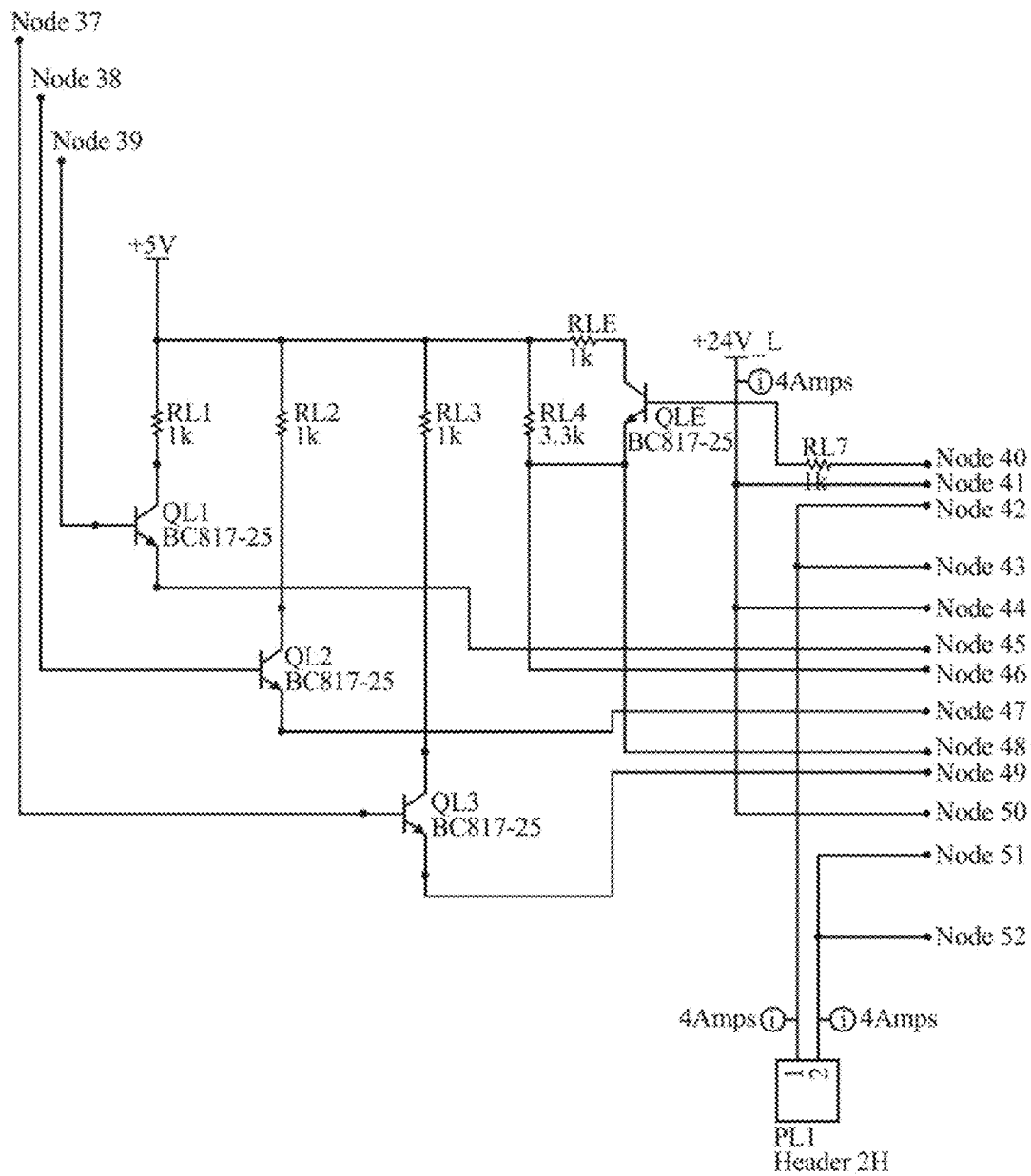
FIG. 14h is an electrical schematic of section 14h of the control system circuit of FIG. 14.
Figure 14I:
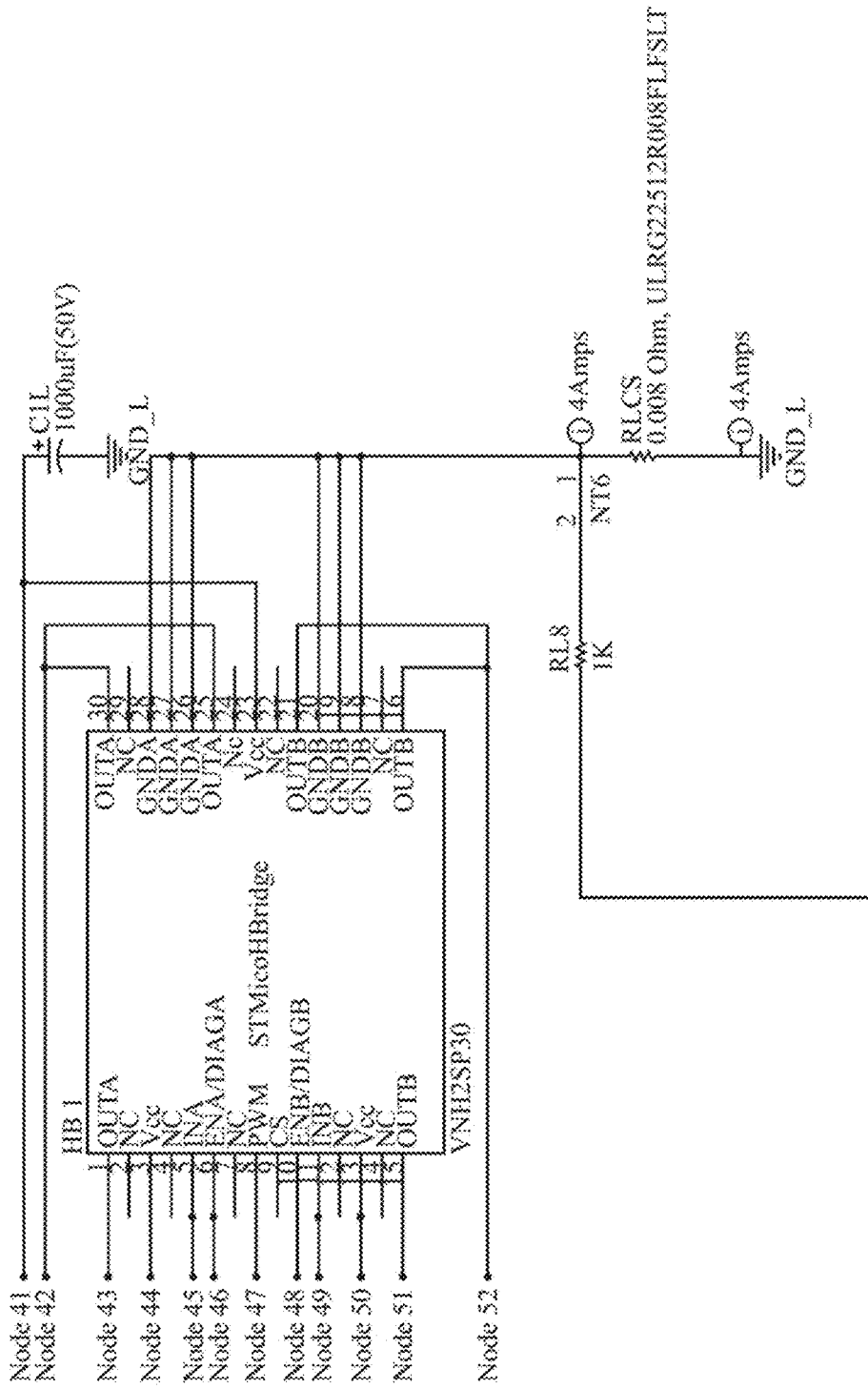
FIG. 14i is an electrical schematic of section 14i of the control system circuit of FIG. 14.
Figure 14J:
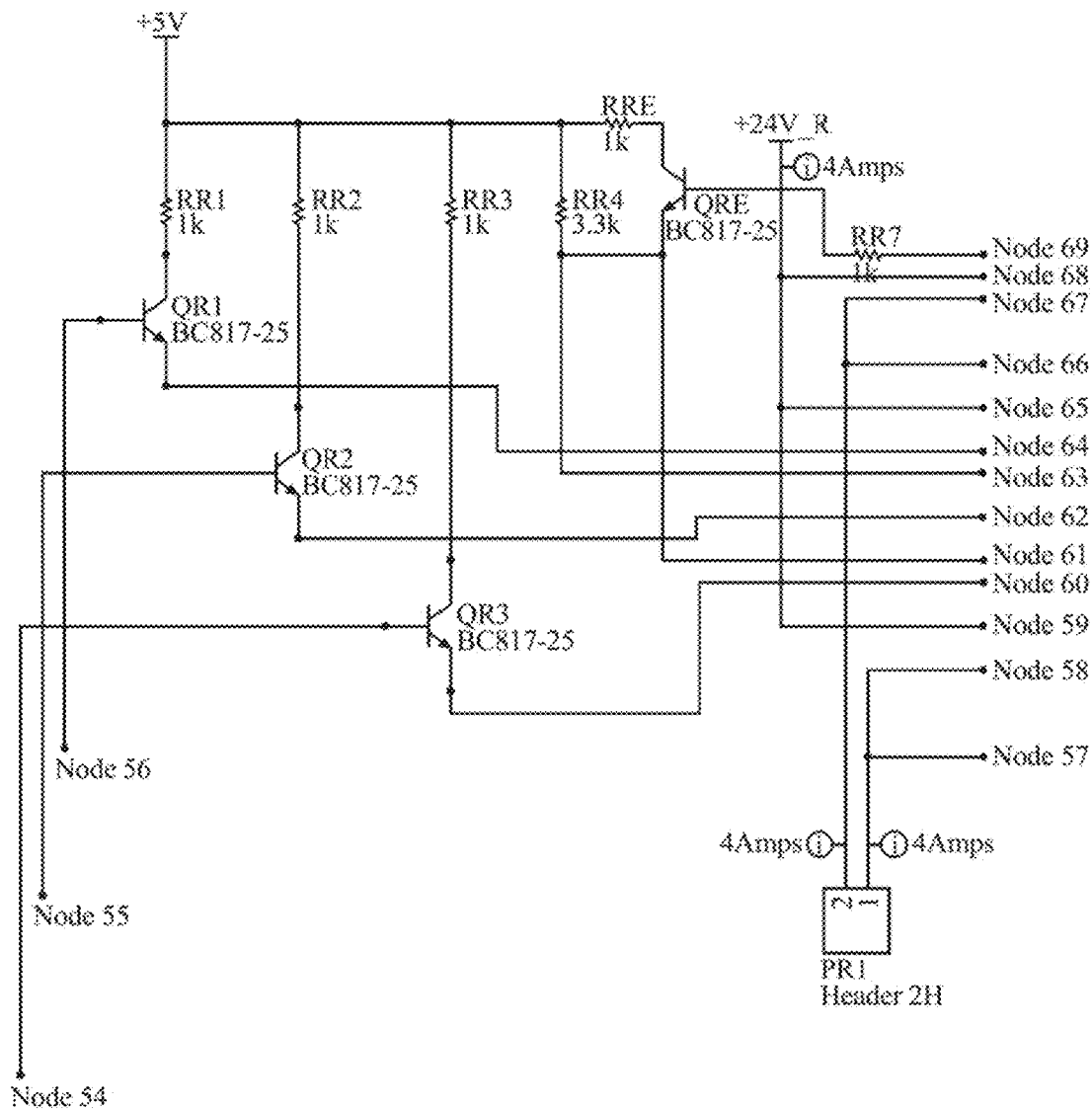
FIG. 14j is an electrical schematic of section 14j of the control system circuit of FIG. 14.
Figure 14K:
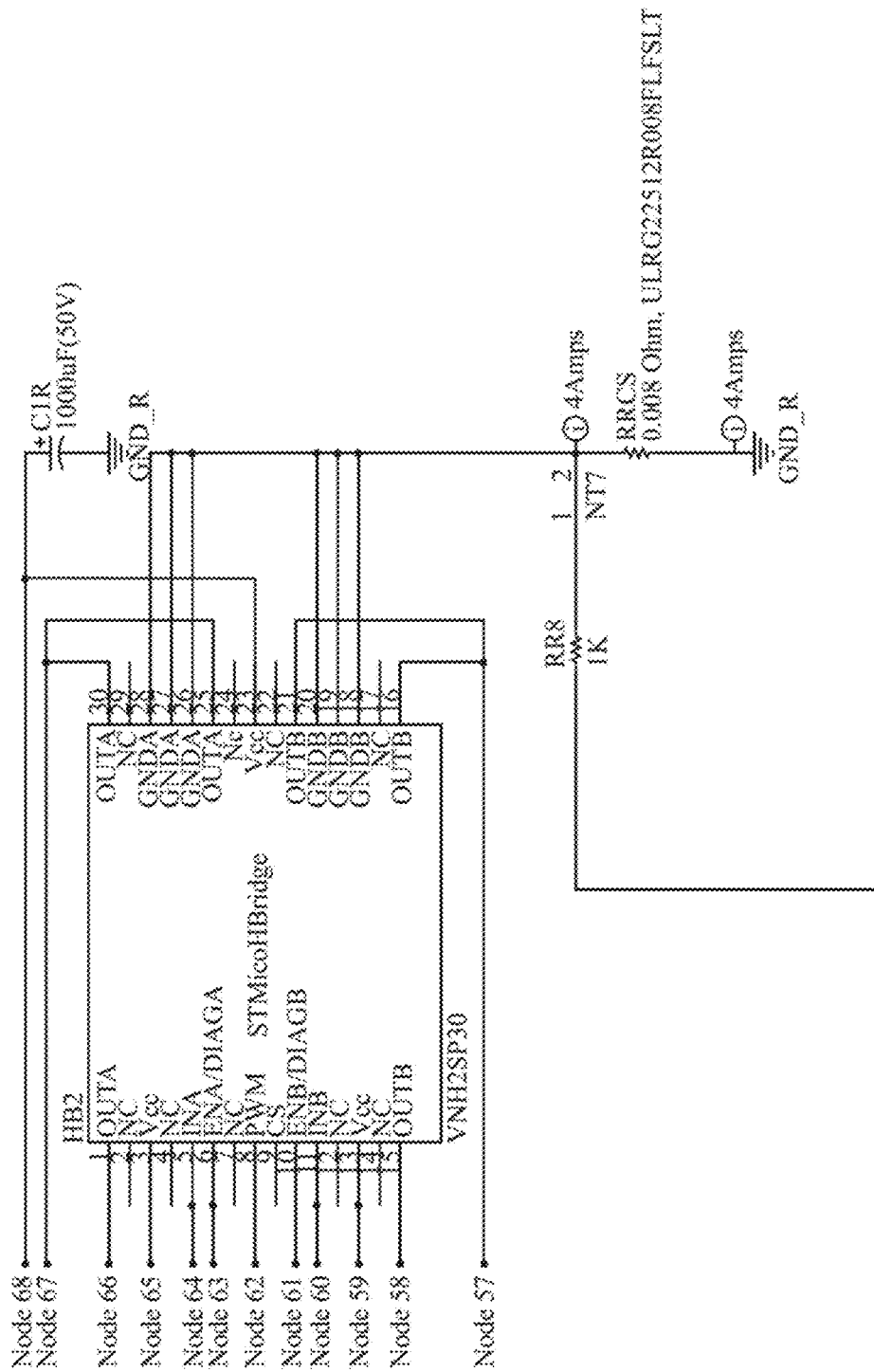
FIG. 14k is an electrical schematic of section 14k of the control system circuit of FIG. 14.
Figure 14M:
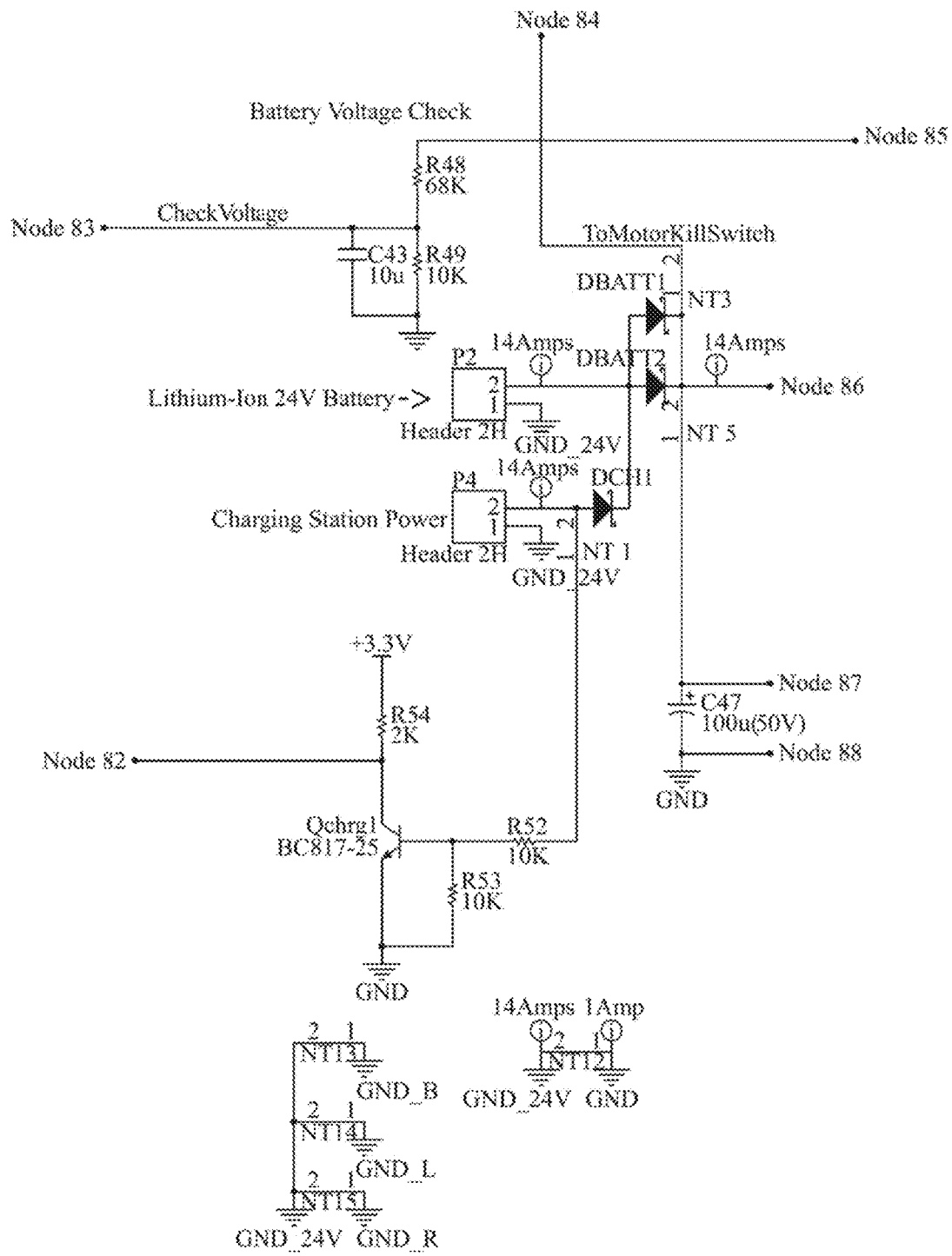
FIG. 14m is an electrical schematic of section 14m of the control system circuit of FIG. 14.
Figure 14N:
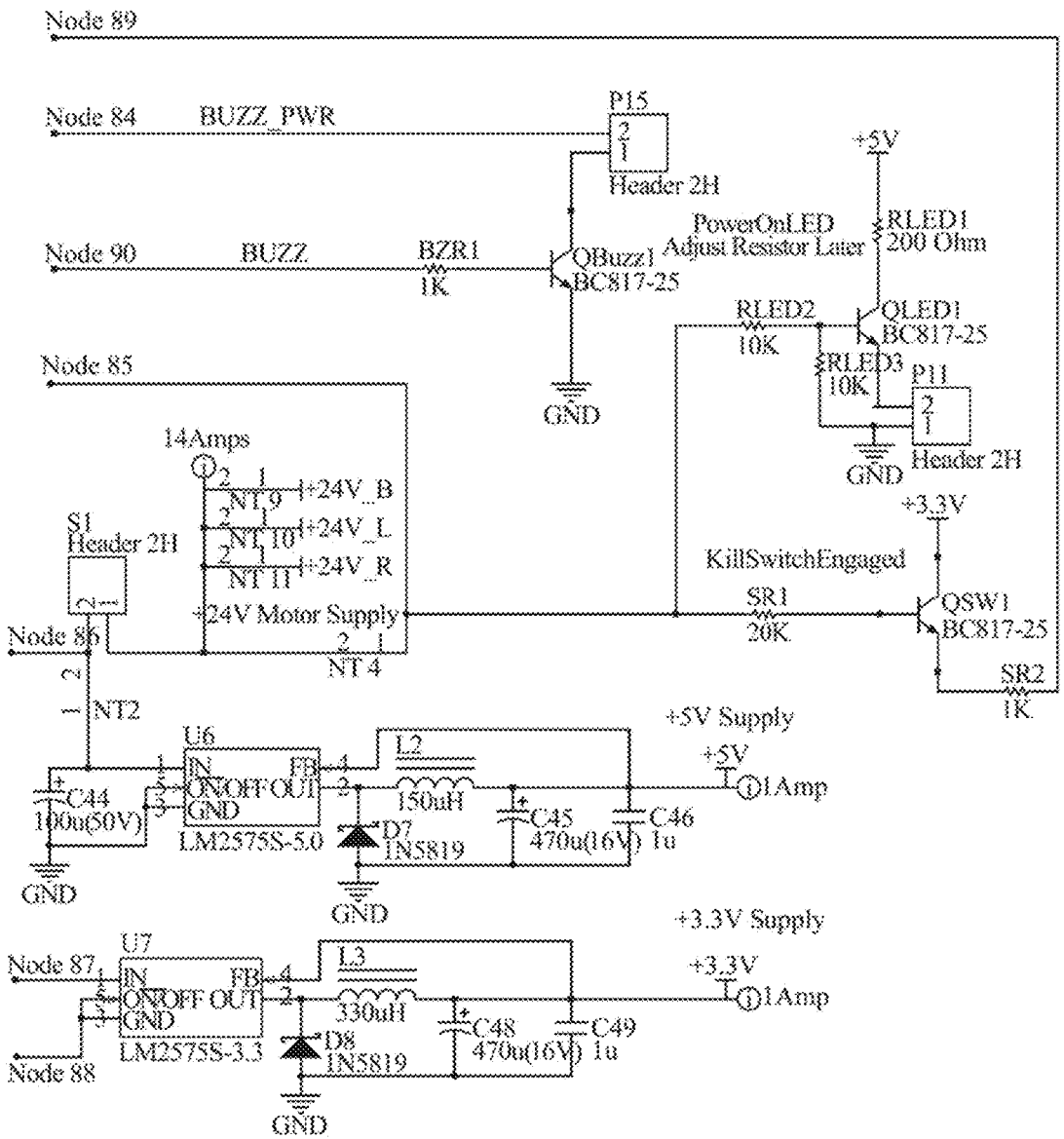
FIG. 14n is an electrical schematic of section 14n of the control system circuit of FIG. 14.
Figure 14O:
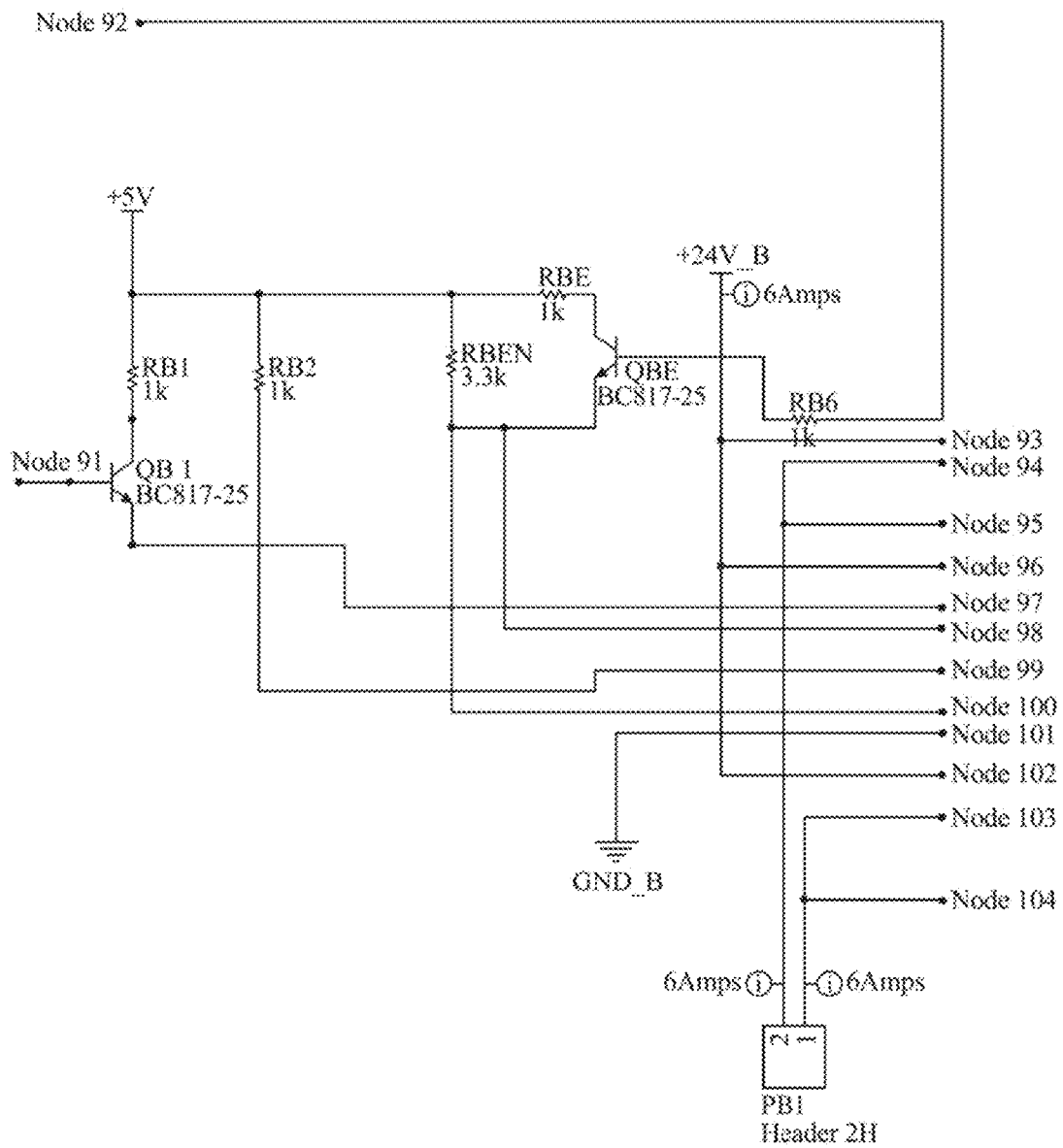
FIG. 14o is an electrical schematic of section 14o of the control system circuit of FIG. 14.
Figure 14P:
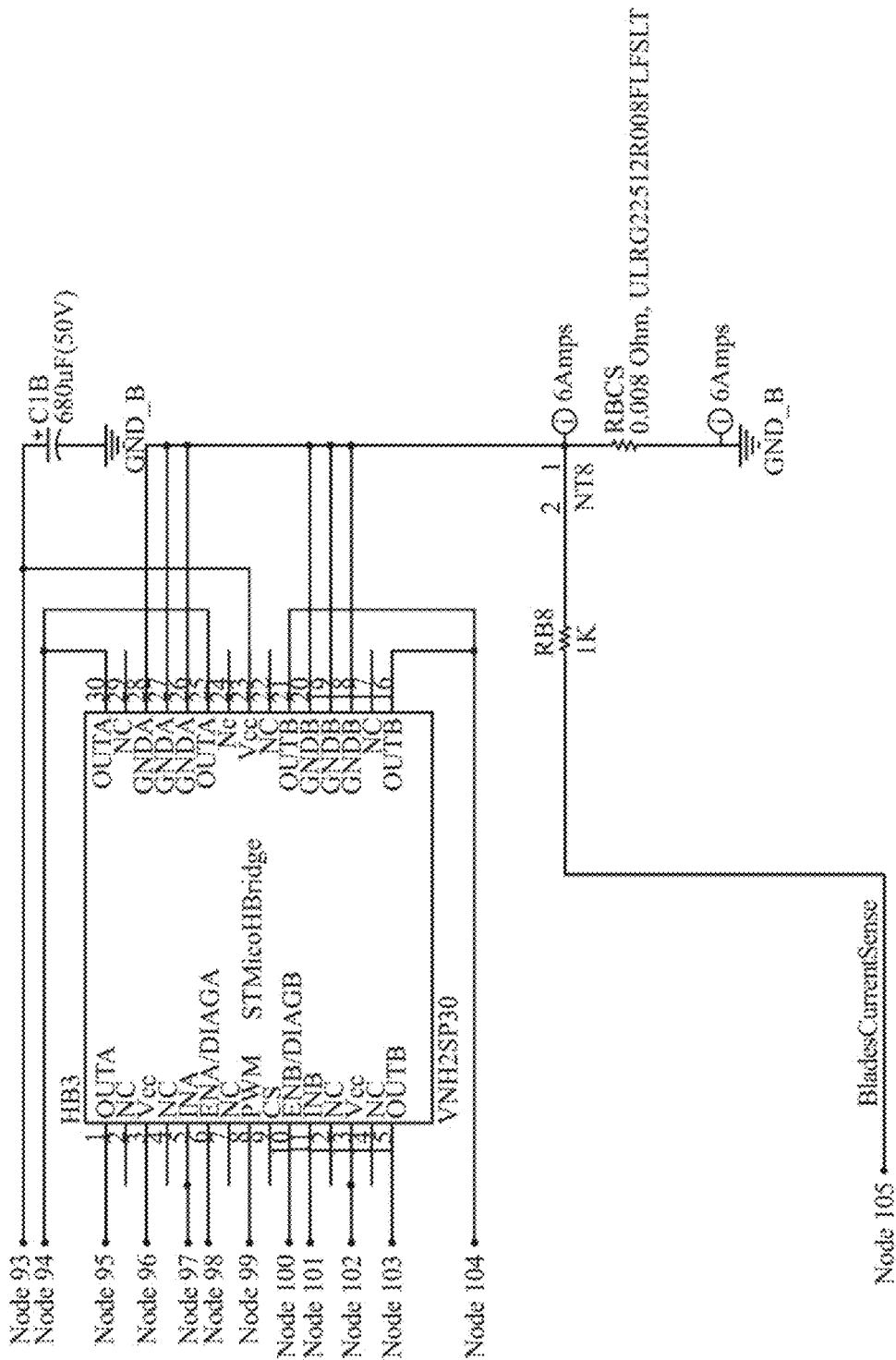
FIG. 14p is an electrical schematic of section 14p of the control system circuit of FIG. 14.
Figure 14Q:
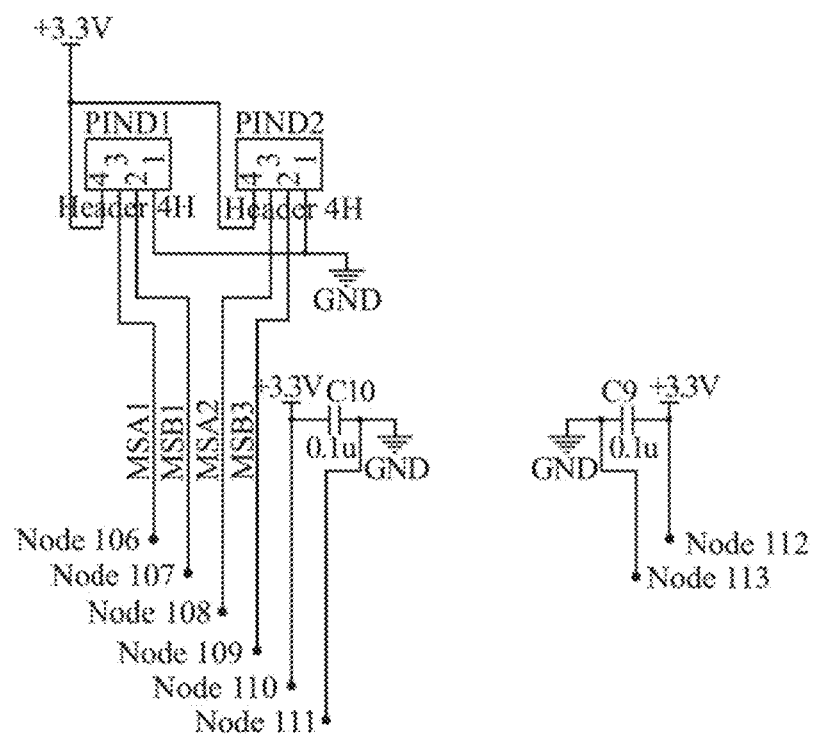
FIG. 14q is an electrical schematic of section 14q of the control system circuit of FIG. 14.
Figure 15A:
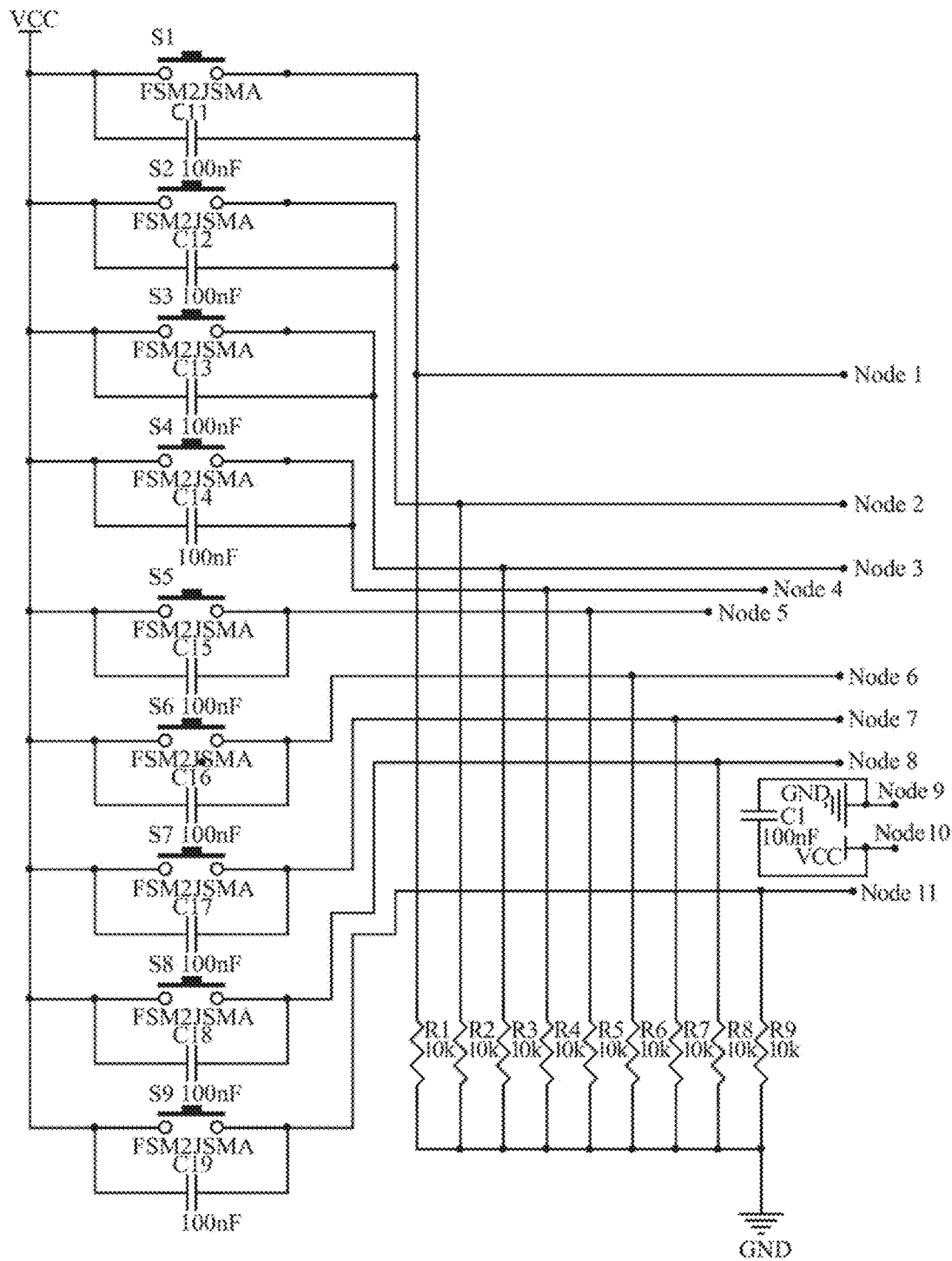
FIG. 15a is an electrical schematic of section 15a of the hand-held remote control circuit of FIG. 15.
Figure 15B:
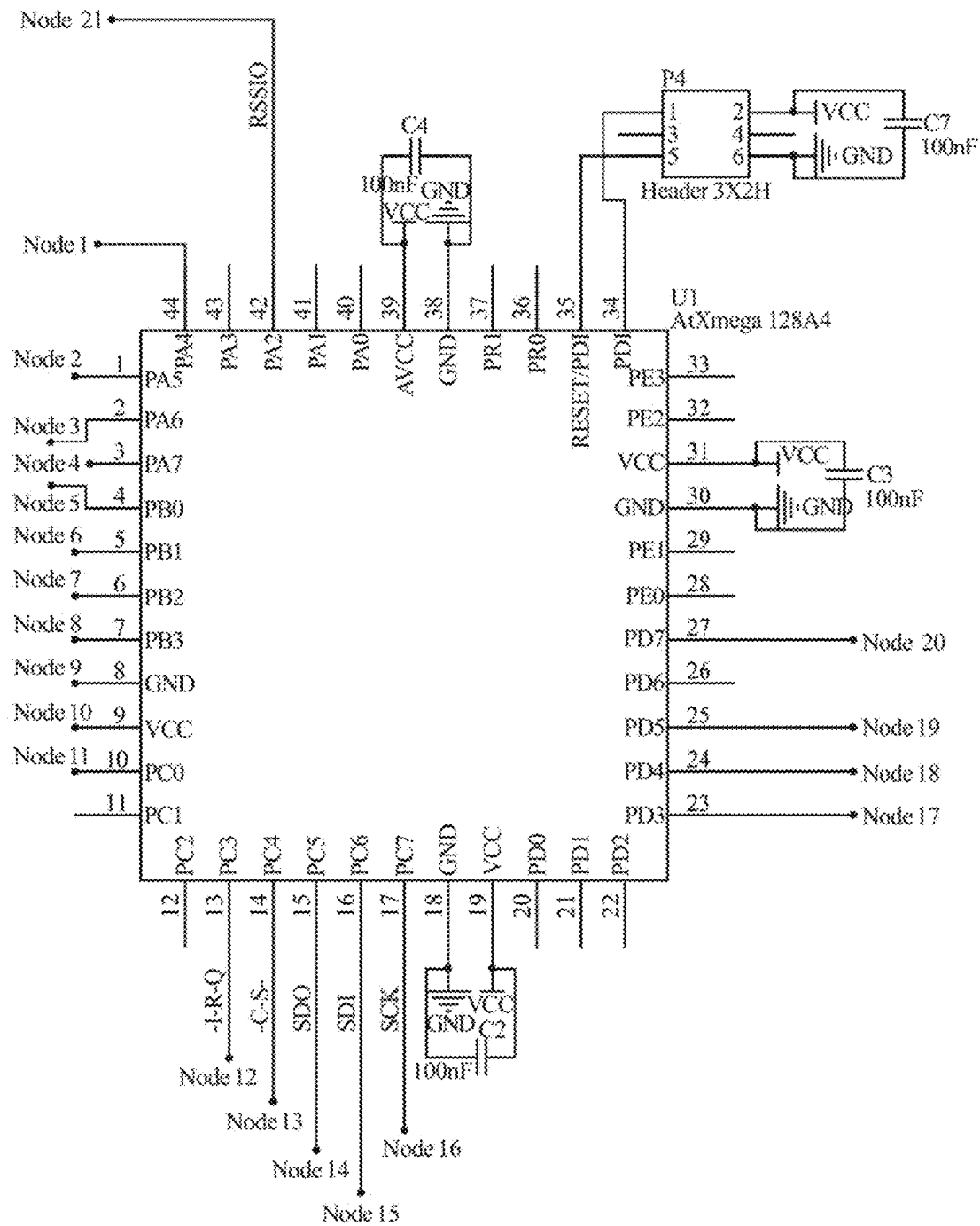
FIG. 15b is an electrical schematic of section 15b of the hand-held remote control circuit of FIG. 15.
Figure 15C:
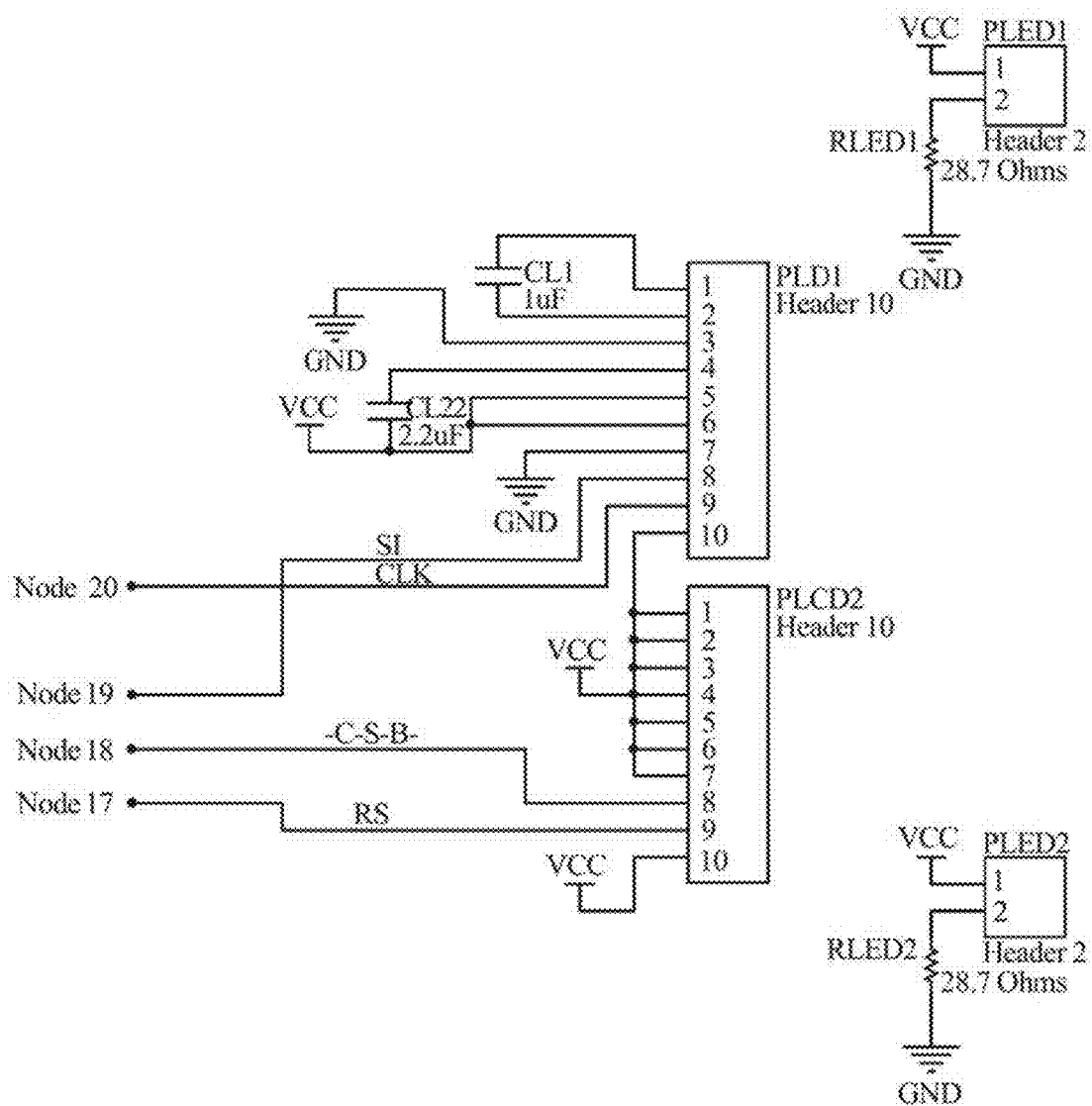
FIG. 15c is an electrical schematic of section 15c of the hand-held remote control circuit of FIG. 15.
Figure 15D:
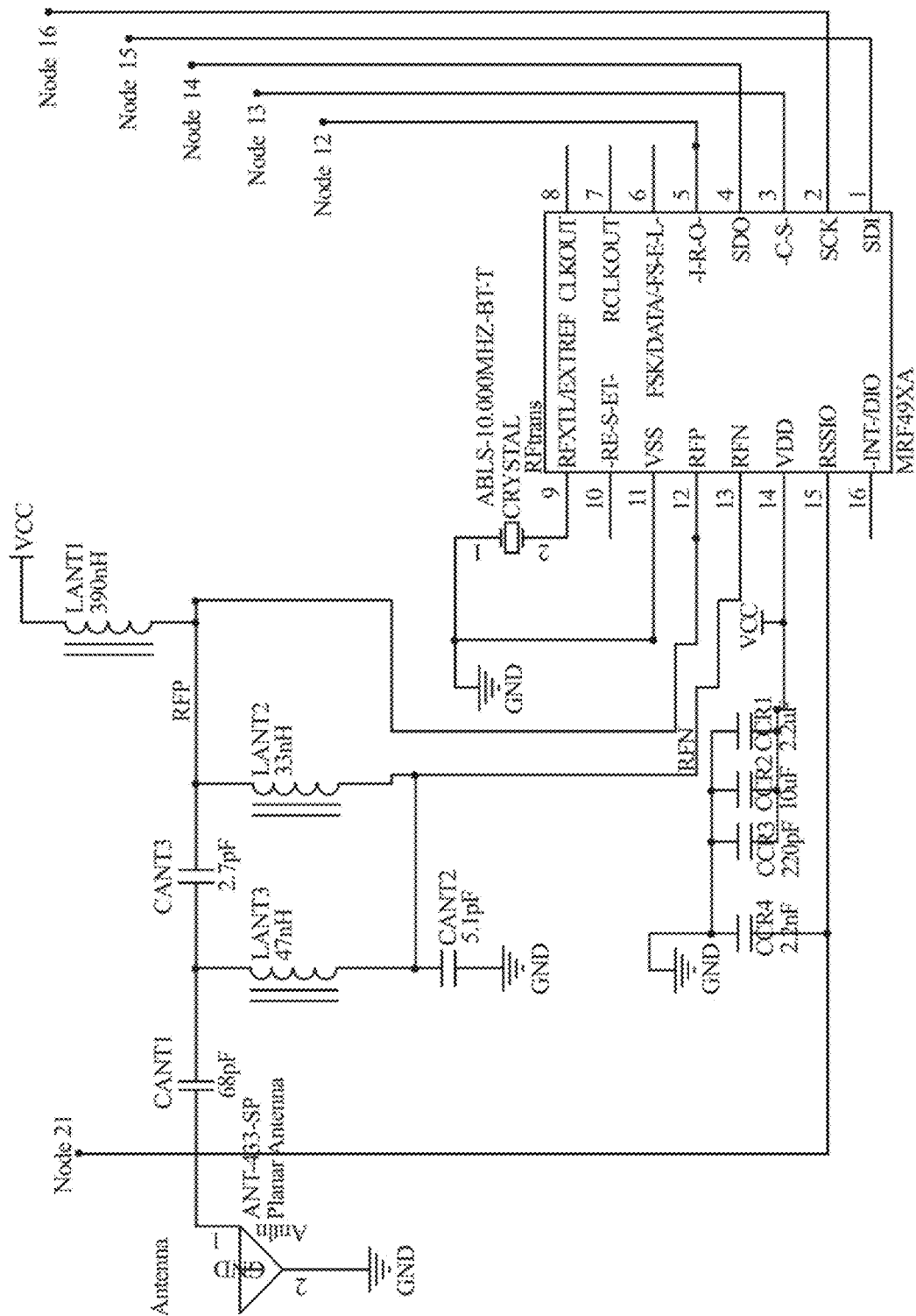
FIG. 15d is an electrical schematic of section 15d of the hand-held remote control circuit of FIG. 15.
Figure 15E:
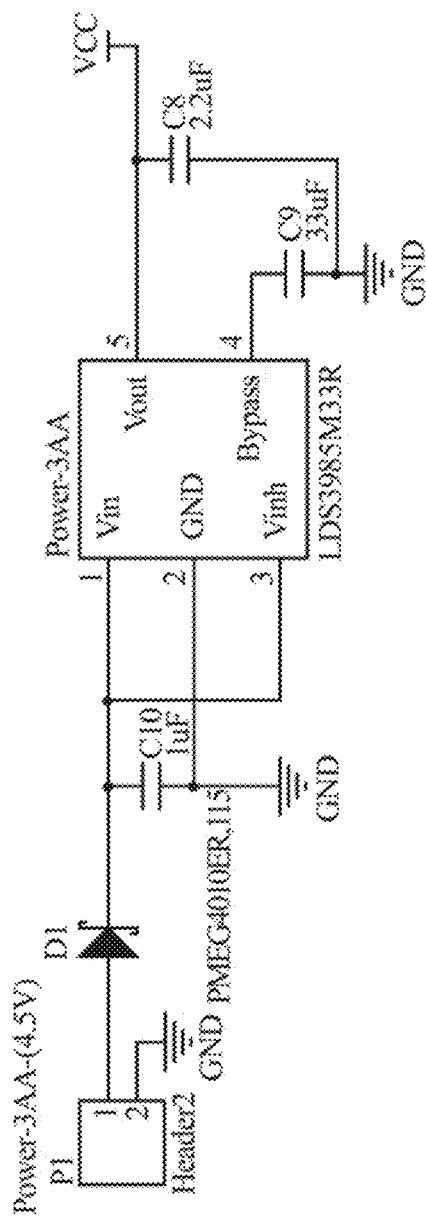
FIG. 15e is an electrical schematic of section 15e of the hand-held remote control circuit of FIG. 15.
Figure 16A:
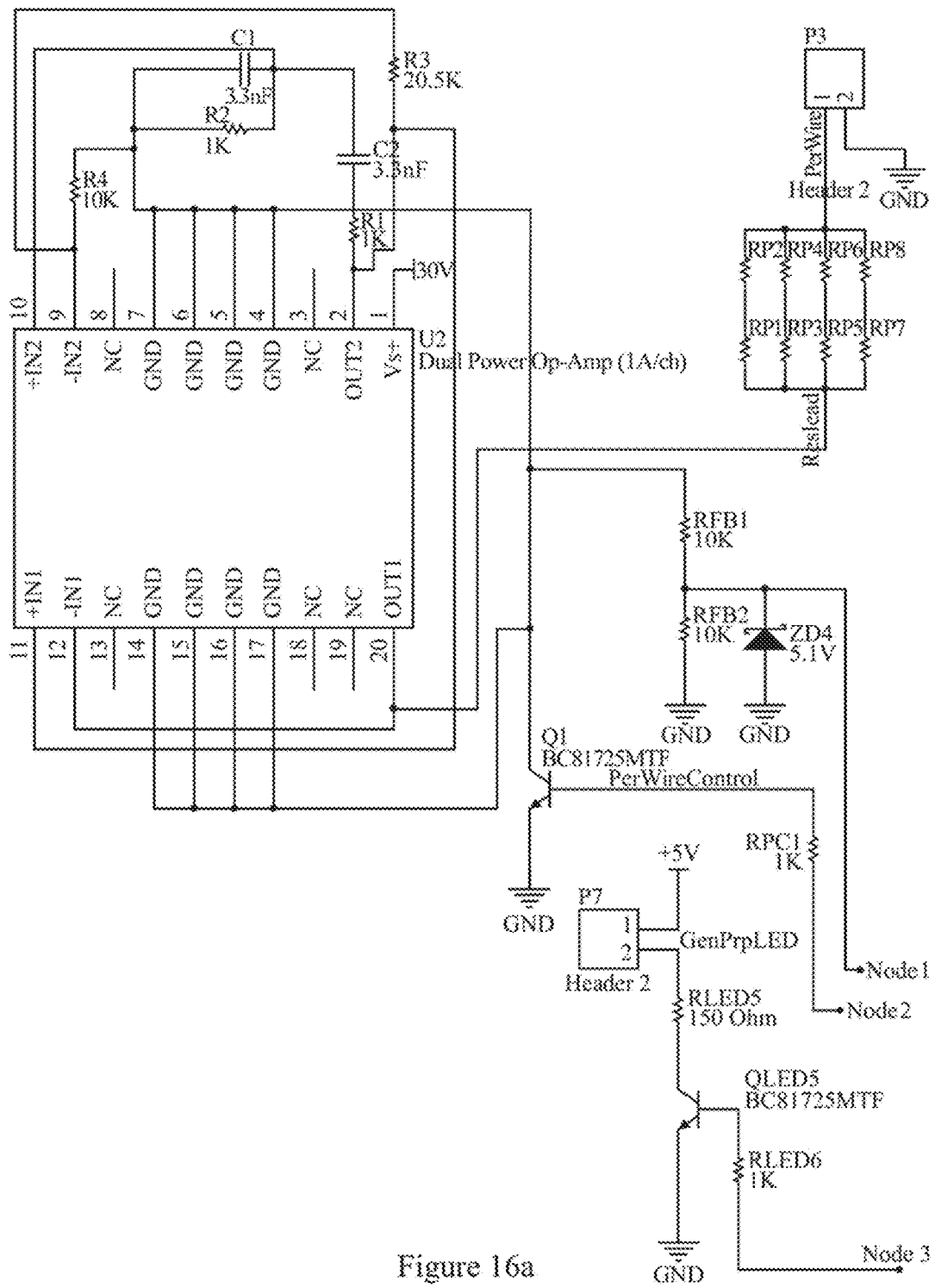
FIG. 16a is an electrical schematic of section 16a of the charging unit circuit of FIG. 15.
Figure 16B:
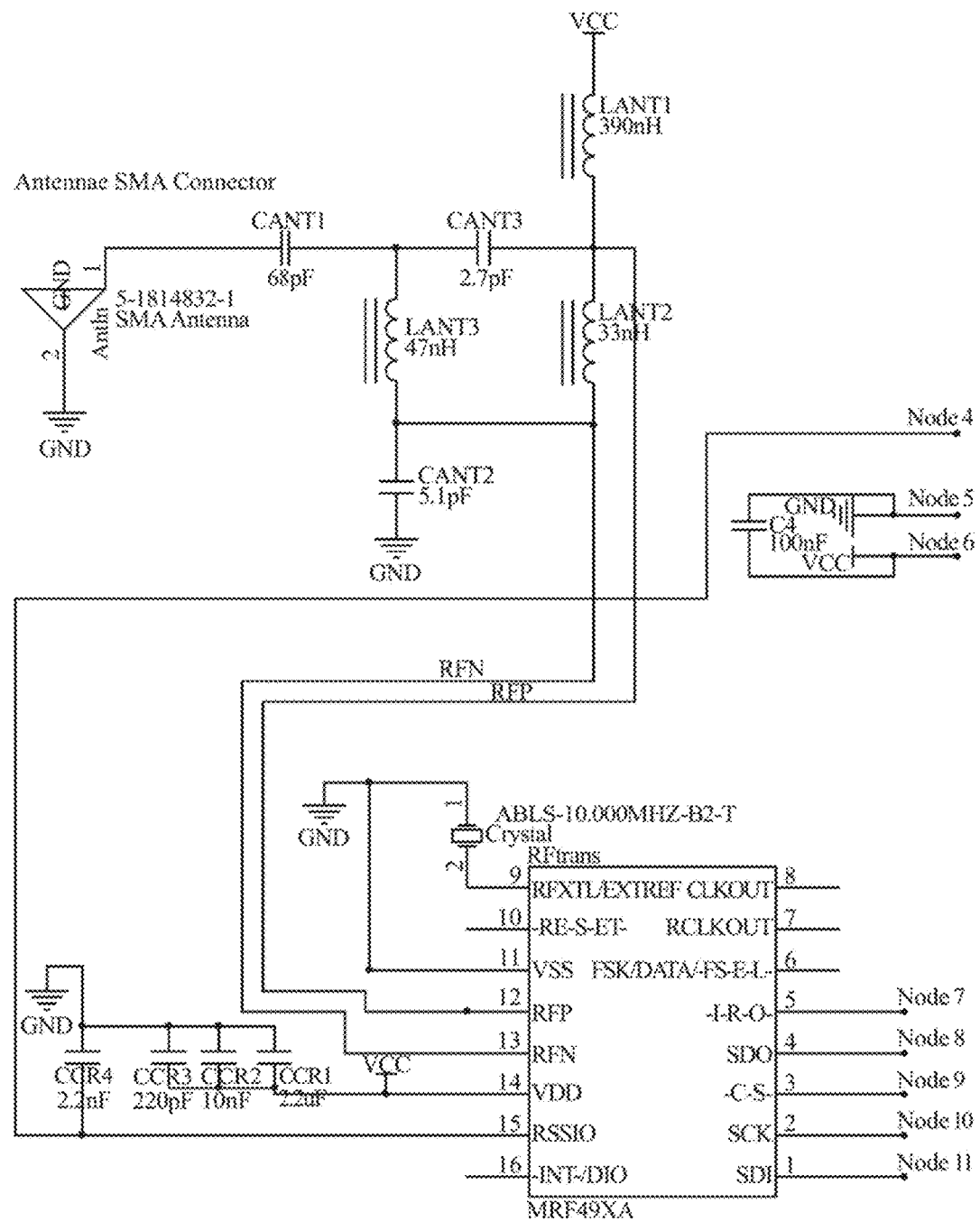
FIG. 16b is an electrical schematic of section 16b of the charging unit circuit of FIG. 15.
Figure 16C:
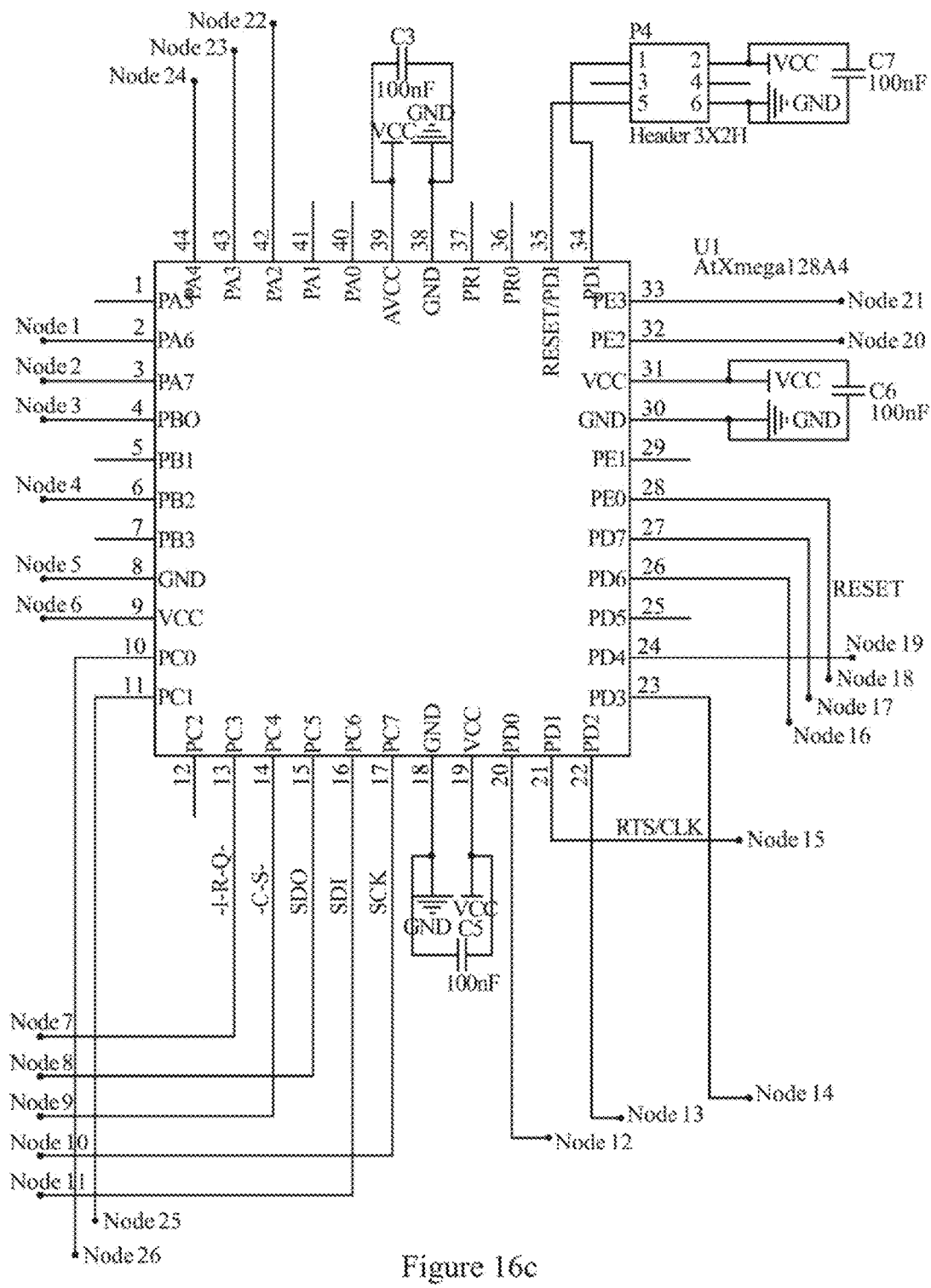
FIG. 16c is an electrical schematic of section 16c of the charging unit circuit of FIG. 15.
Figure 16D:
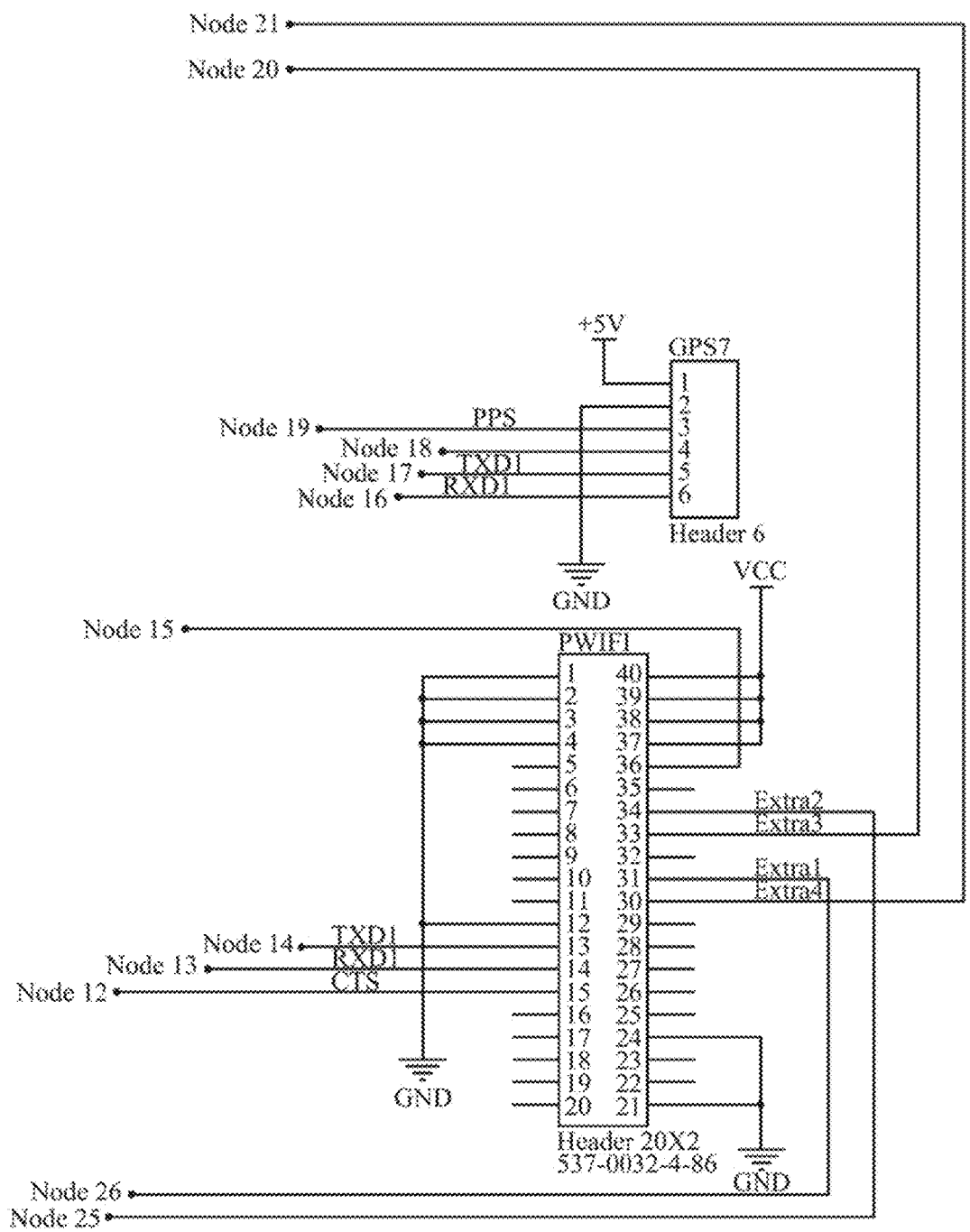
FIG. 16d is an electrical schematic of section 16d of the charging unit circuit of FIG. 15.
Figure 16C:
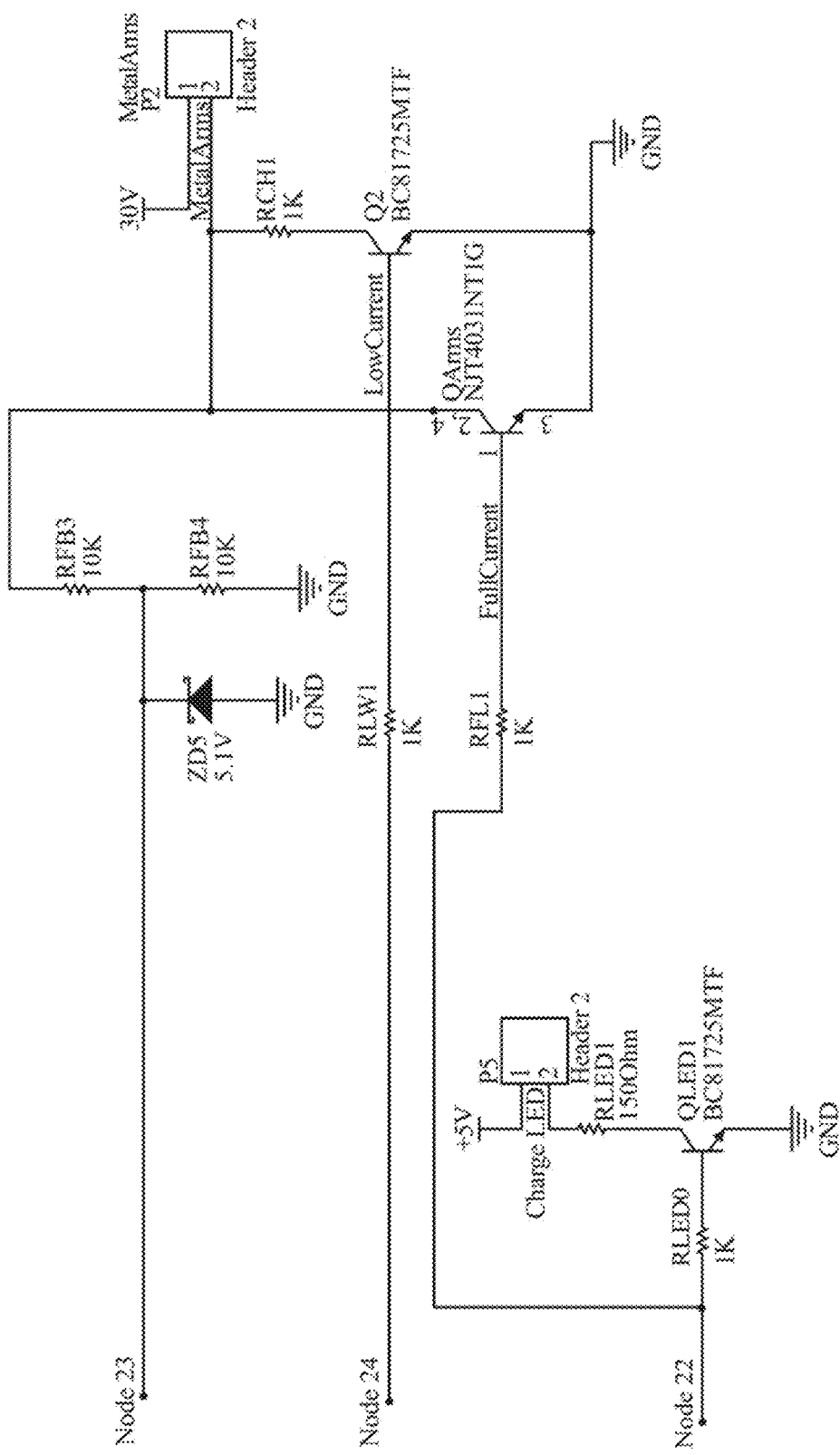
Figure 16F:
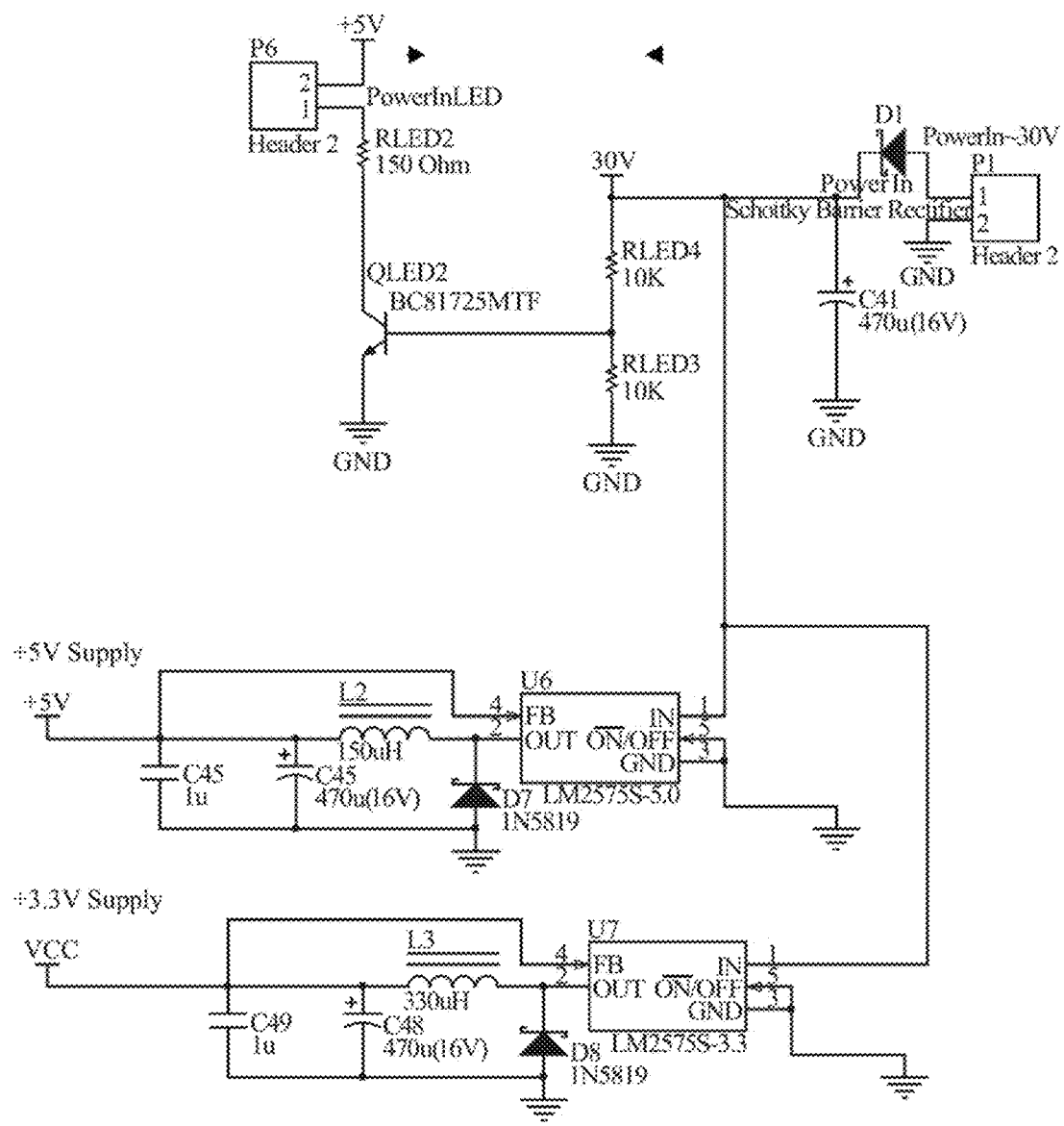
FIG. 16f is an electrical schematic of section 16f of the charging unit circuit of FIG. 15.

Referring to FIG. 14, a block diagram 1400 of a robot control system circuit is illustrated. The block diagram 1400 consists of sections 14a through 14q, which correspond to the electrical schematics of FIGS. 14a-14q respectively. The electrical schematics of FIGS. 14a-14q show in detail all of the electrical components that are necessary to operate the autonomous robot 200 including the distance-traveled measuring mechanism, the directional indicating instrument, the memory device, the data receiving port and the central processing unit.

Referring to FIG. 15, a block diagram 1500 of a hand-held remote control circuit that may be used to operate the autonomous robot 200 is illustrated. The block diagram 1500 consists of sections 15a through 15e, which correspond to the electrical schematics of FIGS. 15a-15e respectively. The hand-held remote control is capable of communicating with the data receiving port of the control system in order to maneuver the autonomous robot 200 around the perimeters as discussed above as well as to send the necessary signals to the autonomous robot 200 as discussed above.

Referring to FIG. 16, a block diagram 1600 of a charging unit circuit that may be used to charge the batteries of the autonomous robot 200 is illustrated. The block diagram 1600 consists of sections 16a through 16f, which correspond to the electrical schematics of FIGS. 16a-16f respectively. The charging unit may be incorporated into the docking station 300. As such, the circuitry illustrated in FIGS. 16a-16f may be incorporated into the housing 301 of the docket station 300. Alternatively, the circuitry illustrated in FIGS. 16a-16f may be contained within a separate component such as, for example, a plug-and-play type of device.

It should be appreciated that two separate modes of training the autonomous robot 200, 500 to define an area of confinement have been described herein above. Various combinations of the disclosure that is made with regard to the autonomous robot 200 can be incorporated into the autonomous robot 500 and vice versa. Thus, persons skilled in the art can appreciate that the invention includes the disclosure that is made with regard to each of the autonomous robots 200, 500 separately, and various combinations thereof.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system for monitoring operation of an autonomous robot comprising:
   a server;
   an external device having a display and a transceiver for receiving data from the server;
   an autonomous robot comprising a housing, a control system comprising a location tracking unit, a transceiver for transmitting signals to the server, and a central processing unit;
   the central processing unit configured to transmit, via the transceiver of the autonomous robot, data indicative of a location of the autonomous robot within an area of confinement to the server based on output generated by the location tracking unit, wherein the data is transmitted while the autonomous robot is performing a task within the area of confinement;
   the server configured to transmit the data indicative of the location of the autonomous robot within the area of confinement to the external device;
   wherein upon receipt of the data indicative of the location of the autonomous robot within the area of confinement by the external device, a visual representation of a status of a work session of the autonomous robot at a point in time T1 and a graphical representation of the boundary and a portion of an area within the boundary in which an activity has been performed by the autonomous robot during a work session is displayed on the display of the external device; and
   wherein the task is cutting grass and wherein the central processing unit is configured to detect, via a current sensor, a thickness of the grass by comparing a current value received by the current sensor to a threshold current value.

2. The system of claim 1 wherein the status of the work session comprises: (1) an indication of a current location of the autonomous robot within the area of confinement at the point in time T1 during the work session; (2) an indication of first portions of the area of confinement on which the task has been completed by the autonomous robot at the point in time T1 during the work session; and (3) an indication of second portions of the area of confinement on which the task has not yet been completed by the autonomous robot at the point in time T1 during the work session.

3. The system of claim 2 wherein the indication of the first portions of the area of confinement on which the task has been completed at the point in time T1 during the work session and the indication of the second portions of the area of confinement on which the task has not yet been completed at the point in time T1 during the work session are displayed in a contrasting manner on the display of the external device.

4. The system of claim 1 further comprising:
   the central processing unit further configured to transmit, from the transceiver of the autonomous robot to the server, data indicative of the thickness of the grass at various locations within the area of confinement;
   the server configured to transmit said data indicative of the thickness of the grass at various locations within the area of confinement to the external device; and
   wherein said data indicative of the thickness of the grass at various locations within the area of confinement is displayed on the display of the external device to visually represent the thickness of the grass at various locations within the area of confinement.

5. The system of claim 1 wherein the server maintains a real-time log of the work session and wherein the data indicative of the location of the autonomous robot within the area of confinement is transmitted from the server to the external device at predetermined time intervals during the work session.

6. The system of claim 1 wherein the central processing unit is configured to define a perimeter of the area of confinement by: (1) tracking the location of the autonomous robot based on output generated by the location tracking unit during movement of the autonomous robot; (2) recording a first location point of the autonomous robot within a memory device of the autonomous robot; (3) automatically recording a plurality of additional discrete location points of the autonomous robot within the memory device while the autonomous robot maneuvers along the perimeter of the area of confinement; and (4) defining a closed-geometry comprising the first location point and the plurality of additional discrete location points as the perimeter of the area of confinement within the memory device.

7. The system of claim 1 wherein the autonomous robot further comprises a vision system operably coupled to the central processing unit, and wherein upon the vision system detecting an actual obstacle, a location of the actual obstacle is stored in a memory device of the autonomous robot.

8. A system for monitoring operation of an autonomous robot comprising:
   a server;

an external device having a display and a transceiver for receiving data from the server;

an autonomous robot comprising a housing, a control system comprising a location tracking unit, a transceiver for transmitting signals to the server, and a central processing unit;

the central processing unit configured to transmit, via the transceiver of the autonomous robot, data indicative of a location of the autonomous robot within an area of confinement to the server based on output generated by the location tracking unit, wherein the data is transmitted while the autonomous robot is performing a task within the area of confinement;

the server configured to transmit the data indicative of the location of the autonomous robot within the area of confinement to the external device;

wherein upon receipt of the data indicative of the location of the autonomous robot within the area of confinement by the external device, a visual representation of a status of a work session of the autonomous robot at a point in time T1 and a graphical representation of the boundary and a portion of an area within the boundary in which an activity has been performed by the autonomous robot during a work session is displayed on the display of the external device the central processing unit is further configured to:

determine a distance between a position of the autonomous robot within the confinement area and a boundary of the confinement area;

move the autonomous robot at a first velocity when the distance is greater than a threshold amount; and reduce the first velocity to a second velocity when the distance is less than the threshold amount.

9. The system of claim 8, wherein the status of the work session comprises: (1) an indication of a current location of the autonomous robot within the area of confinement at the point in time T1 during the work session; (2) an indication of first portions of the area of confinement on which the task has been completed by the autonomous robot at the point in time T1 during the work session; and (3) an indication of second portions of the area of confinement on which the task has not yet been completed by the autonomous robot at the point in time T1 during the work session.

10. The system of claim 9, wherein the indication of the first portions of the area of confinement on which the task has been completed at the point in time T1 during the work session and the indication of the second portions of the area of confinement on which the task has not yet been completed at the point in time T1 during the work session are displayed in a contrasting manner on the display of the external device.

11. The system of claim 8, wherein the server maintains a real-time log of the work session and wherein the data indicative of the location of the autonomous robot within the area of confinement is transmitted from the server to the external device at predetermined time intervals during the work session.

12. The system of claim 8, wherein the central processing unit is configured to define a perimeter of the area of confinement by: (1) tracking the location of the autonomous robot based on output generated by the location tracking unit during movement of the autonomous robot; (2) recording a first location point of the autonomous robot within a memory device of the autonomous robot; (3) automatically recording a plurality of additional discrete location points of the autonomous robot within the memory device while the autonomous robot maneuvers along the perimeter of the area of confinement; and (4) defining a closed-geometry comprising the first location point and the plurality of additional discrete location points as the perimeter of the area of confinement within the memory device.

13. The system of claim 8, wherein the autonomous robot further comprises a vision system operably coupled to the central processing unit, and wherein upon the vision system detecting an actual obstacle, a location of the actual obstacle is stored in a memory device of the autonomous robot.

* * * * *